United States Patent
Kottamadal et al.

(10) Patent No.: US 11,829,689 B1
(45) Date of Patent: Nov. 28, 2023

(54) SYSTEMS AND METHODS FOR CREATING VARIANT REGIONS IN ACAUSAL SIMULATION MODELS

(71) Applicant: The MathWorks, Inc., Natick, MA (US)

(72) Inventors: Raju Kottamadal, Bangalore (IN); John E. Ciolfi, Wellesley, MA (US); Sudhir Kumar, Bihar (IN); Ebrahim M. Mestchian, Newton, MA (US); Vineeth Kartha, Trivandrum (IN)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 16/896,723

(22) Filed: Jun. 9, 2020

(51) Int. Cl.
G06F 30/20 (2020.01)
G06F 111/10 (2020.01)

(52) U.S. Cl.
CPC .......... *G06F 30/20* (2020.01); *G06F 2111/10* (2020.01)

(58) Field of Classification Search
None
See application file for complete search history.

(56) References Cited

U.S. PATENT DOCUMENTS

| | | | |
|---|---|---|---|
| 5,005,119 A | 4/1991 | Rumbaugh et al. | |
| 5,301,301 A | 4/1994 | Kodosky et al. | |
| 5,475,851 A | 12/1995 | Kodosky et al. | |
| 5,930,154 A * | 7/1999 | Thalhammer-Reyero | G16B 50/20 715/764 |
| 5,980,096 A * | 11/1999 | Thalhammer-Reyero | G16B 5/00 |
| 6,096,094 A | 8/2000 | Kay et al. | |
| 6,125,442 A * | 9/2000 | Maves | G06F 8/10 712/220 |
| 6,349,274 B1 | 2/2002 | Kay et al. | |

(Continued)

FOREIGN PATENT DOCUMENTS

WO WO-2007/022289 A2 2/2007

OTHER PUBLICATIONS

Dr. Michael M. Tiller, Modelica by Example—Chapter titled Component Models, obtained from https://web.archive.org/web/20190401061124/https://mbe.modelica.university/components/components/component_models/ [archive date Apr. 1, 2019] on Dec. 9, 2021, 2019, 7 pages (Year: 2019).*

(Continued)

*Primary Examiner* — Iftekhar A Khan
(74) *Attorney, Agent, or Firm* — CESARI AND MCKENNA, LLP; Michael R. Reinemann

(57) ABSTRACT

Systems and methods establish, activate, and deactivate variant choices within an acausal physical component model of a physical system. The systems and methods utilize variant connector blocks to establish cut points in a physical network defined by the physical model. The cut points may be programmatically controlled to activate and/or deactivate a variant choice. The variant connector blocks may include internal connections that may be programmatically controlled to be either open or closed in order to cut or include a variant choice in the acausal physical component model. Variant conditions or labels may be associated with the internal connections, and the systems and methods may evaluate the variant conditions and/or examine the labels to determine whether the internal connections are open or closed.

34 Claims, 33 Drawing Sheets

(56) References Cited

U.S. PATENT DOCUMENTS

| | | | |
|---|---|---|---|
| 6,868,508 B2* | 3/2005 | Grey | G06F 11/263 |
| | | | 714/48 |
| 6,965,800 B2 | 11/2005 | Schmit et al. | |
| 6,986,120 B2* | 1/2006 | Reddy | G06F 8/10 |
| | | | 717/109 |
| 7,024,631 B1 | 4/2006 | Hudson et al. | |
| 7,219,306 B2 | 5/2007 | Kodosky et al. | |
| 7,398,192 B2 | 7/2008 | Brewton | |
| 7,424,410 B2* | 9/2008 | Orofino | G06F 8/34 |
| | | | 703/2 |
| 7,434,183 B2 | 10/2008 | McGaughy et al. | |
| 7,509,244 B1* | 3/2009 | Shakeri | G06F 8/41 |
| | | | 717/109 |
| 7,555,742 B2 | 6/2009 | Iborra et al. | |
| 7,558,712 B1* | 7/2009 | Aldrich | G06F 30/30 |
| | | | 703/2 |
| 7,680,632 B1 | 3/2010 | Aldrich | |
| 7,742,903 B2 | 6/2010 | Ciolfi et al. | |
| 7,752,138 B1 | 7/2010 | Dean et al. | |
| 7,809,545 B2 | 10/2010 | Ciolfi et al. | |
| 7,934,194 B2 | 4/2011 | Kinnucan, Jr. et al. | |
| 7,941,299 B1* | 5/2011 | Aldrich | G06F 8/34 |
| | | | 703/2 |
| 8,131,528 B1 | 3/2012 | Vora et al. | |
| 8,386,222 B2 | 2/2013 | Ciolfi et al. | |
| 8,490,067 B2 | 7/2013 | Boettcher et al. | |
| 8,700,368 B1* | 4/2014 | Ciolfi | G06F 30/20 |
| | | | 703/6 |
| 8,798,971 B2 | 8/2014 | Aberg et al. | |
| 8,812,276 B2 | 8/2014 | Aldrich et al. | |
| 8,924,193 B2* | 12/2014 | Hosey | G06F 30/20 |
| | | | 703/22 |
| 8,983,823 B1 | 3/2015 | Koh et al. | |
| 9,104,805 B1 | 8/2015 | Yunt et al. | |
| 9,152,393 B1* | 10/2015 | Mani | G06F 8/34 |
| 9,176,640 B1* | 11/2015 | Behboodian | G06F 8/34 |
| 9,361,119 B1* | 6/2016 | Lin | G06F 9/44505 |
| 9,378,562 B1* | 6/2016 | Ciolfi | G06T 17/00 |
| 9,563,407 B2* | 2/2017 | Salter | G06F 30/20 |
| 9,766,882 B2* | 9/2017 | Kronmueller | G06F 8/70 |
| 10,521,197 B1* | 12/2019 | Ciolfi | G06F 8/34 |
| 10,545,731 B1 | 1/2020 | Ciolfi et al. | |
| 10,740,514 B1* | 8/2020 | Zhang | G06F 30/3308 |
| 10,831,456 B1* | 11/2020 | Bhownani | G06F 8/427 |
| 10,866,789 B1* | 12/2020 | Ciolfi | G05B 17/02 |
| 11,126,407 B1 | 9/2021 | Ciolfi et al. | |
| 2002/0184611 A1 | 12/2002 | Endejan | |
| 2003/0014234 A1 | 1/2003 | Rehtanz | |
| 2003/0107595 A1* | 6/2003 | Ciolfi | G06F 30/20 |
| | | | 715/762 |
| 2003/0167182 A1 | 9/2003 | Bloom et al. | |
| 2004/0073413 A1 | 4/2004 | Aberg et al. | |
| 2004/0210592 A1* | 10/2004 | Ciolfi | G06F 8/34 |
| 2004/0210831 A1* | 10/2004 | Feng | G06F 30/20 |
| | | | 715/205 |
| 2005/0267721 A1 | 12/2005 | Thalhammer-Reyero | |
| 2005/0273305 A1 | 12/2005 | Thalhammer-Reyero | |
| 2005/0278162 A1* | 12/2005 | Ciolfi | G06F 30/20 |
| | | | 703/22 |
| 2006/0229742 A1 | 10/2006 | Boutin et al. | |
| 2007/0266366 A1* | 11/2007 | Bucuvalas | G06F 11/3612 |
| | | | 717/104 |
| 2008/0092109 A1 | 4/2008 | Kinnucan, Jr. et al. | |
| 2008/0092111 A1* | 4/2008 | Kinnucan | G06F 8/10 |
| | | | 717/105 |
| 2008/0098349 A1 | 4/2008 | Lin et al. | |
| 2008/0263506 A1 | 10/2008 | Broadfoot et al. | |
| 2008/0294406 A1 | 11/2008 | Hachmeister | |
| 2009/0006062 A1* | 1/2009 | Sedukhin | G06F 8/35 |
| | | | 703/13 |
| 2009/0044180 A1 | 2/2009 | Luszczek | |
| 2009/0044197 A1 | 2/2009 | Stefansson | |
| 2009/0049435 A1 | 2/2009 | Luszczek | |
| 2009/0077511 A1* | 3/2009 | Wahler | G06F 8/35 |
| | | | 716/106 |
| 2009/0098349 A1* | 4/2009 | Ichikawa | B32B 27/08 |
| | | | 428/203 |
| 2009/0179921 A1 | 7/2009 | Raghavan et al. | |
| 2009/0228853 A1* | 9/2009 | Hong | G06F 30/39 |
| | | | 716/119 |
| 2009/0234640 A1* | 9/2009 | Boegl | G06F 8/10 |
| | | | 704/9 |
| 2009/0254801 A1* | 10/2009 | Pressman | G06F 8/10 |
| | | | 715/846 |
| 2009/0293044 A1* | 11/2009 | Boettcher | G06F 30/33 |
| | | | 717/131 |
| 2010/0153910 A1* | 6/2010 | Ciolfi | G06F 8/34 |
| | | | 717/105 |
| 2010/0175045 A1* | 7/2010 | Ciolfi | G06F 30/20 |
| | | | 718/100 |
| 2011/0067017 A1* | 3/2011 | Ghosh-Roy | G06F 8/34 |
| | | | 715/765 |
| 2011/0145271 A1 | 6/2011 | Noyes et al. | |
| 2011/0252411 A1 | 10/2011 | Martin et al. | |
| 2011/0283260 A1 | 11/2011 | Bucuvalas | |
| 2011/0295578 A1 | 12/2011 | Aldrich et al. | |
| 2012/0084695 A1* | 4/2012 | Higgins | G06F 3/0484 |
| | | | 715/771 |
| 2014/0019112 A1* | 1/2014 | Canedo | G06F 30/20 |
| | | | 703/21 |
| 2014/0245256 A1 | 8/2014 | Petzoldt et al. | |
| 2014/0278307 A1* | 9/2014 | Hosey | G06F 30/20 |
| | | | 703/6 |
| 2016/0357895 A1* | 12/2016 | Hyde | G06N 7/01 |
| 2019/0347370 A1* | 11/2019 | Matei | G05B 17/02 |
| 2019/0384871 A1* | 12/2019 | Matei | G06F 30/20 |

OTHER PUBLICATIONS

Authors Unknown, Simulink® User's Guide: R2017a, The MathWorks, Inc, Mar. 2017, pp. 11-61 to 11-63 (3 pages from chapter 11) (Year: 2017).*

Egel, Tom. Real time simulation using non-causal physical models. No. 2009-01-1021. SAE Technical Paper, 2009. 9 pages (Year: 2009).*

Kopei, Volodymyr B., R. Onysko, and Vitalii G. Panchuk. "Component-oriented acausal modeling of the dynamical systems in Python language on the example of the model of the sucker rod string." PeerJ Computer Science 5 (2019): 22 pages (Year: 2019).*

Alalfi, Manar H., Eric J. Rapos, Andrew Stevenson, Matthew Stephan, Thomas R. Dean, and James R. Cordy. "Variability identification and representation for automotive Simulink models." In Automotive Systems and Software Engineering, pp. 109-139. Springer, Cham, 2019 (Year: 2019).*

Kinnucan, Paul, and Pieter J. Mosterman. "A graphical variant approach to object-oriented modeling of dynamic systems." In SCSC, pp. 513-521. 2007 (Year: 2007).*

Steiner, Eduardo, Paulo Masiero, and Rodrigo Bonifácio. "Managing SPL variabilities in UAV Simulink models with Pure: variants and Hephaestus." CLEI Electronic Journal 16, No. 1 (2013): pp. 1-16 (Year: 2013).*

Schulze, Michael, et al., "Automotive Model-Driven Development and the Challenge of Variability," ACM, Inc., ACM, SPLC'12: Proceedings of the 16th International Software Product Line Conference, Salvador, Brazil, Rightslink, vol. 1, Sep. 2-7, 2012, pp. 207-214.

Arrieta, Aitor, et al., "A Comparative Variability Modelling and Management Approaches in Simulink for Embedded Systems," Sep. 2014, pp. 1-8.

Arrieta, Aitor, et al., "A Model-Based Testing Methodology for the Systematic Validation of Highly Configurable Cyber-Physical Systems," IARIA, Valid 2014: The Sixth International Conference on Advances in System Testing and Validation Lifecycle, Oct. 2014, pp. 66-72.

Bąk, Kacper, et al., "Clafer: Unifying Class and Feature Modeling," Software and System Modeling, Dec. 2014, pp. 1-34.

(56) References Cited

OTHER PUBLICATIONS

Schlie, Alexander, et al., "Clustering Variation Points in MATLAB / Simulink Models Using Reverse Signal Propagation Analysis," Springer International Publishing AG, ICSR 2017: International Conference on Software Reuse, Apr. 5, 2017, pp. 77-64.
U.S. Appl. No. 17/157,477, filed Jan. 25, 2021 by Vaibhav Awale, et al. for Variant Modeling Elements in Graphical Programs, pp. 1-214.
U.S. Appl. No. 17/120,660, filed Dec. 14, 2020 by John E. Ciolfi for Variant Modeling Elements in Graphical Programs, pp. 1-214.
Aldrich, Bill, et al., "Managing Verification Activities Using SVM," Nov. 2004, pp. 1-15.
Antoulas, et al., "A survey of model reduction methods for large-scale systems," Contemporary Mathematics, Oct. 27, 2006, pp. 1-28.
Atasu, et al., "Automatic Application-Specific Instruction-Set Extensions under Microarchitectural Constraints" ACM, DAC 2003, Anaheim, CA, USA, Jun. 2-6, 2003, pp. 256-261.
Clarke, et al., "Model checking and abstraction," ACM Transactions on Programming Languages and Systems, vol. 16, No. 5, Sep. 1994, pp. 1512-1542.
Czarnecki, Krzysztof et al, "Variant Configuration of Software Systems," PESOA, Process Family Engineering in Service-Oriented Applications, BMBF-Project, PESOA-Report No. Jun. 2004, Feb. 10, 2004, pp. 1-32.
Czarnecki, Krzysztof et al, "Generative Programming for Embedded Software: An Industrial Experience Report," Springer-Verlag Berlin Heidelberg, Generative Programming and Component Engineering, ACM SigPlan/SigSoft Conference, GPCE 2002, Pittsburgh, PA, USA, Proceedings, Lecture Notes in Computer Science (LNCS), vol. 2487, Sep. 26, 2002, pp. 156-172.
"Definition of 'Alternative,'" Webster's Dictionary, accessed online Nov. 11, 2013, one page.
Dziobek, Christian, et al., "Model Diversity and Variability: Handling Functional Variants in Simulink Models," Elektronik Automotive, pp. 33-37.
Fehnker, Ansgar et al., "Hybrid System Verification is Not a Sinecure: The Electronic throttle Control Case Study," International Symposium on Automated Technology for Verification and Analysis, Automated Technology for Verification and Analysis, Springer-Verlag Berlin Heidelberg, Proceedings of the Second International Conference, ATVA 2004, Taipei, Taiwan, ROC, Lecture Notes in Computer Science (LNCS), vol. 3299, Oct. 31-Nov. 3, 2004, pp. 263-277.
Frey, et al., "An Extensible Architecture for Detecting Violations of a Cloud Environment Constraints During Legacy Software System Migration," 15th European Conference on Software Maintenance and Reengineering, IEEE, IEEE Computer Society, Mar. 2011, pp. 269-278.
Girard, et al., "Approximation metrics for discrete and continuous systems," University of Pennsylvania, Department of Computer & Information Science—Technical Reports (CIS), Nov. 2005, pp. 1-32.
Haber, Arne, et al., "First-Class Variability Modeling in Matlab/Simulink," Proceedings of the Seventh International Workshop on Variability Modeling of Software-Intensive Systems, ACM, New York, NY, Jan. 23-25, 2013, pp. 11-18.
Han, et al., "Detecting data store access conflict in Simulink by solving Boolean satisfiability problems," In American Control Conference (ACC'1 0), Jun. 2010, pp. 1-6.
Han, et al., "Reachability analysis of hybrid control systems using reduced-order models", In IEEE Proc of American Control Conference (ACC'04), Jun. 2004, pp. 1183-1189.
Han, et al., "Reachability analysis of nonlinear systems using trajectory piecewise linearized models," Proceedings of the 2006 American Control Conference, Jun. 14-16, 2006, pp. 1-6.
Heckel, "Graph transformation in a nutshell" Electron Notes Theory of Computer Science, Feb. 2006, pp. 187-198.
International Search Report Application No. PCT/US2005/020921, dated Dec. 12, 2005.
Johnson, et al., "The program structure tree: computing control regions in linear time," In Proceedings of the ACM SIGPLAN 1994 conference on Programming language design and implementation, PLDI '94,Orlando, Florida, USA, Jun. 20-24, 1994, pp. 171-185.
Kaga, et al., "Validation of control software specification using design interests extraction and model checking," In SAE 2012 World Congress and Exhibition, Apr. 24, 2012, pp. 1-13.
Kobourov, S., "Spring Embedders and Force-Directed Graph Drawing Algorithms," Jan. 2012, pp. 1-23.
Kolassa, Carsten, et al., "Evaluation of Variability Concepts for Simulink in the Automotive Domain," IEEE Computer Society, 2015 48th Hawaii International Conference on System Sciences, Jan. 5-8, 2015, pp. 5373-5382, [retrieved on Aug. 9, 2019], Retrieved from the Internet.
Koren, Yehuda, "Drawing Graphs by Eigenvectors: Theory and Practice," Journal Computers & Mathematics with Applications, Jun. 2005, pp. 1-28.
Matsubara, et al., "Model checking with program slicing based on variable dependence graphs," In Workshop on Formal Techniques for Safety-Critical Systems, Nov. 2012, pp. 56-68.
"Notification of Transmittal of the International Search Report and the Written Opinion of the International Searching Authority, or the Declaration," International Filing Date: May 27, 2011, International Application No. PCT/US2011/000965, Applicant: The Mathworks, Inc., dated Oct. 6, 2011, pp. 1-10.
Pappas, "Bisimilar linear systems," Automatica 39, Jan. 2002, pp. 2035-2047.
Rewienski, et al., "A trajectory piecewise-linear approach to model order reduction and fast simulation of nonlinear circuits and micromachined devices," IEEE Transaction on Computer-Aided Design of Integrated Circuits and Systems, vol. 22, No. 2, Feb. 2003, pp. 155-170.
Schlee, Max, "Generative Programming of Graphical User Interface," Proceedings of the Working Conference on Advanced Visual Interfaces, AVI '04, ACM, May 24-25, 2004, pp. 403-406.
"Simscape™: User's Guide," R2019b, The MathWorks, Inc., Sep. 2019, pp. 1-666.
"Simulink® Design Verifier 1: User's Guide," The MathWorks, Inc., May 2007, pp. i-xii, 1-1 to 1-20, 2-1 to 2-8. 3-1 t0 3-18, 4-1 to 4-18, 5-1 to 5-16, 6-1 to 6-30, 7-1 to 7-28, 8-1 to 8-26, A-1 to A-14, 9-1 to 9-16, 10-1 to 10-28, 11-1 to 11-6, 12-1 to 12-14, Glossary-1 to Glossary-4, B-1 to B-2, and Index-1 to Index-2.
"Simulink® Designer Verifier 1: User's Guide," The MathWorks, Inc., May 2007, pp. 1-485.
"Simulink®: User's Guide," R2016b, The MathWorks, Inc., Sep. 2016, pp. 1-4022.
"Simulink®: User's Guide," R2019b, The MathWorks, Inc., Sep. 2019, pp. 1-4620.
"Simulink® Verification and Validation 2: User's Guide," The MathWorks, Inc., Sep. 2007, pp. i-xii, 1-1 to 1-6, 2-1 to 2-58, 3-1 to 3-32, 4-1 to 4-28, 5-1 to 5-66, 6-1 to 6-30, 7-1 to 7-4, 8-1 to 8-56, 9-1 to 9-4, 10-1 to 10-42, A-1 to A-4, and Index-1 to Index-4.
"Simulink® Verification and Validation 2: User's Guide," The MathWorks, Inc., Sep. 2007, pp. 1-829.
Sponemann, Miro, "On the Automatic Layout of Data Flow Diagrams," Diploma Thesis, Christian-Albrechts-Universität zu Kiel, Department of Computer Science, Mar. 19, 2009, pp. 1-99.
Tiihonen, J. et al., "A Practical Tool for Mass-Customizing Configurable Products," Proceedings of the 14th International Conference on Engineering Design, ICED '03, Stockholm, Sweden, Aug. 19-21, 2003.
Tip, "A Survey of Program Slicing Techniques," Journal of Programming Languages, vol. 3, 1995, pp. 121-189.
Weiser, "Program slicing," IEEE Transactions on Software Engineering, vol. SE-10, No. 4, Jul. 1984, pp. 352-357.
Wenzel, Sven, et al., "Tracing Model Elements," IEEE, IEEE International Conference on Software Maintenance (ICSM) 2007, Oct. 2-5, 2007, pp. 104-113, [retrieved on Aug. 9, 2019], Retrieved from the Internet.

(56) References Cited

OTHER PUBLICATIONS

Shakeri, Mojdeh, "Variant Configuration and Management: Challenges and Opportunities," PhD Thesis, Department of System Design and Management in Partial Filfillment of the Requirements for the Degree of Master of Science in Engineering and Management at the Massachusetts Institute of Technology, Feb. 2018, pp. 1-72.

U.S. Appl. No. 16/835,429, filed Mar. 31, 2020 by John E. Ciolfi et al. for Systems and Methods for Analyzing Variant Configurations of Simulation Models, pp. 1-91.

* cited by examiner

| Annotation | Variant Condition |
|---|---|
| v:0 | B == 1 |
| v:1 | A == 1 && B == 1 |
| v:2 | A == 2 && B == 1 |
| v:3 | (A == 1 \|\| A == 2) && B ==1 |

FIG. 20

SYSTEMS AND METHODS FOR CREATING VARIANT REGIONS IN ACAUSAL SIMULATION MODELS

BRIEF DESCRIPTION OF THE DRAWINGS

The description below refers to the accompanying drawings, of which:

FIG. 20 is an illustration of a legend of variant conditions generated for a simulation in accordance with one or more embodiments;

DETAILED DESCRIPTION OF ILLUSTRATIVE EMBODIMENTS

Figure 1:
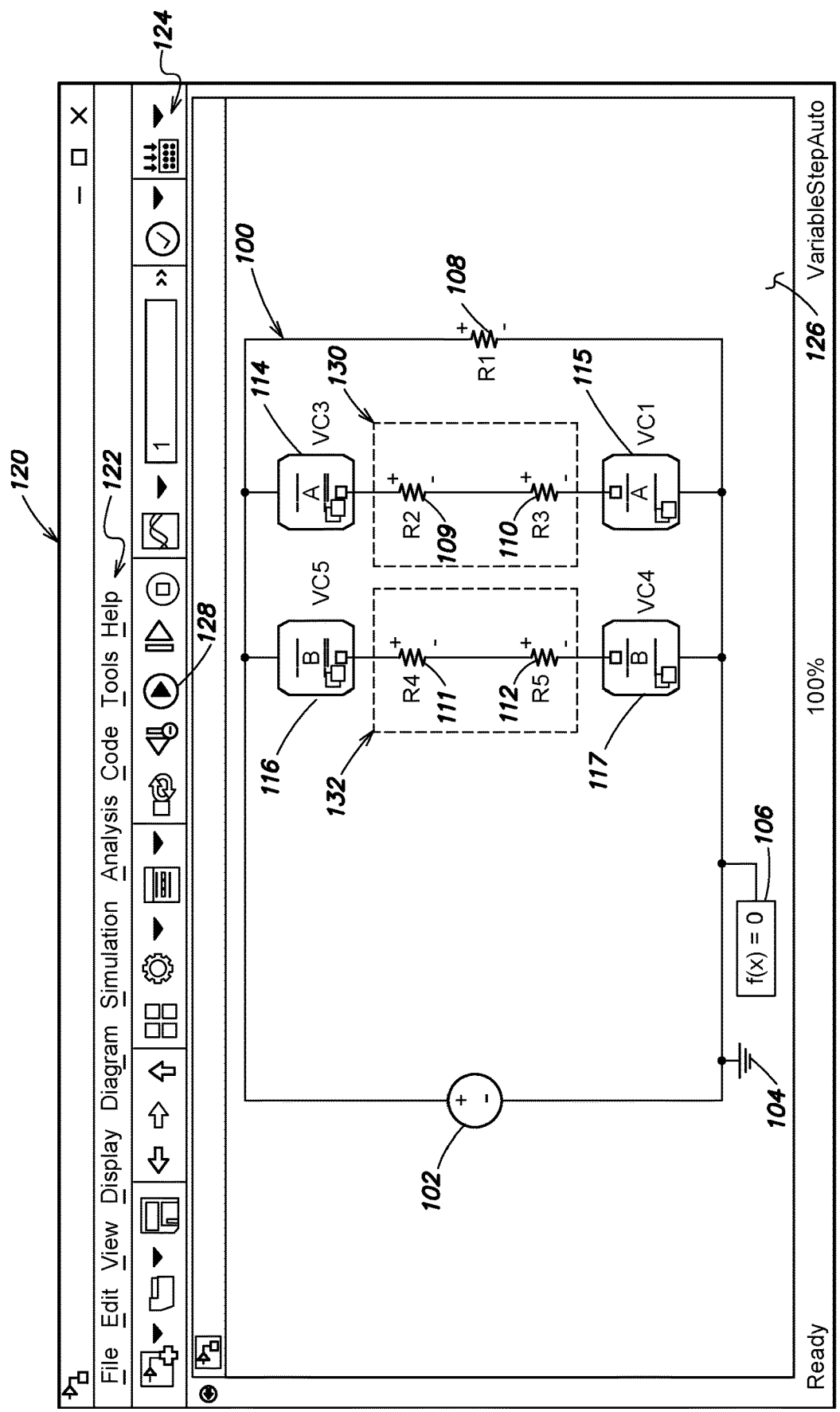
FIG. 1 is an illustration of an example executable physical model in accordance with one or more embodiments.

To design a physical system, such as a mechanical, electrical, and/or hydraulic system, a user may operate a physical network modeling environment to create a computer-based simulation model of the physical system being designed. The model may be an executable block diagram model and may include a network of model elements, e.g., blocks, representing real physical components, such as motors, pumps, drivetrains, gears, mechanical linkages, voltage sources, resistors, capacitors, diodes, etc. The model elements may include connection ports through which the model elements may be interconnected to represent how the physical components are physically connected. The connection ports may be non-directional, e.g., they may not have defined input-output or assignment relationships. Instead, the connections may represent constraints on physical values. The connections may indicate that one set of variables are equal (such as voltage for a model of an electrical circuit) while another set of variables sum to zero (such as current). Accordingly, the model may be referred to as an acausal or noncausal model. To execute an acausal model, the simulation environment may generate a system of equations based on conservation laws. The system of equations may include system variables that change over time. The equations included in the system of equations may be Differential Algebraic Equations (DAEs) and/or Partial Differential Equations (PDEs) and the simulation environment may solve the DAEs and/or PDEs using one or more numerical methods. For example, a solver included in the simulation environment may use numerical approximation methods to derive difference equations executable by a data processing device, e.g., a computer.

In some cases, a user may want to model a physical system having multiple, different configurations. The user may create multiple acausal models, e.g., one for each configuration. While each model represents a different configuration of the physical system, much of the overall structure of the models may be the same. The need to create multiple separate models to represent different configurations is disadvantageous. For example, it may consume significant computer memory resources, e.g., to store all the different models. In addition, if changes need to be made to the common portion, those same changes must be made to each separate model. Updating each individual model in exactly the same manner can be error prone.

The present disclosure relates to systems and methods for establishing variant regions that may include one or more variant choices where the variant choices can be activated or deactivated within an acausal model of a physical system. A single model can thus represent multiple different configurations of a physical system. The systems and methods may include a new model element, called a Variant Connector block, that may be included in the acausal model. The systems and methods utilize the Variant Connector block to define variants choices. Variant choices may be interconnected either by lines or hierarchy to form a variant region of a model. Each variant region may contain one or more variant choices. Each variant choice of a region may be activated or deactivated. Conceptually, the act of deactivating a variant choice may consist of "cutting" the lines associated with the variant choice. This may be done internally using an in-memory representation of the acausal model. The cut points may be programmatically controlled to activate and/or deactivate a variant choice. For example, a Variant Connector block may include two or more terminals for selectively connecting or disconnecting one or more variant choices to or from a common physical network portion of the acausal model. Each terminal may be associated with one or more other terminals of the block defining internal connections within the block among the associated terminals. The internal connections may be programmatically controlled to be either open or closed in order to cut and deactivate or activate, respectively, a variant choice. For example, terminals may be associated with variant conditions. The systems and methods may evaluate the variant conditions to determine whether an internal connection is open or closed.

The systems and methods may propagate the variant conditions to model elements of the variant choices. The systems and methods may identify the model elements of active and inactive variant choices. The systems and methods may revise and/or create an in-memory representation for the acausal simulation model that includes model elements of active variant choices and omits model elements of inactive variant choices. A simulation engine may construct a physical network based on the in-memory representation and utilize the physical network to construct a system of equations for simulating the acausal model. Alternatively, a code generator may utilize the physical network to generate code for the acausal model. In some embodiments, the simulation engine may generate a system of equations based on the entire physical network for the acausal model including all variant choices. The simulation engine may then revise the system of equations and/or generate a new system of equations in response to model elements determined to be part of an inactive variant choice at run-time.

In some embodiments, the systems and methods may evaluate the portions of a model being connected by a Variant Connector block during model edit time. For example, the systems and method may determine whether the portions connected across the Variant Connector block are compatible. If the model portions are not compatible, the systems and methods may issue a warning or other message. For example, if a portion operating as an acausal model is directly connected via a Variant Connector block to a portion operating as a causal model, a warning or other message may be issued.

In some embodiments, the systems and methods may operate a Variant Connector block in a leaf mode, a primary mode, or a non-primary, e.g., a secondary, mode. A Variant Connector block in leaf mode may operate on its own, e.g., as a single, standalone Variant Connector block, to define a variant region of a model that contains one or more variant choices. A Variant Connector block in primary mode may be paired with one or more Variant Connector blocks in non-primary mode to collectively define a variant region of the acausal model that contains one or more variant choices. The systems and methods may propagate a variant condition defined at a primary Variant Connector block to the associated non-primary block(s) for use in determining whether internal connections of the associated non-primary blocks are open or closed, and thus which if any of the variant choices are active.

FIG. 1 is an illustration of an example executable physical model 100 of an electrical circuit in accordance with one or more embodiments. The physical model 100 may include a plurality of model elements, such as blocks, arranged and connected to represent an electrical circuit. Specifically, the physical model 100 may include an AC voltage source block 102, a Ground block 104, a Solver Configuration block 106, and five Resistor blocks 108-112 named R1, R2, R3, R4, and R5. The model 100 further includes four Variant Connector blocks 114-117 that define cut points in the model 100, which may also be referred to as disconnection points. The Variant Connector blocks 114-117 may be programmatically controlled in order to include or omit the Resistor blocks 109-112 (R2-R5) in the model 100. For example, the Variant Connector blocks 114 and 115 may operate to either include or omit, e.g., snip out, the Resistor blocks 109 and 110 (R2 and R3) from the electrical circuit. The Variant Connector blocks 116 and 117 may operate to either include or omit the Resistor blocks 111 and 112 (R4 and R5) from the electrical circuit.

The terms "include" and "omit" from a physical network are intended to cover both modifying an existing physical network constructed for a model, as well as constructing a new physical network for the model. For example, elements representing Resistor blocks present in an existing physical network may be removed. Alternatively, a physical network, such as a new physical network, may be constructed without Resistor blocks.

The model 100 may be opened and presented in a model editor window 120 generated by a simulation environment and presented on a display of a data processing system. The model editor window 120 may include a plurality of user interface elements and/or windows elements (widgets), at least some of which may be operated by a user to open, construct, edit, run, and save a model, among other operations. For example, the model editor window 120 may include a menu bar 122, a toolbar 124, and a canvas 126. The model 100 may be a block diagram model and may be presented on the canvas 126 of the model editor window 120. The menu bar 122 may include a plurality of commands, and the commands may be organized into drop-down categories, such as File, Edit, View, Display, Diagram, etc. The toolbar 124 may include a plurality of command buttons for executing particular commands. The toolbar 124 may include a Run button 128 and, in response to a user selecting the Run button 128, for example with a mouse or other input device, the model 100 may be executed, e.g., run.

Each of the Variant Connector blocks 114-117 has two terminals defining an internal connection that may be open or closed. If the internal connections of the two Variant Connector blocks 114 and 115 are closed, then the two Resistor blocks 109 and 110 (R2 and R3) will be included in the model 100 and will form part of the electrical circuit that is simulated. On the other hand, if the internal connections of the two Variant Connector blocks 114 and 115 are open, then the two Resistor blocks 109 and 110 (R2 and R3) will be cut out of, e.g., snipped from, the model 100 and will not be part of the electrical circuit that is simulated. Similarly, the internal connections of the Variant Connector blocks 116 and 117 may be opened or closed to either include or exclude the two Resistor blocks 111 and 112 (R4 and R5) from the electrical circuit that is simulated.

The Variant Connector blocks 114-117 define two variant regions in the model 100. A first variant region 130 indicated by the dashed line box consisting of a single variant choice that includes the two Resistor blocks 109 and 110 (R2 and R3). A second variant region 132 indicated by the dashed line box consisting of a single variant choice that includes the two Resistor blocks 111 and 112 (R4 and R5). By programmatically controlling the Variant Connector blocks 114-117, the one model 100 may be used to simulate three different electrical circuits without having to structurally change the model 100. A first electrical circuit that may be simulated includes all four of the Resistor blocks 109-112 (R2-R5). A second electrical circuit includes Resistor blocks 109 and 110 (R2 and R3), but not Resistor blocks 111 and 112 (R4 and R5). A third electrical circuit includes Resistor blocks 111 and 112 (R4 and R5) but not Resistor blocks 109 and 110 (R2 and R3). Again, the one model 100 may implement any of these alternative variations without having to add or remove model elements from the model 100. Instead, the different configurations of the circuit are achieved through programmatic control of the Variant Connector blocks 114-117, which activate and/or deactivate the variant regions 130 and 132 defined thereby. The AC voltage source block 102, the Ground block 104, and the Solver Configuration block 106 are part of the common physical network portion of the model 100 and are included in all of the variations.

As noted, in FIG. 1, there are two variant choices and during simulation of the model 100 or execution of code generated for the model 100, based on either user interactions or programmatic control, either or both variant choices may be activated or deactivated. The electrical circuit of FIG. 1, is valid if both variant choices are active, if one of the variant choices is active, or neither of the variant choices is active. Alternatively, in FIG. 1, the two variant choices maybe processed during model initialization to keep the active variant choice(s) and remove the inactive variant choice(s) prior to running the simulation or generating code and executing the code.

In some embodiments, the operation of one or more Variant Connector blocks may result in one or more model elements left dangling in the model. For example, one or more Variant Connector blocks may result in one or more electrical components, such as Resistors, that are energized but not fully connected to the circuit. For example, Variant Connector blocks 114 and 115 define the variant region 130 that contains the Resistor blocks 109 and 110 (R2 and R3). Suppose the internal connection of the Variant Connector block 114 is closed, but the internal connection of the Variant Connector block 115 is open. In this case, the Resistor blocks 109 and 110, which are connected together in series are connected to the positive side of the circuit as defined by the voltage source block 102, but not to the negative side of the circuit. In other words, the Resistor blocks 109 and 110 are dangling from the positive side of the circuit. The Resistor blocks 109 and 110 are thus energized but not fully connected. In some embodiments, a system of equations for such a network, e.g., in which the Resistor blocks 109 and 110 are dangling from the positive side of the circuit, may be constructed and a system of equations generated and solved. Alternatively, in many cases, the existence of one or more dangling elements, may be considered a modeling error, and a warning may be generated and presented, e.g., to the user.

Figure 2:
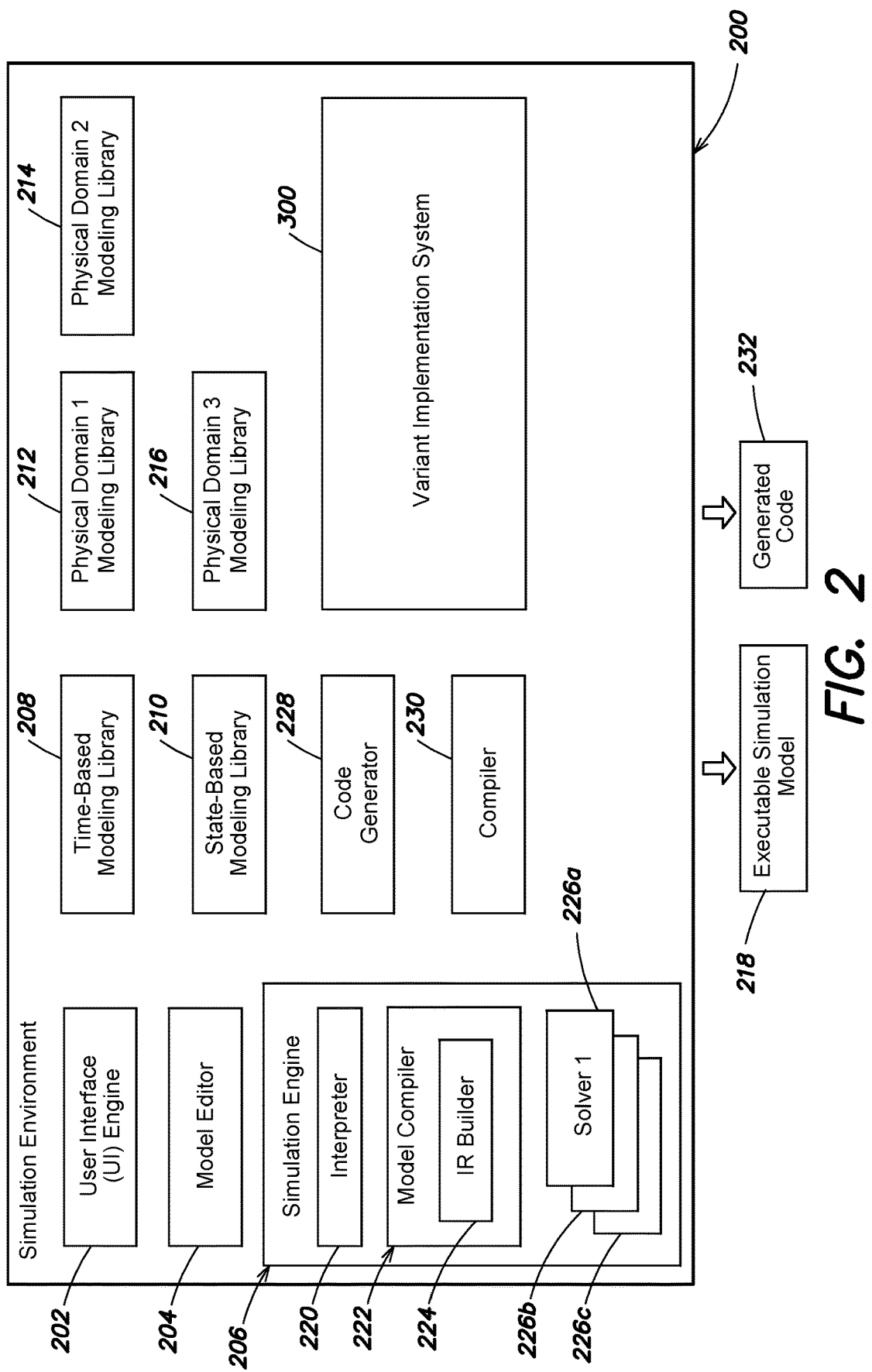
FIG. 2 is a partial functional diagram of an example simulation environment in accordance with one or more embodiments.

FIG. 2 is a partial functional diagram of an example simulation environment 200 in accordance with one or more embodiments. The simulation environment 200 may include a user interface (UI) engine 202, a model editor 204, a simulation engine 206, and one or more data stores, such as libraries, that contain predefined model element types. For example, the simulation environment may include a time-based modeling library 208, a state-based modeling library 210, and one or more physical domain modeling libraries, such as physical domain modeling libraries 212, 214, and 216, for modeling different physical systems. Exemplary physical domains include electrical, hydraulic, magnetic, mechanical rotation, mechanical translation, pneumatic, thermal, etc. Instances of the model element types provided by the libraries 208, 210, may be selected and included in an executable simulation model 218, e.g., by the model editor 204. The simulation engine 206 may include an interpreter 220, a model compiler 222, which may include an Intermediate Representation (IR) builder 224, and one or more solvers 226a-c. Exemplary solvers include one or more fixed-step continuous solvers, which may utilize integration techniques based on Euler's Method or Huen's Method, and one or more variable-step solvers, which may be based on the Runge-Kutta and Dormand-Prince pair. A description of suitable solvers may be found in the *Simulink User's Guide* from The MathWorks, Inc. (September 2019 ed.), which is hereby incorporated by reference in its entirety.

In some embodiments, one or more block types may be selected from the libraries 208 and/or 210 and also included in the executable simulation model 218, such that the model 218 may include an acausal portion and a causal portion.

The simulation environment 200 may include or have access to other components, such as a code generator 228 and a compiler 230. The code generator 228 may generate code, such as code 232, based on the executable simulation model 218. For example, the code 232 may have the same or equivalent functionality and/or behavior as specified by the executable simulation model 218. The generated code 232, however, may be in a form suitable for execution outside of the simulation environment 200. Accordingly, the generated code 232, which may be source code, may be referred to as standalone code. The compiler 230 may compile the generated code 232 to produce an executable, e.g., object code, that may be deployed on a target platform for execution, such as an embedded system.

Exemplary code generators include the Simulink HDL Coder, the Simulink Coder, the Embedded Coder, and the Simulink PLC Coder products from The MathWorks, Inc. of Natick, MA, and the TargetLink product from dSpace GmbH of Paderborn Germany. Exemplary code 232 that may be generated for the executable simulation model 226 includes textual source code compatible with a programming language, such as the C, C++, C#, Ada, Structured Text, Fortran, and MATLAB languages, among others. Alternatively or additionally, the generated code 232 may be (or may be compiled to be) in the form of object code or machine instructions, such as an executable, suitable for execution by a target device of an embedded system, such as a central processing unit (CPU), a microprocessor, a digital signal processor, etc. In some embodiments, the generated code 232 may be in the form of a hardware description, for example, a Hardware Description Language (HDL), such as VHDL, Verilog, a netlist, or a Register Transfer Level (RTL) description. The hardware description may be utilized by one or more synthesis tools to configure a programmable hardware device, such as Programmable Logic Devices (PLDs), Field Programmable Gate Arrays (FPGAs), and Application Specific Integrated Circuits (ASICs), among others. The generated code 232 may be stored in memory, such as a main memory or persistent memory or storage, of a data processing device.

In accordance with the present disclosure, the simulation environment 200 may include a variant implementation system 300.

It should be understood that the simulation environment 200 of FIG. 2 is intended for illustrative purposes only and that the present disclosure may be used with simulation environments having different architectures and/or additional or fewer components. For example, in some embodiments, the simulation environment 200 may include only one or more of the physical domain modeling libraries 212, 214, and 216 and not the time-based modeling library 208 or the state-based modeling library 210. Other combinations of the libraries are also possible. In some embodiments, the simulation environment 200 may include separate and/or different simulation engines for the different libraries. For example, the simulation environment 200 may include one simulation engine for executing a portion of a simulation model that includes model elements from the physical domain modeling libraries 212, 214, and 216, another simulation engine for executing a portion of a simulation model that includes model elements from the time-based modeling library 208, and yet another simulation engine for executing a portion of a simulation model that includes model elements from the state-based modeling library 210.

Figure 3:
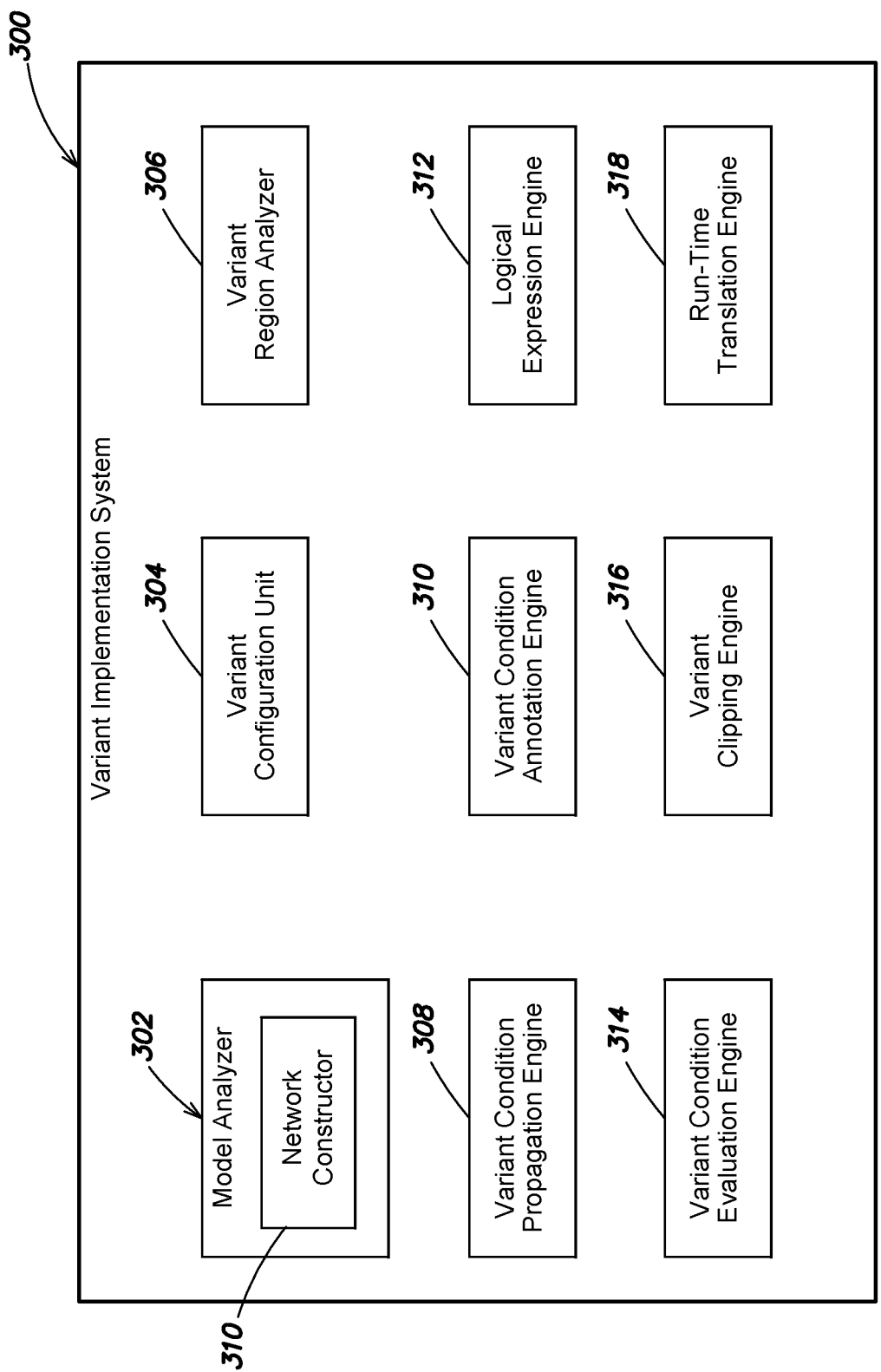
FIG. 3 is a schematic functional illustration of an example variant implementation system in accordance with one or more embodiments.

FIG. 3 is a schematic functional illustration of an example of the variant implementation system 300 in accordance with one or more embodiments. The variant implementation system 300 may include a model analyzer 302, a variant configuration unit 304, a variant region analyzer 306, a variant condition propagation engine 308, a variant condition annotation engine 310, a logical expression engine 312, a variant condition evaluation engine 314, a variant clipping engine 316, and a run-time translation engine 318. The model analyzer 302 may include a network constructor 320.

In some embodiments, the variant implementation system 300 or portions thereof may be implemented through one or more software modules or libraries containing program instructions that perform the methods described herein, among other methods. The software modules may be stored in one or more memories, such as a main memory, a persistent memory, and/or a computer readable media, of a data processing device, and may be executed by one or more processors. Other computer readable media may also be used to store and execute these program instructions, such as one or more non-transitory computer readable media, including optical, magnetic, or magneto-optical media. In other embodiments, the variant implementation system 300 or portions thereof may be implemented in hardware, for example through hardware registers and combinational logic configured and arranged to produce sequential logic circuits that implement the methods described herein. In other embodiments, various combinations of software and hardware, including firmware, may be utilized to implement the systems and methods of the present disclosure.

It should be understood that the variant implementation system 300 of FIG. 3 is intended for illustrative purposes only and that the present disclosure may be implemented in other ways. For example, one or more portions of the variant implementation 300 may be incorporated in other elements of the simulation environment 200, such as the model editor 204 and/or the simulation engine 206. In addition, elements of the variant implementation system 300 illustrated as being separate may be combined into a single element and a single element may be separated into multiple elements.

Other variant implementation systems are described in U.S. Pat. No. 8,386,222 issued Feb. 26, 2013 for Variants in Graphical Modeling Environments, U.S. Pat. No. 8,700,368 issued Apr. 15, 2014 for Variants in Graphical Modeling Environments, U.S. Pat. No. 10,521,197 issued Dec. 31, 2019 for Variant Modeling Elements in Graphical Programs, and U.S. Pat. No. 10,545,731 issued Jan. 28, 2020 for Variant Modeling Elements in Graphical Programs, which are hereby incorporated by reference in their entireties.

The model editor 204 may create a model, such as the acausal model 100. For example, in response to user inputs, the model editor 204 may open a model editor window and include model elements in the model 100. Exemplary model elements include blocks, icons, and graphical objects. At least some of the model elements may represent physical elements. For example, as noted, the physical domain modeling libraries 212, 214, and 216 may provide model element types representing physical components, that may be selected for inclusion in the model 100.

In response to additional user input, the model editor 204 may draw connection symbols, such as lines, between two or more model elements of the model 100. Connection lines may represent physical connections or links between model elements. As described, the connections may represent one or more actual physical connections. Specifically, the model elements may include connection ports configured to mimic actual physical connection points between physical components represented by the model elements. The number of connection ports included at a given model element may be determined by the number of energy flows that the model element exchanges with other model elements, and may also depend on the model element's level of idealization of the actual physical component that it represents. An energy flow may be characterized by one or more variables. For example, an energy flow may be characterized by a through variable and an across variable whose product may specify energy flow in watts. A through variable represents a value that may be measured in series to the component, while an across variable represents a value that may be measured in parallel to the component. In the rotational mechanical domain, the through variable may be force and the across variable may be angular velocity. In the electrical domain, the through variable may be current and the across variable may be voltage. The user may employ a graphical connection tool, such as a wiring tool, to establish physical connection lines among the blocks. The connections among graphical objects representing actual physical elements may define a physical topology of the system being modeled.

In response to further user inputs, the model editor 204 may include one or more Variant Connector blocks in a model, such as the acausal model 100. Variant Connector blocks may have a plurality of attributes or properties that control their behavior or operation. The variant configuration unit 304 may configure the behavior or operation of each Variant Connector block included in a model, for example in response to user inputs associating values with the block's attributes or properties. One attribute or property may indicate how many terminals a given Variant Connector block has. In some embodiments, the variant configuration unit 304 may configure a given Variant Connector block with a fixed number or terminals. In other embodiments, the variant configuration unit 304 may set the number of terminals to be programmatically determined, for example based on a rule or variable associated with the Variant Connector block.

The variant configuration unit 304 also may specify whether the open or closed setting of one or more internal connections of a Variant Connector block is conditional or unconditional. The variant configuration unit 304 may set an internal connection as unconditionally open or unconditionally closed. In some embodiments, an internal connection may be set as unconditionally open or unconditionally closed by associating a label with the internal connection and/or by a user graphically interfacing with the Variant Connector block, e.g., wiring the internal connection. In some embodiments, an internal connection may be set as conditionally open or closed by associating a logical expression with the internal connection. If the expression evaluates to True, the internal connection is closed. If it evaluates to False, the internal connection is open. An exemplary logical expression is A==1, where A is a variable.

The variant configuration unit 304 also may specify a mode of operation of a Variant Connector block. In some embodiments, the variant configuration unit 304 may configure a Variant Connector block to operate in one of three models: leaf, primary, or non-primary, e.g., secondary. The mode of operation of a Variant Connector block may be specified based on the setting of a property associated with the block, e.g., the block's Connector type property. As described, a leaf Variant Connector block may define a variant region of a model on its own, e.g., without any other Variant Connector blocks. A primary Variant Connector block may be paired with one or more non-primary Variant Connector blocks to operate cooperatively to define a variant region.

In some embodiments, a default version of a Variant Connector block includes one variant port that may be connected to a variant region and one physical port that may be connected to a common portion of the model.

Figure 9:
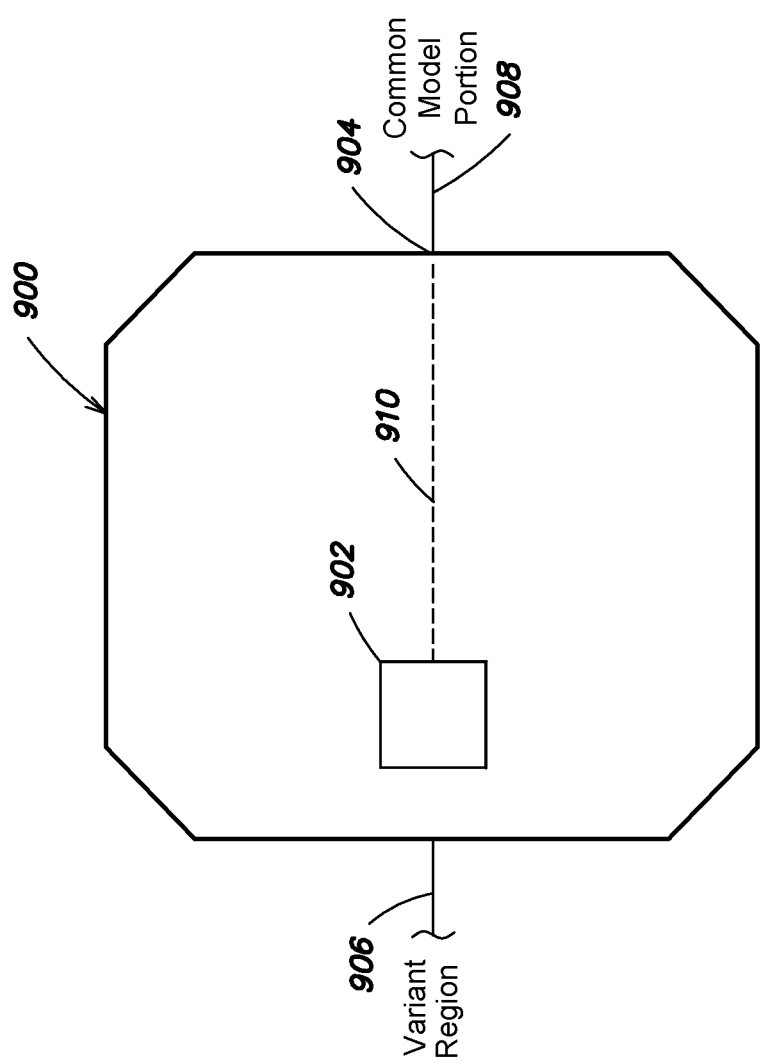
FIG. 9 is a schematic illustration of an example graphical model element for a Variant Connector block in accordance with one or more embodiments.

FIG. 9 is a schematic illustration of an example graphical block 900 for a Variant Connector block in accordance with one or more embodiments. The Variant Connector block 900, which may represent the default version of the block, may include one variant port 902 and one physical port indicated at 904. The variant port 902 may be connected to a variant region of a model as indicated by connector 906. The physical port 904 may be connected to a common portion of the model as indicated by connector 908. The Variant Connector block 900 may include an internal connection indicated at 910 between the variant port 902 and the physical port 904. As described, the internal connection 910 may be programmatically controlled to be open or closed. For example, a variant condition, such as a logical expression or a label, may be associated with the variant port 902. If the variant condition is a label, an option of the Variant Connector block may be used to set the label as active, causing the internal connection to be unconditionally closed and thus including the variant region in the model. If the variant condition is a logical expression that evaluates to True, the internal connection 910 may be closed. If the logical expression evaluates to False, the internal connection 910 may be opened. With the internal connection 910 opened, the variant region may be cut, e.g., removed, from the simulation model or it may be left dangling depending on the structure of the simulation model. Similarly, with the internal connection 910 closed, the variant region may not necessarily be included in the simulation model, for example due to the internal connection of another Variant Connector block that is also connected to that variant region being open.

In some embodiments, values of attributes or properties may be entered, e.g., by a user, through one or more User Interfaces (UIs) such as one or more property pages that may be associated with a Variant Connector block.

Figure 4:
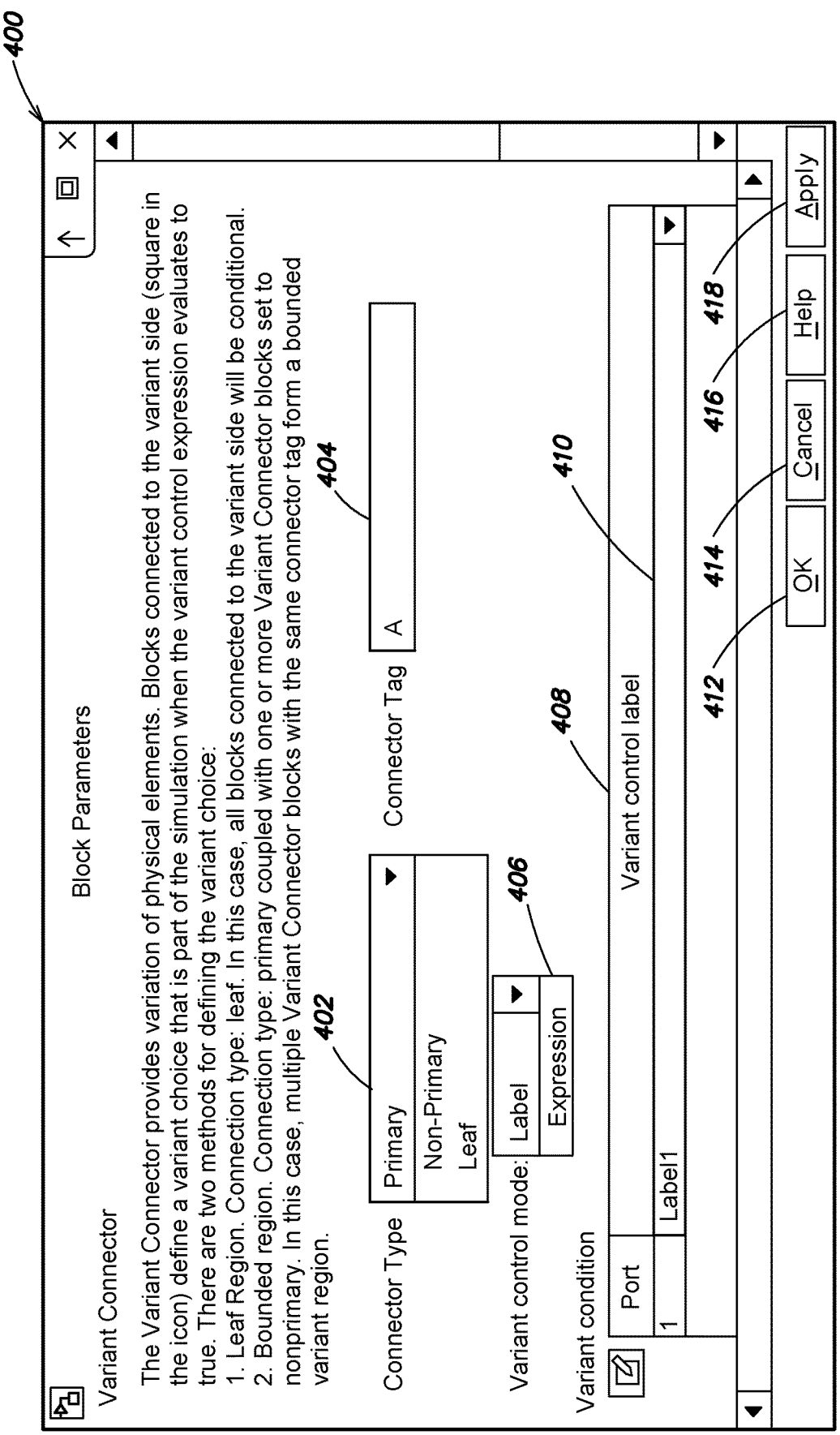
FIG. 4 is an illustration of an example User Interface (UI) in accordance with one or more embodiments.

FIG. 4 is an illustration of an example User Interface (UI) 400 in accordance with one or more embodiments. The UI 400 may be presented, e.g., on a display of a data processing device, by the UI engine 202 for a Variant Connector block included in an acausal model. The UI 400 may be presented in response to user input, e.g., selecting the Variant Connector block causing a drop down menu to be presented and selecting one of the presented commands, such as an 'Open Properties' command. The UI 400 may include a plurality of data entry fields through which values for the block's properties or attributes may be specified, e.g., by the user.

For example, the UI 400 may include a drop down menu labeled 'Connector Type' 402. In some embodiments, the variant configuration unit 304 may provide three available connector type options: Primary, Non-Primary, and Leaf. The UI 400 also may include a data entry field 404 labeled 'Connector Tag' in which an alphanumeric string may be entered.

The variant configuration unit 304 may set a Variant Connector block to be in leaf, primary, or non-primary mode based on the selections. For example, the variant configuration unit 304 may set a Variant Connector block to operate in the leaf mode in response to a user selecting the Leaf option in the Connector Type menu 402. The variant configuration unit 304 may set a Variant Connector block to operate in the primary mode in response to a user selecting the Primary option in the Connector Type menu 402 and enter a string in the Connector Tag data entry field 404. The variant configuration unit 304 may set a Variant Connector block to operate in the in non-primary, e.g., secondary, mode in response to a user selecting the Non-Primary option in the Connector Type menu 402 and entering the same string that was used to designate the associated primary block in the Connector Tag data entry field 404.

In some embodiments, other connector types may be specified.

In some embodiments, other ways may be provided to set a Variant Connector block to be in leaf, primary, or non-primary mode. For example, in some implementations only two connector types, e.g., Primary and Non-Primary, may be provided. In this case, a Variant Connector block may be set to the leaf mode in response to a user selecting the Primary option in the Connector Type menu 402 and entering a predetermined value or string in the Connector Tag data entry field 404, such as the hyphen symbol '-'.

In some embodiments, the UI 400 may include another drop down menu 406 labeled 'Variant control mode'. The variant configuration unit 304 may provide two available control mode options: Label and Expression. The UI 400 also may include a data entry field 408 labeled 'Variant Condition' for receiving information specifying labels or expressions for the variant port(s) of a Variant Connector block. The UI engine 202 may configure the data entry field 408 to receive different information depending on whether the user selected Label or Expression mode in the Variant control mode drop down menu 406. If the user selected the label mode, the UI engine 202 may provide an entry, such as entry 410, in the Variant Condition data entry field 408 for receiving a variant control label for each variant port of the Variant Connector block, e.g., 'Label 1' for variant port 1. Label mode may be used when there are more than two ports on the Variant Connector block, in which case an active label may be selected by the user from the list of available label modes. As shown in FIG. 4, the label is for the single choice and one must activate or deactivate the label. This could be achieved by adding an active choice to the dialog or programmatically setting the active choice label to either one of the specified label values or empty indicating nothing is active. On the other hand, if the user selects the expression mode, the UI engine 202 may provide an entry in the Variant Condition data entry field 408 for receiving a logical expression for each variant port of the Variant Connector block.

The UI 400 may include a plurality of command buttons for accepting or canceling the information entered in the various fields, such as an OK command button 412, a Cancel command button 414, a Help command button 416, and an Apply command button 418, whose functionality is well understood.

Referring to FIG. 1, a user may open properties pages for the Variant Connector blocks 114-117 and enter values for configuring them.

Figure 5:
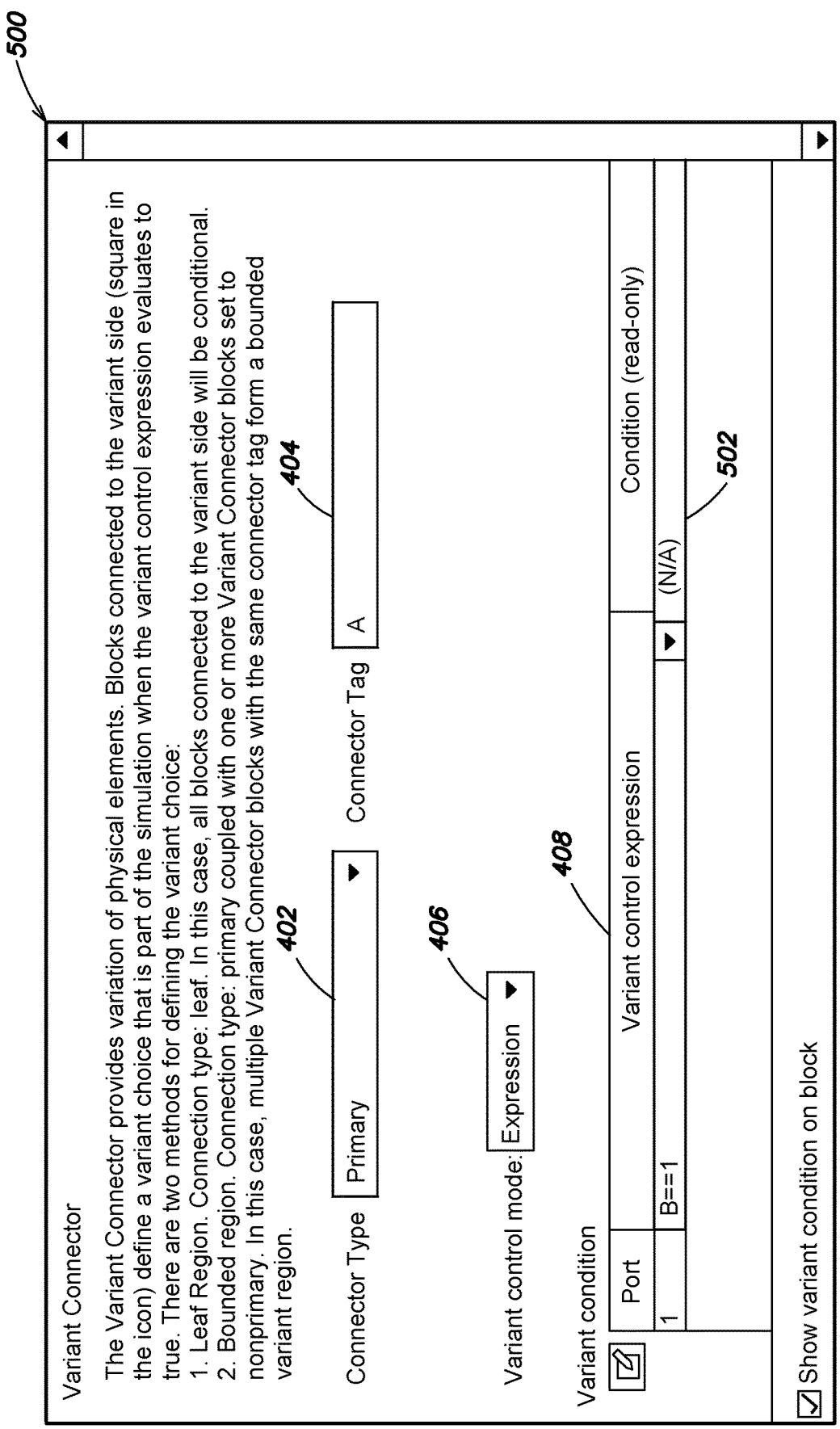
FIG. 5 is an example UI in accordance with one or more embodiments.

FIG. 5 is an example UI 500 for the Variant Connector block 116 (FIG. 1), which is highlighted, in accordance with one or more embodiments. The Connector Type drop down menu 402 may be set to Primary and the Connector Tag data entry field 404 may be set to an identifier of the programming language and/or simulation environment, e.g., the MATLAB programming language, such as string 'A'. Alternatively, the Connector Tag can be any string independent of any programming language and is used to form an association between a primary and one or more non-primary Variant Connector blocks. The Variant control model drop down menu 406 may be set to Expression. The UI engine 202 may configure the Variant Condition data entry field 408 to receive a logical expression for the variant port of the Variant Connector block 116. As illustrated, the expression for variant port 1 of the Variant Connector block 116 is set as B==1, where 'B' is a variable. A logical expression defined for a variant port, e.g., B==1, may be referred to as a variant control expression, and the variables of the expression, e.g., 'B', may be referred to as variant control variables.

For the Variant Connector block 117, its Connector type may be set Non-primary and its Connector tag may be set to B. In this way a user may designate the Variant Connector block 117 as a non-primary block that is associated with the primary Variant Connector block 116. Furthermore, a variant condition may be defined one time, e.g., at the primary Variant Connector block, and this variant condition may be propagated automatically to the non-primary Variant Connector blocks paired with that primary Variant Connector block by the variant configuration unit 304. Such automatic propagation of variant conditions eliminates modeling errors that could arise if a user were required to manually configure the exact same variant condition individually at multiple Variant Connector blocks. Nonetheless, in other embodiments, the variant implementation system 300 may not provide primary and non-primary Variant Connector blocks and a user may be required to manually configure variant conditions at Variant Connector blocks to define variant regions.

The variant port of the Variant Connector block 114 may be associated with a variant condition, e.g., a label or a logical expression, for determining whether the block's internal connection is open or closed. Furthermore, the Variant Connector block 115 may be associated with and utilize the same variant condition as the Variant Connector block 114. For example, the Variant Connector block 114 may be a primary and the Variant Connector block 115 may be an associated non-primary or secondary block. Accordingly, depending on the variant condition, which is same for the two Variant Connector blocks 114 and 115, their internal connections will be in the same state, e.g., either open or closed.

The UIs presented herein are for explanation purposes and values of properties and attributes of Variant Connector blocks may be set through other UIs and/or in other ways. For example, one or more properties and/or attributes may alternatively or additionally be specified through a Command Line Interface (CLI), Application Programming Interfaces (API), etc. Furthermore, other UIs may include fewer, other and/or additional elements, such as check boxes, radio buttons, etc., and/or the described elements may be arranged in different ways.

For example, in some embodiments, the variant implementation system 300 may support expression, but not label mode. In this case, the variant control mode drop down menu 406 may be omitted from the UI, as only expression mode is provided. In addition, if Leaf mode is selected as the connector type in the drop down menu 402, then the connector tag field 404 may be omitted from the UI. Furthermore, if the Non-Primary mode is selected as the connector type in the drop down menu 402, then the connector tag field 404 may be included, but the variant condition data entry field 408 may be omitted, since the variant condition may be specified in the UI for the associated Primary Variant Connector block.

The variant implementation system 300 may evaluate an acausal model, identify variant regions and the variant choice(s) included therein, and determine which of the variant choices are active and inactive for a given execution of the model and/or a given code generation process. In some embodiments, the variant implementation system 300 may perform this functionality as part of the compilation of the model or in response to a request to update the model. In some embodiments, the variant implementation system 300 may perform this functionality as part of the execution of the model, for example it may perform this functionality as part of an initialization phase of model execution, or as part of an initialization phase of the code generation process.

In some embodiments, the variant implementation system 300 may process each of the Variant Connector blocks included in a model to determine its type and to propagate variant conditions to the model elements included in variant regions defined by the Variant Connector blocks.

The flow diagrams described herein are for illustrative purposes only. In some embodiments, one or more of the illustrated steps may be omitted, additional steps may be added, the order of the illustrated steps may be changed, one or more illustrated steps may be subdivided into multiple steps, multiple illustrated steps may be combined into a single step, and/or one or more of the flow diagrams may be separated into multiple, distinct flow diagrams. In addition, for purposes of explanation, the present disclosure may make reference to visual depictions of simulation models presented on a display of a data processing device. Nonetheless, it should be understood that the simulation environment 200 and the variant implementation system 300 may operate on one or more in-memory representations of a simulation model, such as an Intermediate Representations (IR) and/or a physical network constructed for a simulation model. An IR or a physical network may include structures representing the blocks shown on a visual depiction of a model. The one or more IRs and/or physical networks may be implemented as one or more data structures and loaded and/or created in memory, e.g., volatile or non-volatile memory of a data processing device.

FIGS. 6A-D are partial views of a flow diagram of an example method in accordance with one or more embodiments. The model analyzer 302 may analyze an acausal model, such as the model 100, or a portion thereof to determine the model's structure, as indicated at step 602. For example, the network constructor 320 of the model analyzer 302 may construct or access an in-memory representation of the model 100 that includes information concerning the model elements, e.g., blocks, included in the model 100 and the connections among those blocks, as indicated at step 604. The in-memory representation may include nodes corresponding to model elements of the model 100 and edges corresponding to the connections among the model elements. Portion of the in-memory representation may correspond to variant regions included in the model 100. The in-memory representation may be implemented in one or more data structures, such as a linked list, and stored in computer memory, such as volatile or persistent memory.

Figure 6A:
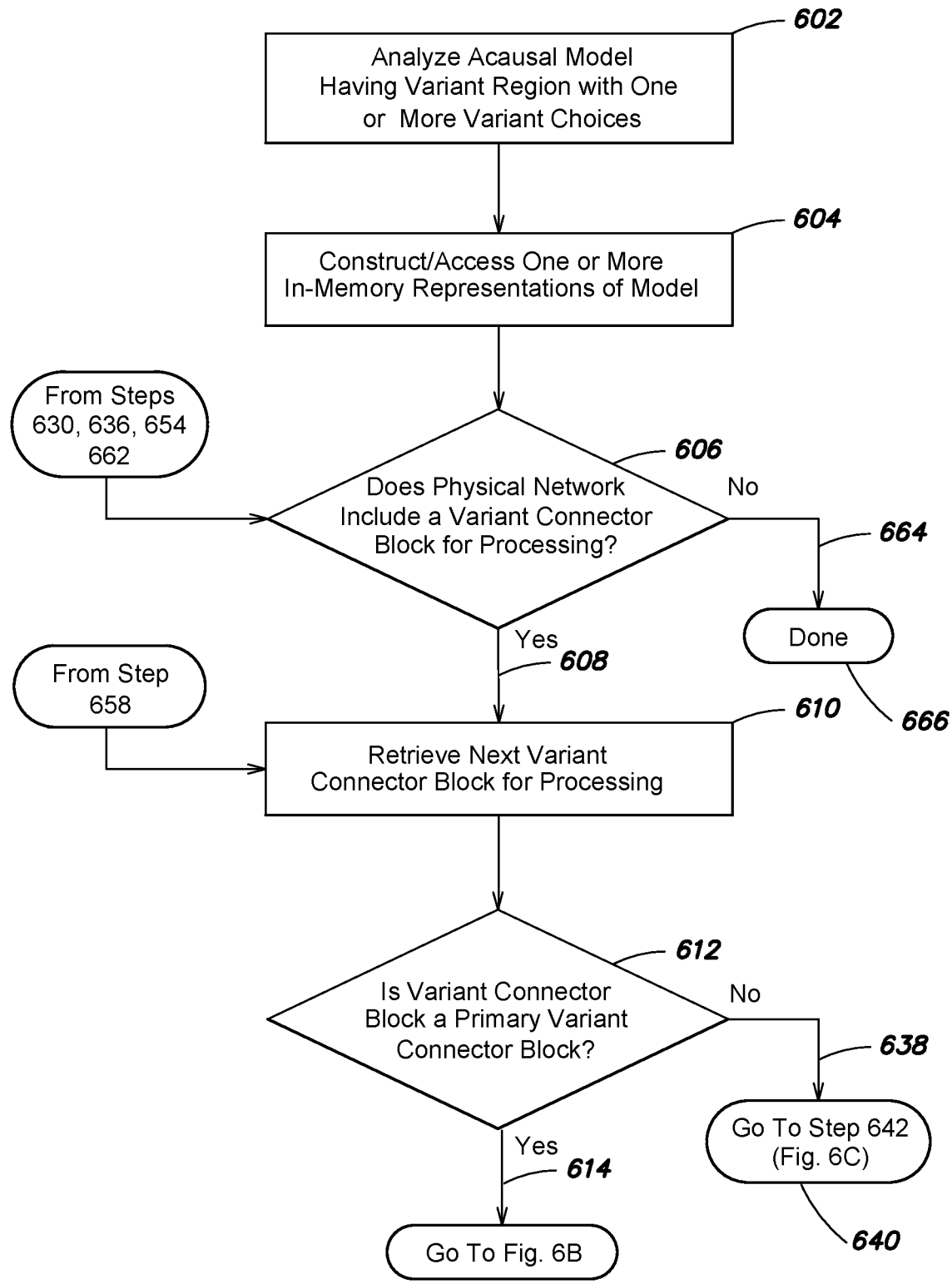
FIGS. 6A-D are partial views of a flow diagram of an example method in accordance with one or more embodiments.
Figure 6B:
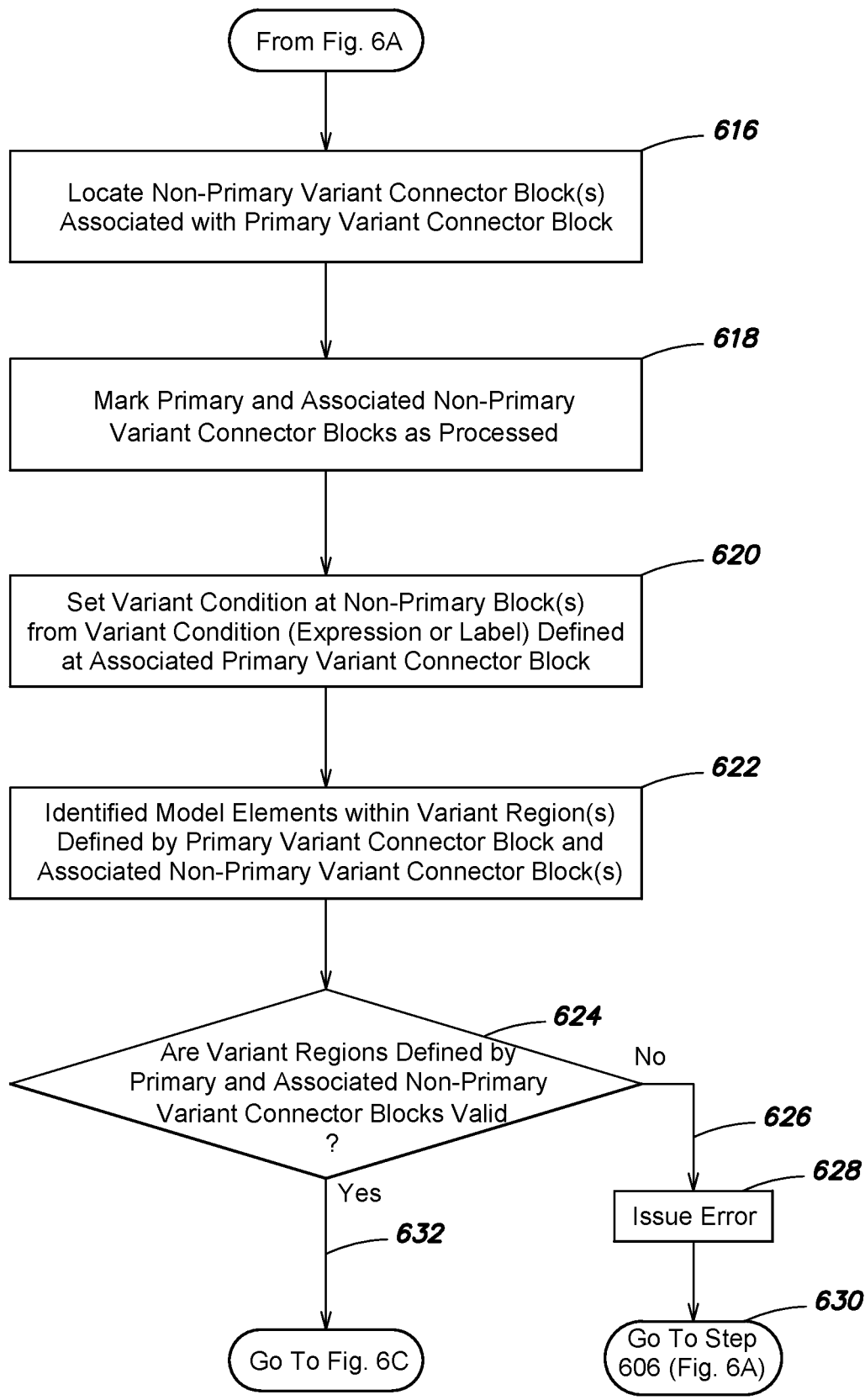

The model analyzer 302 may search the in-memory representation and determine whether there is a Variant Connector block of the model to be processed, as indicated at decision step 606. If so, the model analyzer 302 may access a next Variant Connector block for processing, as indicated by Yes arrow 608 leading to step 610. The variant region analyzer 306 may determine whether the Variant Connector block is configured as a primary Variant Connector block, as indicated by decision step 612. If so, the variant region analyzer 306 may locate the non-primary Variant Connector block(s) that are associated with the primary Variant Connector block being analyzed, as indicated by Yes arrow 614 leading to step 616 (FIG. 6B). As described, one or more non-primary Variant Connector blocks may be paired with a primary Variant Connector block to define a variant region of a simulation model. The variant region analyzer 306 may mark metadata associated with the primary and associated non-primary Variant Connector blocks as processed, as indicated at step 618. The variant configuration unit 304 may set the variant conditions at the associated non-primary Variant Connector block(s) to the same variant condition (expression or label) as at the primary Variant Connector block, as indicated at step 620. The variant region analyzer 306 may identify the model elements of the acausal model within the variant region(s) defined by the primary and associated non-primary Variant Connector blocks, as indicated at step 622.

The variant region analyzer 306 may determine whether the variant region(s) defined by the primary and associated non-primary Variant Connector blocks are valid as indicated at decision step 624. For example, the variant region analyzer 306 may determine whether the model elements of the variant regions(s) conform to the same modeling domain as model elements connected to the variant region(s) by the primary and associated non-primary Variant Connector blocks. Referring to FIG. 1, the variant region analyzer 306 may determine that the variant regions 130 and 132 defined by the Variant Connector blocks 114-117 operate in an electrical circuit modeling domain. For example, the variant region analyzer 306 may evaluate the model elements included in the variant regions 130 and 132, e.g., the resistor blocks 109-112, and determine, for example based on metadata associated with the model elements, that they are associated with an electrical modeling domain. The variant region analyzer 306 may further determine that the Variant Connector blocks 114-117 connect the model elements included in these variant regions to other model elements also operating in the electrical modeling domain, e.g., the AC voltage source block 102, the Ground block 104, the Solver Configuration block 106, and the Resistor block 108 (R1). Accordingly, the variant region analyzer 306 may determine that the variant regions 130 and 132 are valid. The determination of whether model portions connected across a Variant Connector block are valid may be performed during edit time of a model.

If a mismatch in domains is detected, for example, the model elements of the variant region are part of a physical modeling domain while model elements connected thereto through the primary and associated non-primary Variant Connector blocks are part of a time-based modeling domain, the variant region analyzer 306 may issue a warning or error message, as indicated by No arrow 626 leading to step 628. In some embodiments, processing may return to decision step 606 (FIG. 6A) as indicated by Go To step 630. In other embodiments, processing of the model's Variant Connection blocks may be stopped upon detecting an invalid connection of a variant region to a model.

In some embodiments, the variant region analyzer 306 may validate model portions interconnected by a Variant Connector block at model edit time. For example, it may check for mismatches as model elements are connected to a Variant Connector block's variant ports and physical ports. For example, if a variant port of a Variant Connector block is connected to a model element operating in an electrical modeling domain, the variant region analyzer 306 may determine whether the physical port also connects to a model element operating in the electrical modeling domain. If the variant region analyzer 306 detects a mismatch in the modeling domains connected by an internal connection, it may direct the UI engine 202 to issue a warning or error message to the user.

Figure 6C:
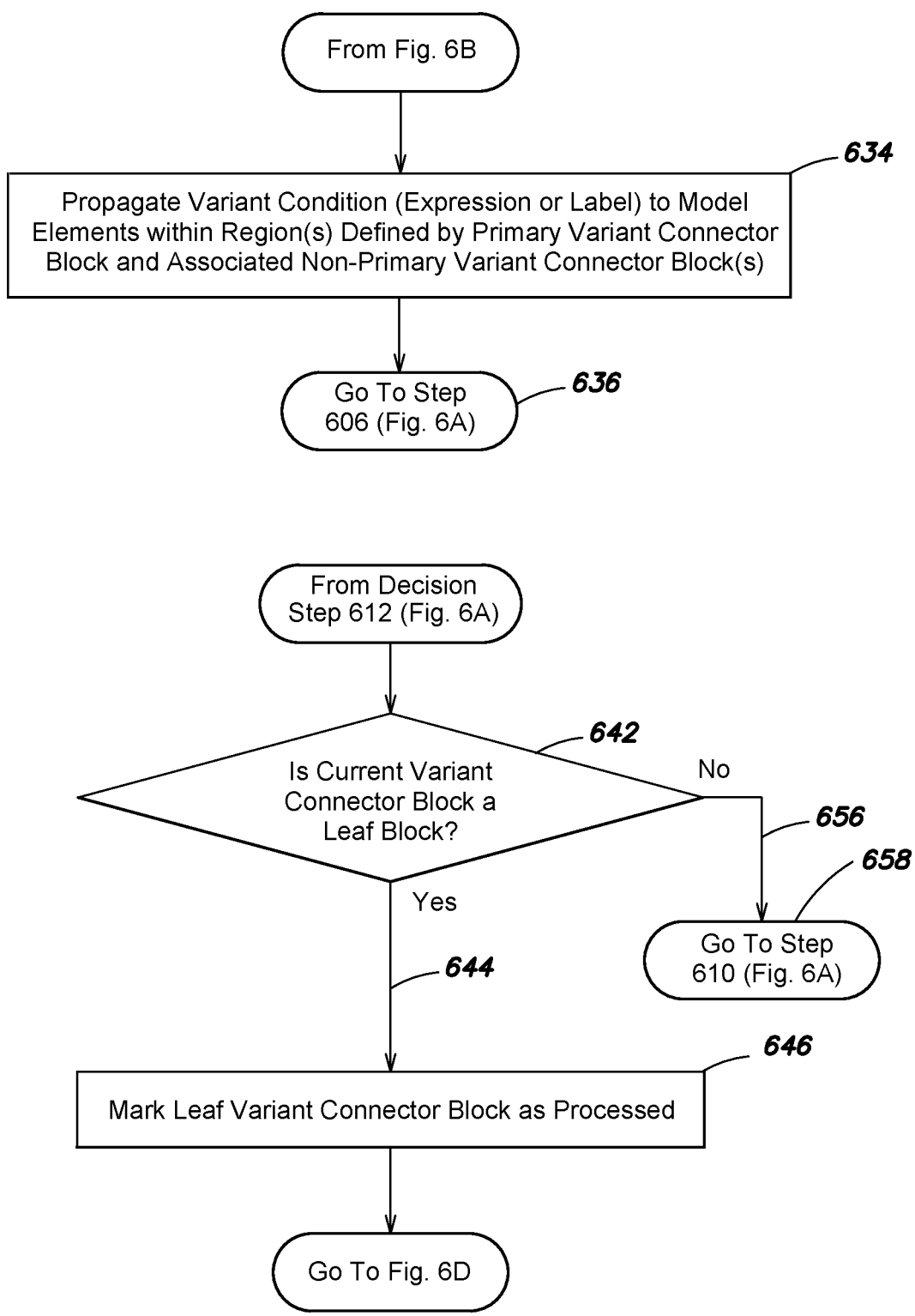

Returning to decision step 624, if the variant regions are valid, the variant condition propagation engine 308 may propagate the variant condition defined for the primary Variant Connector block to the model elements of the variant region(s), as indicated by Yes arrow 632 leading to step 634 (FIG. 6C). Processing may then return to decision step 606, as indicated by Go To step 636. In some embodiments, the network constructor 320 may include variant condition information in the network constructed for an acausal model and/or associate variant condition information with the network. For example, the network constructor 320 may associate variant condition information with the edges of the network connected to variant ports of Variant Connector blocks included in the acausal model. In addition, the variant condition propagation engine 308 may propagate this information from the edges connected to variant ports of Variant Connector blocks to the variant regions defined by those Variant Connector blocks. For example, the variant condition propagation engine 308 may propagate the variant conditions to nodes of the network that represent model elements included in the variant regions defined by the Variant Connector blocks. The network constructor 320 may associate the propagated variant condition information with the nodes representing the model elements.

Assuming the model includes another Variant Connector block for processing, it may be retrieved as indicated at step 610 and analyzed as indicated at decision step 612. Suppose the current Variant Connector block being processed is not a primary Variant Connector block. The variant region analyzer 306 may determine whether the Variant Connector block is a leaf Variant Connector block, as indicated by No arrow 638 leading via Go To step 640 to decision step 642 (FIG. 6C). If so, the variant region analyzer 306 may mark the leaf Variant Connector block as processed, as indicated by Yes arrow 644 leading to step 646.

Figure 6D:
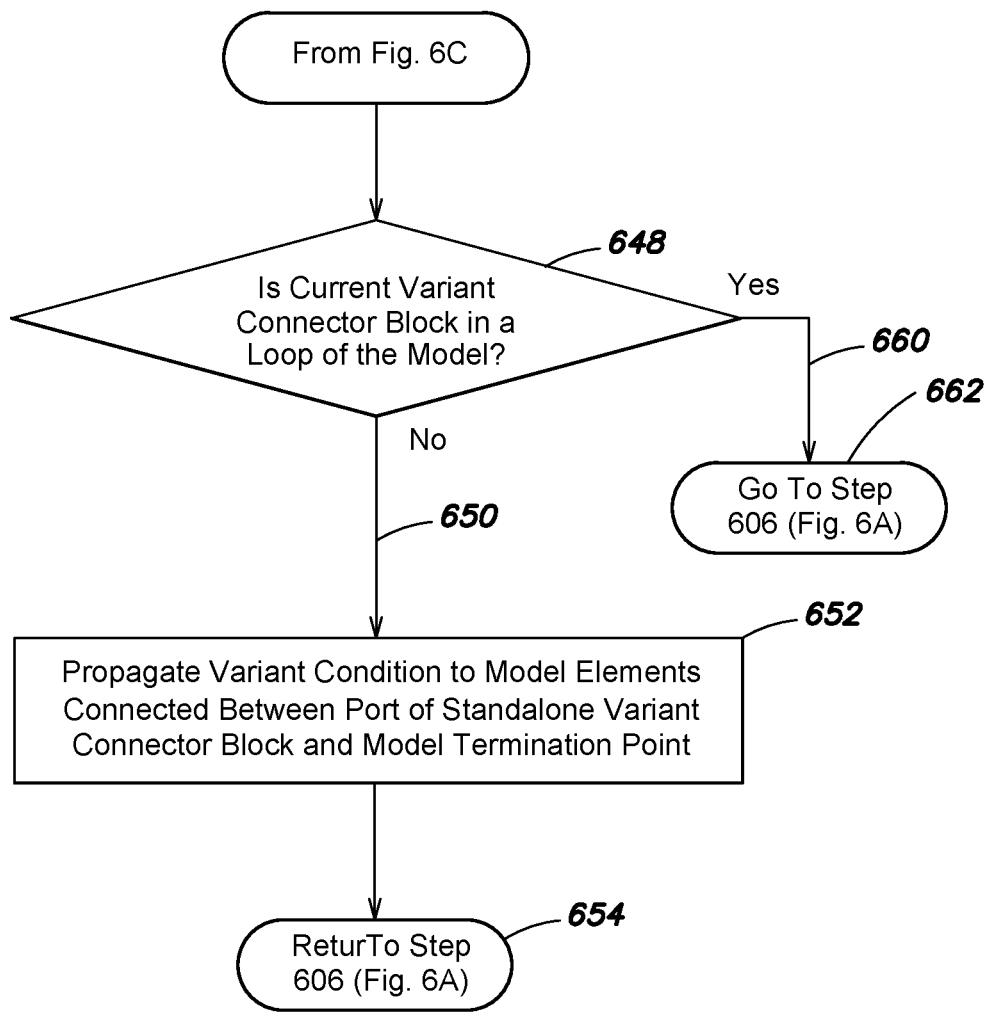

The variant region analyzer 306 may determine whether the leaf Variant Connector block is in a loop of the acausal model, as indicated at decision step 648 (FIG. 6D). For example, the model analyzer 302 may trace the blocks connected to the variant port(s) of the leaf Variant Connector block and determine if those model elements end at termination point(s) of the acausal model, e.g., are part of a branch of the in-memory representation , or loop back to a physical port of the Variant Connector block. If the Variant Connector block is not within a loop, then the Variant Connector block defines a variant region and the variant condition propagation engine 308 may propagate the variant condition to the model elements included on the branch, as indicated by No arrow 650 leading to step 652. Processing may then return to step 606, as indicated by Go To step 654.

Returning to decision step 642 (FIG. 6C), if the Variant Connector block currently being processed is not a leaf block, then it must be a non-primary because it was previously determined not to be a primary at decision step 612. In this case, there should be a primary Variant Connector block associated with the current non-primary that still needs to be processed. Accordingly, from decision step 642, processing may return to step 610 (FIG. 6A) as indicated by No arrow 656 leading to Go To block 658.

Returning to decision step 648 (FIG. 6D), if the leaf Variant Connector block being processed is in a loop of the model, then it may not define a variant region. In this case, the leaf Variant Connector block's variant condition may not be propagated to any model elements and the variant configuration unit 304 may issue one or more diagnostic messages to the user informing him or her of this condition as it may be a modelling error. The variant region analyzer 306 may then search for a next Variant Connector block for processing, as indicated by Yes arrow 660 leading to Go To step 662.

Returning to decision step 606, once the variant implementation system has processed all of the Variant Connector blocks included in the acausal model, processing may be finished, as indicated by No arrow 664 leading to Done step 666.

In preparation for executing an acausal model or generating code for an acausal model, the variant implementation system 300 may evaluate variant conditions at Variant Connector blocks and as propagated to model elements of the acausal model. The variant implementation system 300 may determine which variant regions are inactive and may cut those variant regions from an in-memory representation of the acausal model. A physical network may then be constructed from the in-memory representation and the in-memory representation may be used to execute the model and/or generate code for the model. In some embodiments, this functionality may be performed during a run-time phase of the model.

Figure 7A:
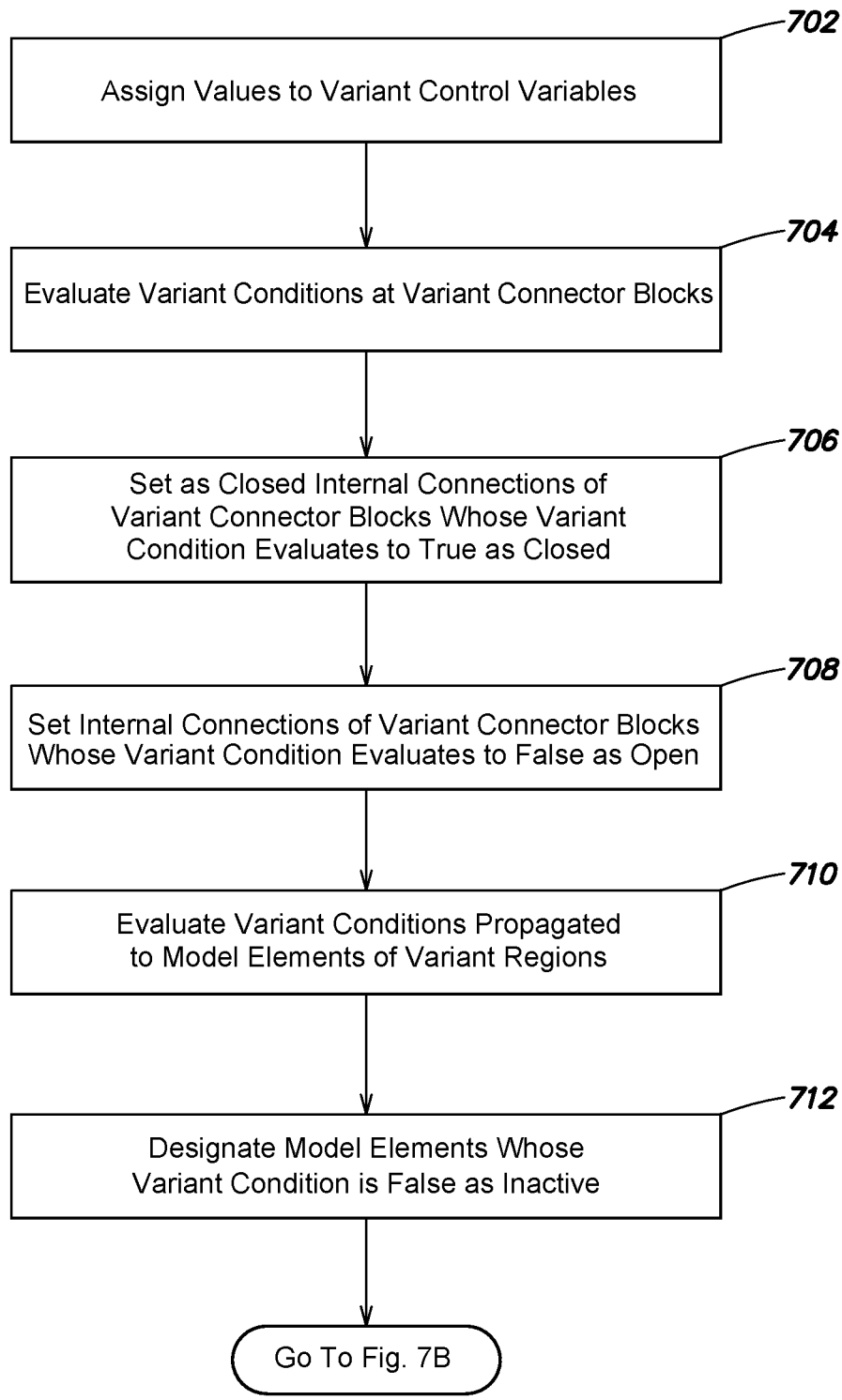
FIG. 7A-B are partial views of a flow diagram of an example method in accordance with one or more embodiments.
Figure 7B:
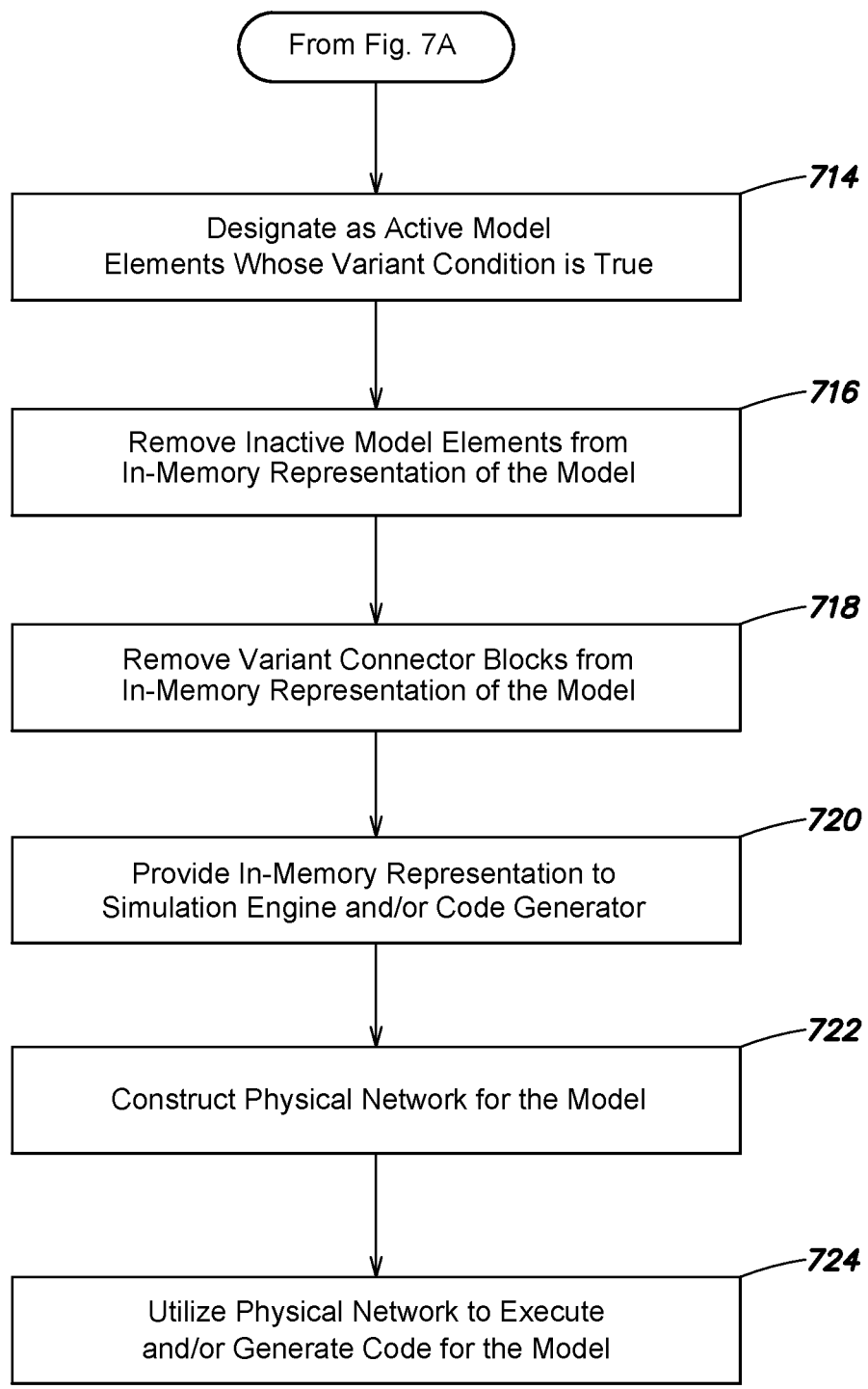

FIGS. 7A-B are partial views of a flow diagram of an example method in accordance with one or more embodiments. The variant condition evaluation engine 314 may assign values to variant control variables, as indicated at step 702. The values may be provided by a user, for example through one or more graphical affordances. As described, variant conditions may be logical expressions used to identify an active variant region, and the logical expressions may include one or more variant control variables. Values for variant control variables may be user-specified, for example in a workspace assigned to a model. For example, the simulation environment 200 may provide each model opened in the simulation environment 200, e.g., loaded from persistent memory into volatile memory, with its own model workspace that may be limited in scope to the respective model. Values for variables utilized by the model, such as variant control variables, may be stored in a global workspace, such as the base workspace or a data dictionary of the MATLAB programming language. The UI engine 202 may present a graphical affordance, such as an interactive pane of the model editor window 120, listing variables defined for the model and through which a user may examine and set values for the model's variables. These variables may also be stored in the workspace of a masked subsystem. Storing variables, such as variant control variables, in the workspace of a masked subsystem may provide better controllability of the subsystem and/or provide users the ability to fine tune variant selection. Placing a mask on a subsystem is a means by which to parametrize the subsystem. In the mask, a user may define parameters, a dialog interface, and a new icon for the subsystem. The parameters can be variant control variables. An advantage of using masks with variant control variables as parameters is that different instances of the subsystem can have different values for the variant control variables, thereby increasing reusability of the subsystem.

The variant condition evaluation engine 314 may evaluate variant conditions associated with the variant ports of the Variant Connector blocks included in the model, as indicated at step 704. As described, in some embodiments, variant conditions will evaluate to True or False. The variant condition evaluation engine 314 may set as closed the internal connections at variant ports of Variant Connector blocks whose variant conditions evaluate to True, as indicated at step 706. The variant condition evaluation engine 314 may set as open the internal connections at variant ports of Variant Connector blocks whose variant conditions evaluates to False, as indicated at step 708. The variant condition evaluation engine 314 may evaluate variant conditions that were propagated to model elements of variant regions, as indicated at step 710. The variant condition evaluation engine 314 may designate model elements whose variant condition evaluated to False as inactive, as indicated at step 712. The variant condition evaluation engine 314 may designate model elements whose variant condition evaluated to True as active, as indicated at step 714 (FIG. 7B). The variant clipping engine 316 may remove model elements designated as inactive from an in-memory representation of the acausal model, as indicated at step 716. The variant clipping engine 316 may remove the Variant Connector blocks from the in-memory representation, as indicated at step 718. The variant clipping engine 316 may also connect the model elements that had been connected by the now removed Variant Connector blocks and inactive model elements. The variant implementation system 300 may provide the in-memory representation as modified to the simulation engine 206 and/or the code generator 228, as indicated at step 720. The simulation engine 206 may construct a physical network for the model based on the in-memory representation, as indicated at step 722. The simulation engine 206 may utilize the physical network to execute the model and/or the code generator 228 may utilize the physical network to generate code for the model, as indicated at step 724.

It should be understood that the variant clipping engine 316 may modify an existing in-memory representation, for example by removing elements representing Variant Connector blocks as well as elements representing model elements that are inactive. In other embodiments, the variant clipping engine 316 may construct an in-memory representation that does not include elements representing Variant Connector blocks and inactive model elements. In yet other embodiments, the variant implementation system 300 may operate directly on one or more physical networks constructed for a model.

Referring to FIG. 1, suppose a user desires to utilize the acausal model 100 to simulate a circuit that does not includes resistors R4 and R5. In this case, the user may set the variant control variable 'B' to a value other than '1', such as '0'. As described, the variant condition propagation engine 308 may propagate the variant condition defined for the primary Variant Connector block 116, e.g., B==1, to the model elements of the variant region 132, e.g., Resistor blocks 111 and 112 (R4 and R5). With the variant control variable 'B' set to '0', the variant condition evaluation engine 314 may determine that the variant expression 'B==1', evaluates to False. Accordingly, the variant condition evaluation engine 314 may designate the model elements of the variant region 132, e.g., Resistor blocks 111 and 112 (R4 and R5), as inactive. The variant clipping engine 316 may remove the Resistor blocks 111 and 112 (R4 and R5) from the model 100 and/or from a physical network generated for the model 100.

Figure 8:
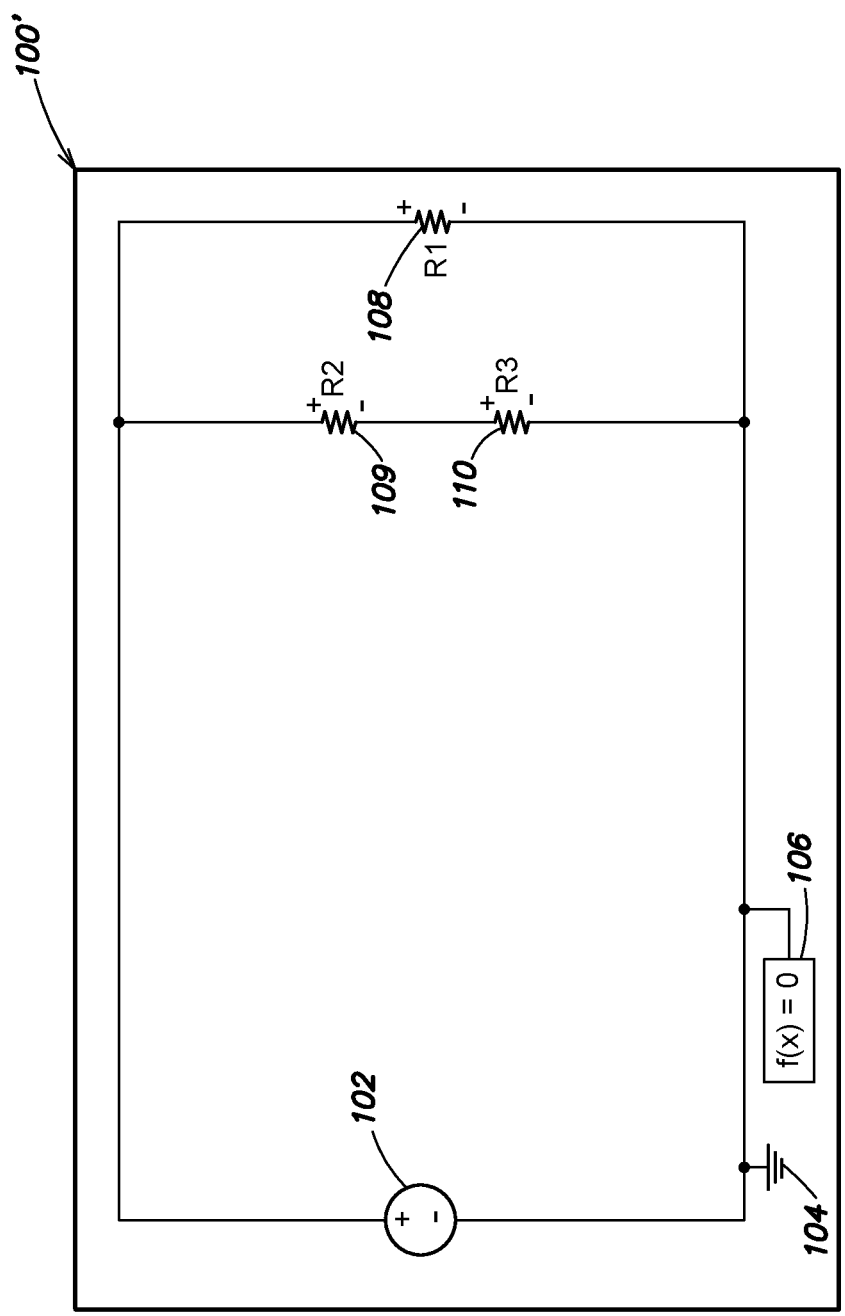
FIG. 8 is an illustration of an example variation of an executable physical model in accordance with one or more embodiments.

FIG. 8 is an illustration of an example variation 100' of the executable physical model 100 of FIG. 1 in accordance with one or more embodiments. As illustrated, the variant clipping engine 316 removed the inactive variant region 132 (FIG. 1) and all of the Variant Connector blocks 114-117. The active variant region 130, which includes Resistor blocks 109 and 110 (R2 and R3), is present. In addition, the variant clipping engine 316 replaces the Variant Connector blocks 114 and 115 with direct connections, e.g., wires. As described, the variant implementation system 300 produces the variant model 100' without the user deleting any model elements from the model 100 and without creating a new model. Indeed, the model 100 is preserved.

The variant model 100' may be executed, which may also be referred to as solving the model. Model execution may be initiated through user input or programmatically. For example, the Run button 128 may be selected by the user to execute the model. The UI engine 202 may also provide or support a Command Line Interface (CLI) that may receive a text-based run command entered by the user. In response to the user selecting the Run button 128 or entering the run command, the simulation engine 206 may execute or simulate the model 100', and may output results produced by the model's execution, for example, to the user via a display.

To solve an acausal model, the simulation engine 206 may perform a plurality of steps, for example the simulation engine 206 may validate the variant model 100', construct a physical network based on the structure of the model 100', construct a system of equations for the model 100', compute initial conditions, perform a transient initialization to produce a set of initial conditions, and perform a transient solve of the system of equations. The transient initialization and transient solve steps may be repeated. A suitable acausal model execution process is described in *Simscape User's Guide* (September 2019 ed.) from The MathWorks, Inc., which is hereby incorporated by reference in its entirety. The simulation engine 206 may be configured to solve the model 100' by generating a state space model that represents the system being modeled as a set of input, output and state variables related by first order differential equations. In addition, the simulation may utilize one or more of the solvers 226.

The UI engine 202 may also provide or support a Code Generation button in the model editor 120 that may be selected by the user, or the UI engine 202 may receive a code generation command entered by the user, e.g., in the GUI or the CLI. The code generation command also may be invoked programmatically, for example, when a particular event occurs, such as a model passing verification, etc. In response to the code generation command being activated, the code generator 228 may generate code for the model 100', and may store the generated code in memory.

As described, a Variant Connector block as provided by one or more of the libraries 212, 214, and 216 may, by default, include one variant port and one physical port. Nonetheless, the variant configuration unit 304 may modify a Variant Connector block included in a model to have more than one variant port and/or more than one physical port. For example, in response to user input, the variant configuration unit 304 may configure a Variant Connector block to have two or more variant ports and/or two or more physical ports.

Figure 10:
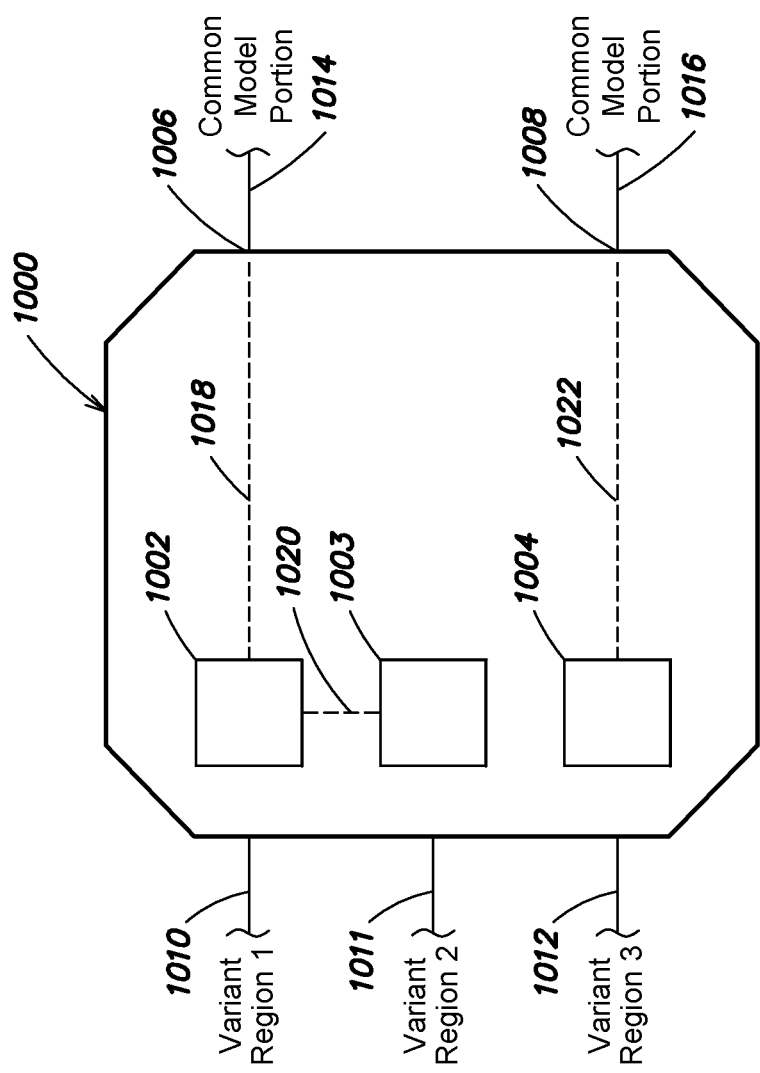
FIG. 10 is a schematic illustration of another example graphical model element for a Variant Connector block in accordance with one or more embodiments.

FIG. 10 is a schematic illustration of an example graphical block 1000 for a Variant Connector block in accordance with one or more embodiments. The variant configuration unit 304 may configure the Variant Connector block 1000 to include three variant ports 1002-1004 and two physical ports 1006 and 1008. The three variant ports 1002-1004 may be connected to variant regions of the model as indicated by connectors 1010-1012. The physical ports 1006 and 1008 may be connected to common portions of the model as indicated by connectors 1014 and 1016. In some embodiments, the variant ports 1002-1004 may be connected to different variant choices included in a single variant region.

The variant configuration unit 304 may also configure the Variant Connector block 1000 to include an internal connection 1018 between the variant port 1002 and the physical port 1006, an internal connection 1020 between the variant port 1002 and the variant port 1003, and an internal connection 1022 between the variant port 1004 and the physical port 1008. The variant configuration unit 304 may associate a variant condition with each of the variant ports 1002-1004 for controlling the internal connections 1018, 1020, and 1022. If the variant condition evaluation engine 314 determines that the variant condition associated with the variant port 1002 is True, then the variant region connected by the connection 1010 may be active and the internal connection 1018 may be closed thus including the variant region in the model. If the variant condition evaluation engine 314 determines that the variant condition associated with the variant port 1003 is True and the variant condition associated with the variant port 1002 is also True, then the variant regions connected by the connections 1010 and 1011 may both be active and the internal connections 1020 and 1018 may be closed thus including the two variant regions in the model. If the variant condition evaluation engine 314 determines that the variant condition associated with the variant port 1003 is True, but the variant condition associated with the variant port 1002 is False, then neither of the variant regions connected by the connections 1010 and 1011 may be active because, even though the internal connection 1020 may be closed, the internal connection 1018 may be open. If the variant condition evaluation engine 314 determines that the variant condition associated with the variant port 1004 is True, then the variant region connected by the connection 1012 may be active and the internal connection 1022 may be closed thus including the variant region in the model.

Figure 21:
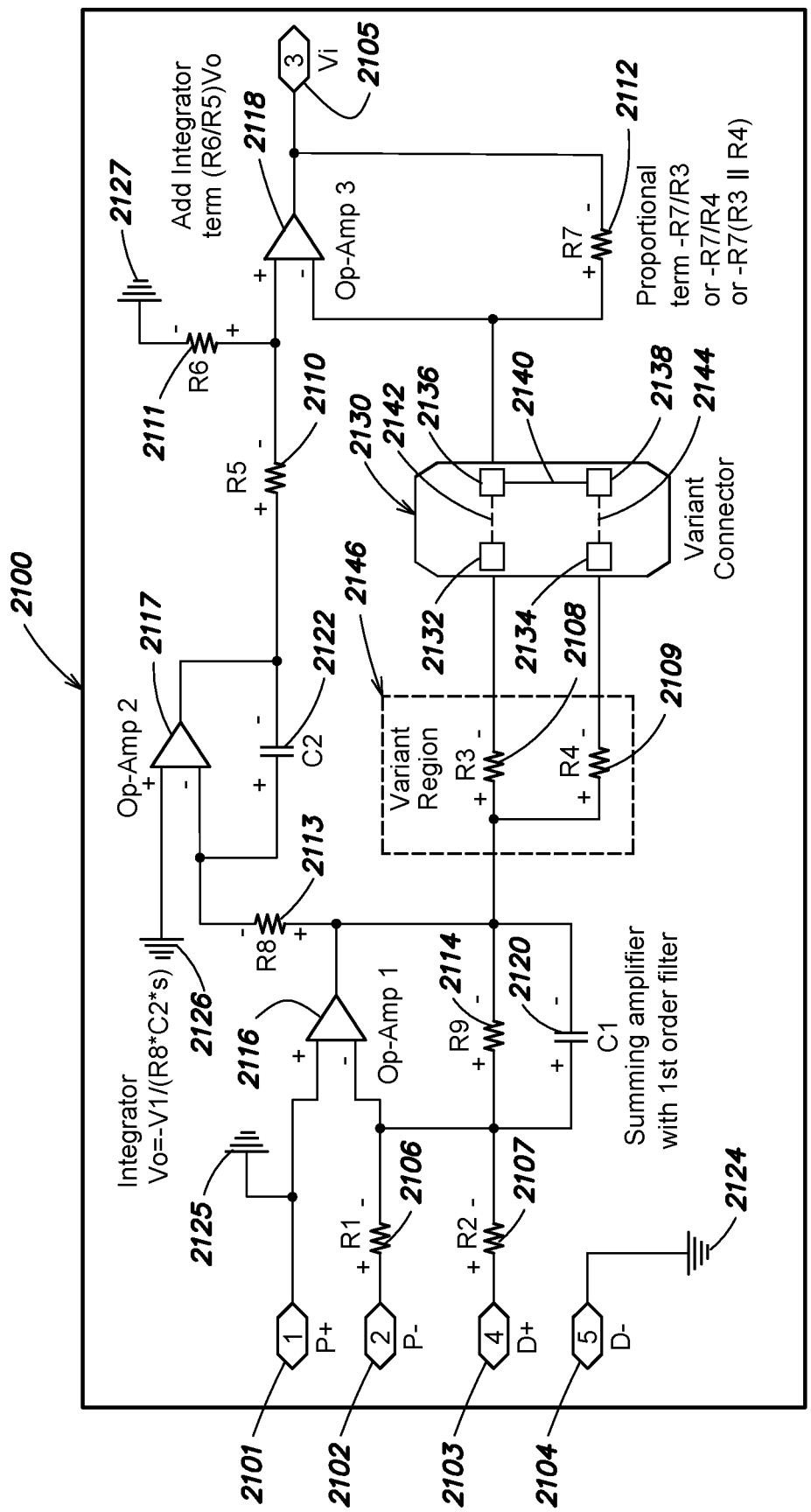
FIG. 21 is an illustration of an example executable physical model in accordance with one or more embodiments.

FIG. 21 is an illustration of an example executable physical model 2100 of an electrical circuit in accordance with one or more embodiments. The model 2100 may simulate a circuit for a Proportional Integral (PI) controller. The model 2100 may include five Connection Port blocks 2101-2105, nine Resistor blocks 2106-2114, three Operation Amplifier (Op-Amp) blocks 2116-2118, two Capacitor blocks 2120 and 2122, and five Ground blocks 2124-2127.

The model 2100 further includes a Variant Connector block 2130, which may be configured to operate in leaf mode. The Variant Connector block 2130 may include two variant ports 2132 and 2134 connected to Resistor blocks 2108 and 2109, respectively. The Variant Connector block 2130 may further include two physical ports 2136 and 2138. The physical port 2136 is connected to the Op-Am 2118 and the Resistor block 2112 and the physical port 2138 is connected to the other physical port 2136 by a closed internal connection 2140. The variant port 2132 is connected to the physical port 2136 by an internal connection 2142 that may be programmatically configured to be open or closed. The variant port 2134 is connected to the physical port 2138 by an internal connection 2144 that may be programmatically configured to be open or closed. The Variant Connector block 2130 defines a variant region 2146 that includes three variant choices so that the one simulation model 2100 may be used to simulate three different proportional terms of a PI controller circuit. One variant choice combines the Resistor block 2108 (R3) with the Resistor block 2112 (R7) to form the proportional term. This variant choice is achieved by closing the internal connection 2142. Another variant choice combines the Resistor block 2109 (R4) with the Resistor block 2112 (R7) to form the proportional term. This variant choice is achieved by closing the internal connection 2144. Yet another variant choice combines both Resistor block 2108 (R3) and 2109 (R4) in parallel with the Resistor block 2112 (R7) to form the proportional term. This variant choice is achieved by closing both internal connections 2142 and 2144.

Variant conditions may be associated with the variant ports 2132 and 2134. Evaluation of these variant conditions for a given execution of the model 2100 or a given code generation process determines the proportional term utilized for the given execution or code generation process. As illustrated, one or more Variant Connection blocks, such as the Variant Connector block 2130, may be utilized to define a variant region having multiple variant choices.

In some embodiments, the variant implementation system 300 may present information regarding variant conditions associated with Variant Connector blocks and/or variant conditions propagated to model elements of variant regions of an acausal model. For example, the variant condition annotation engine 310 may direct the UI engine 202 to display one or more graphical affordances presenting variant condition information, for example at a visual depiction of an acausal model.

Figure 11:
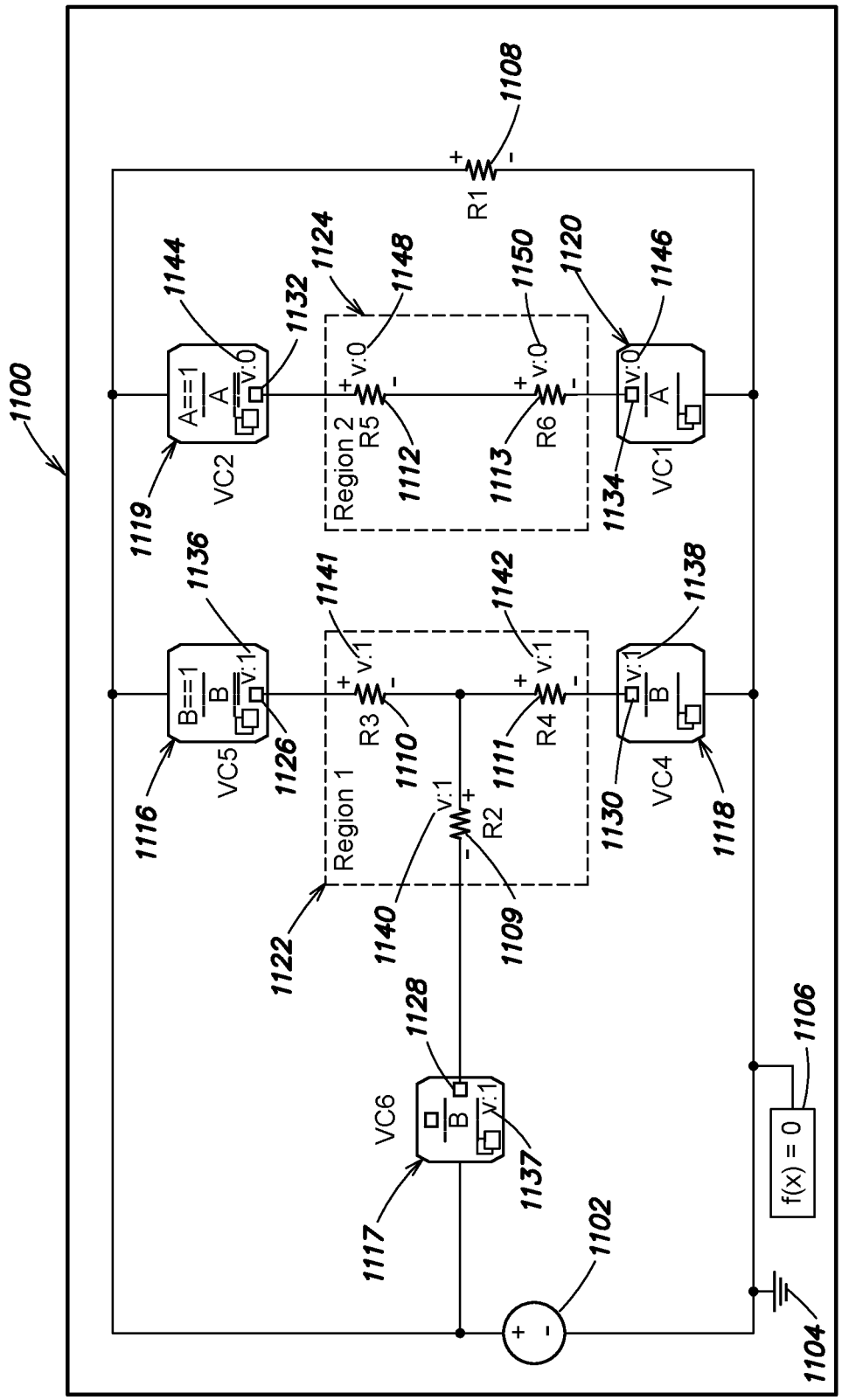
FIG. 11 is an illustration of an example executable physical model in accordance with one or more embodiments.

FIG. 11 is an illustration of an example executable physical model 1100 of an electrical circuit in accordance with one or more embodiments. The physical model 1100 may include an AC voltage source block 1102, a Ground block 1104, a Solver Configuration block 1106, and six Resistor blocks 1108-1113 named R1, R2, R3, R4, R5, and R6. The model 1100 further includes five Variant Connector blocks 1116-1120 that establish two variant regions 1122 and 1124 in the model 1100. The Variant Connector blocks 1116-1120 may be programmatically controlled in order to include or omit the Resistor blocks 1109-1113 (R2-R6) in the model 100.

The Variant Connector block 1116 may be a primary block and the Variant Connector blocks 1117 and 1118 may be non-primary blocks associated with the primary block 1116. The primary block 1116 may have a variant port 1126 and a variant condition, e.g., B==1, may be associated with the variant port 1126. The non-primary blocks 1117 and 1118 also may include variant ports 1128 and 1130, respectively, and the same variant condition, i.e., B==1, may be associated with their variant ports 1128 and 1130. The Variant Connector block 1119 may be a primary block and the Variant Connector block 1120 may be a non-primary block associated with the primary block 1119. The primary block 1119 may have a variant port 1132 and a variant condition, e.g., A==1, may be associated with the variant port 1132. The non-primary block 1120 also may include a variant port 1134 and the same condition, i.e., A==1, may be associated with its variant port 1134.

The variant condition propagation engine 308 may propagate the variant conditions associated with the primary blocks 1116 and 1119 to the model elements included in the variant regions 1122 and 1124 defined by the Variant Connector blocks 1116-1120. Propagation of variant conditions may be performed by associating variant conditions with the elements of an in-memory physical network that represent the model elements, for example in metadata associated with the elements of the physical network. As described, by associating variant conditions with model elements (more specifically, with the respective elements of the in-memory physical network), a determination may be made whether the model elements are active or inactive and thus whether the model elements are included or not in a given execution of the model or a code generation process.

In some embodiments, the variant condition annotation engine 310 may direct the UI engine 202 to annotate an acausal model, such as the model 1100, with one or more graphical affordances that present information regarding the variant conditions associated with the Variant Connector blocks of the model and/or the model elements included in the variant regions defined by the Variant Connector blocks.

The variant condition annotation engine 310 may use one or more symbolic representations to indicate a variant condition. For example, the variant condition annotation engine 310 may use the symbolic representation:

'v:#', where v stands for variant condition, and # represents a variant condition count for a model or portion thereof, e.g., starting from '0'.

For example, the variant condition annotation engine 310 may use the symbolic representation v:0 to represent the variant condition A==1 and the symbolic representation v:1 to represent the variant condition B==1. The UI engine 202 may annotate the Variant Connector blocks 1116-1120 and/ or the model elements included in the variant regions 1122 and 1124 as presented in the acausal model 1100 with these symbolic representations. For example, the UI engine 202 may present graphical affordances 1136-1138 with the symbolic representation v:1 at the variant ports 1126-1130 of the Variant Connector blocks 1116 and 1117. The UI engine 202 also may present graphical affordances 1140-1142 with the symbolic representation v:1 at the Resistor blocks 1109-1111 (R2-R4) included in the first variant region 1122.

The UI engine 202 may present graphical affordances 1144 and 1146 with the symbolic representation v:0 at the variant ports 1132 and 1134 of the Variant Connector blocks 1119 and 1120. The UI engine 202 also may present graphical affordances 1148 and 1150 with the symbolic representation v:0 at the Resistor blocks 1112 and 1113 (R5 and R6) included in the second variant region 1124.

In some embodiments, the variant condition annotation engine 310 may direct the UI engine 202 to present one or more legends for the symbolic representations created for variant conditions.

Figure 12:
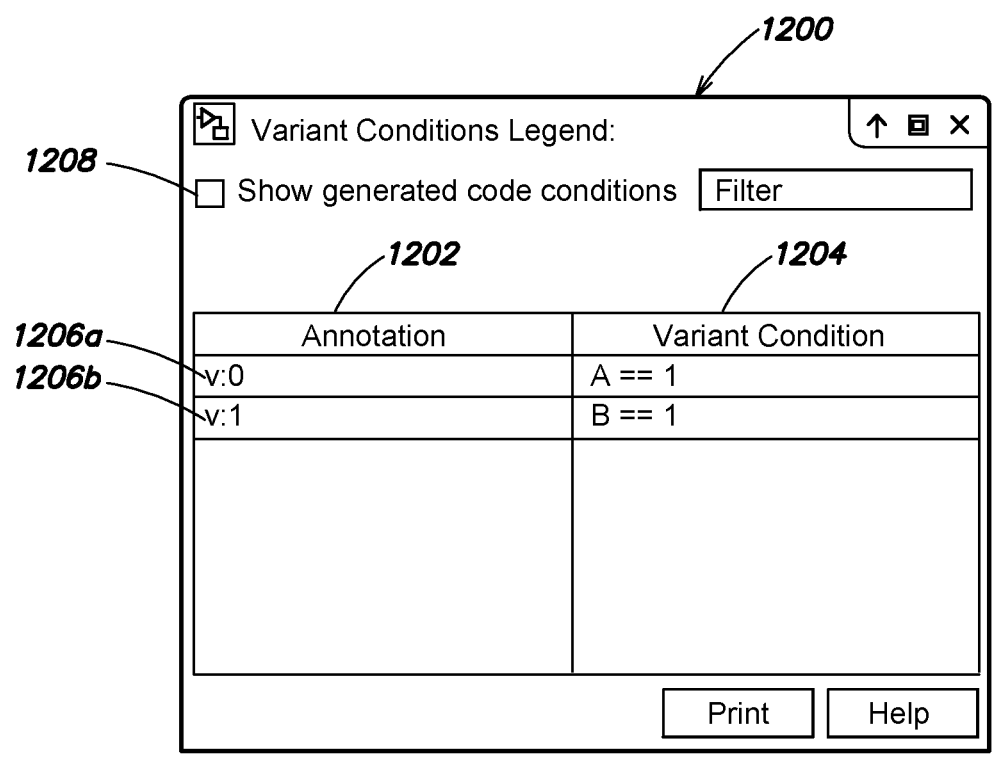
FIG. 12 is an illustration of an example legend of variant condition information in accordance with one or more embodiments.

FIG. 12 is an illustration of an example legend 1200 of variant condition information for the acausal model 1100 in accordance with one or more embodiments. The legend 1200 may be in the form of a table, which may be referred to as a variant condition annotation table. The legend 1200 may include an Annotation column 1202, a Variant Condition column 1204, and one or more rows, such as rows 1206a and 1206b, defining cells or records presenting information. For example, for each row 1206, the respective symbolic representation may be presented in the annotation column 1202 and the respective variant condition corresponding to that symbolic representation may be presented in the Variant Condition column 1204. As shown, row 1206a may indicate that symbolic representation v:0 corresponds to variant condition A==1 and row 1206b may indicate that symbolic representation v:1 corresponds to variant condition B==1.

The UI engine 202 may present the legend 1200 and/or information from the legend 1200 in a number of different ways. For example, the UI engine 202 may present the legend 1200 together with the model 1100, for example as a floating window. In other embodiments, in response to user selection of a graphical affordance of a symbolic representation on the model 1100, e.g., through a mouse or pointer operation, such as a mouse click and/or a mouse hover, the UI engine 202 may present the corresponding variant condition, e.g., in a popup window. In other embodiments, in response to the selection of a symbolic representation, the UI engine 202 may highlight, or otherwise mark, e.g., using another graphical affordance, the row of the legend 1200 for the selected symbolic representation. In other embodiments, in response to a selection of a row 1206 of the legend 1200, the UI engine 202 may mark, e.g., using a color, the Variant Connector blocks, the variant ports, and/or the model elements associated with the respective variant condition. It should be understood that the UI engine 202 may support other interactions between the model 1100 and the table 1200.

In some embodiments, the UI engine 202 may include a 'Show generated code condition' checkbox 1208 in the legend 1200. If the checkbox is 1208 checked, the code generator 228 may include the variant condition in the generated code. For example, if the variant condition is an expression, the code generator 228 may include the evaluated value, e.g., True or False.

In some cases, multiple variant conditions may be propagated to one or more model elements of a variant region. In such cases, the logical expression engine 312 may implement a propagation rule that logically combines the variant conditions.

Figure 13A:
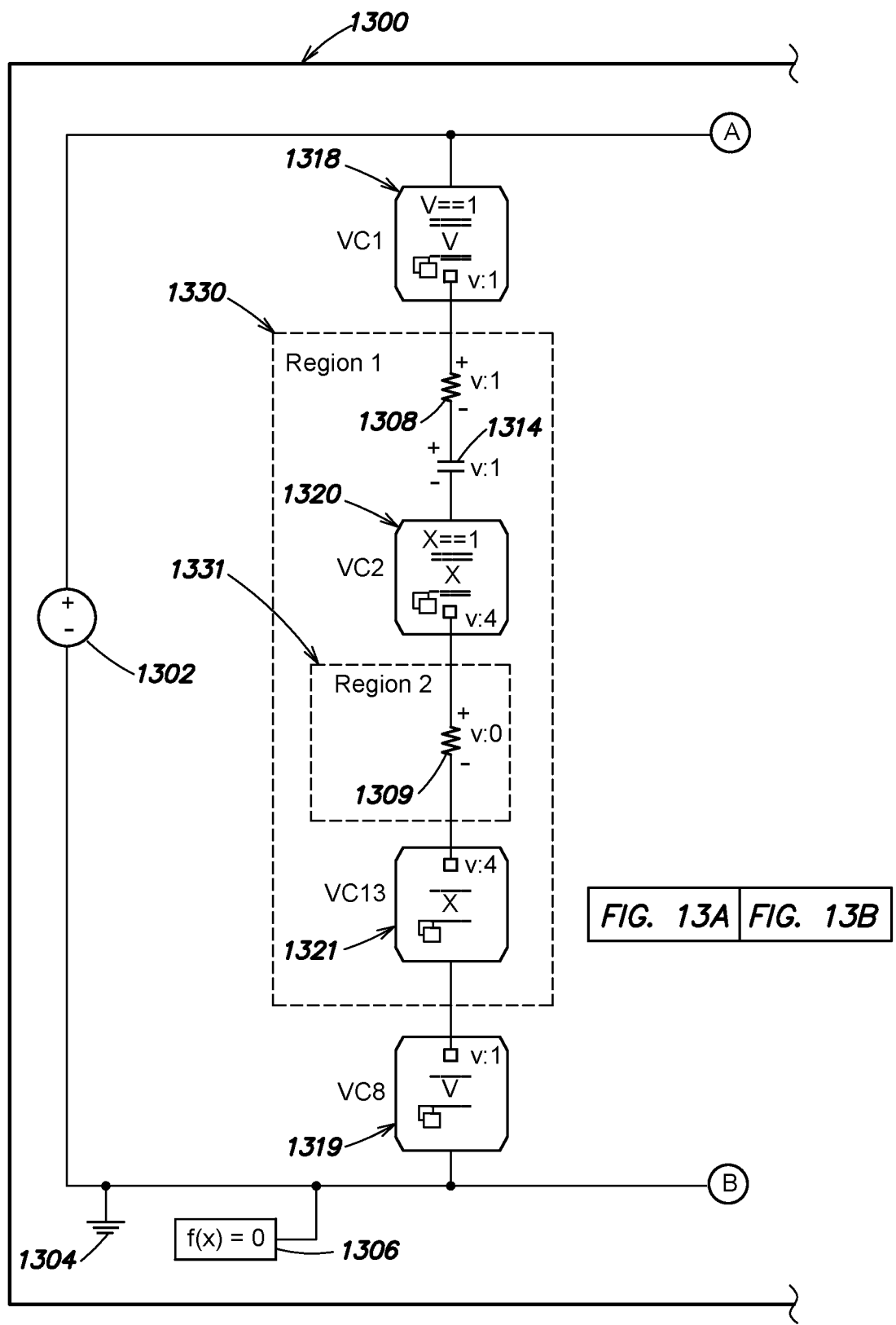
FIGS. 13A-B are partial views of an illustration of an example executable physical model in accordance with one or more embodiments.
Figure 13B:
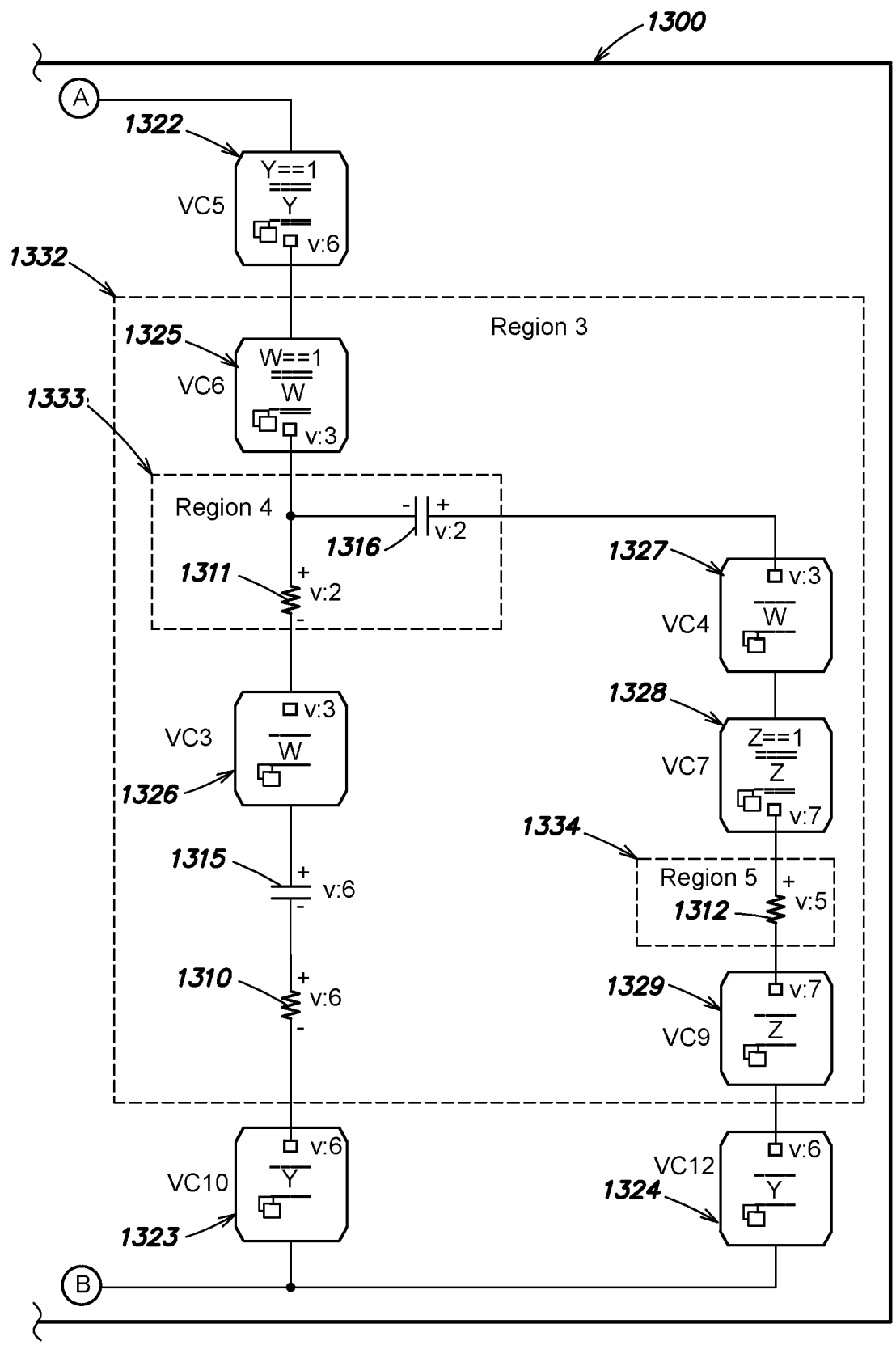

FIGS. 13A-B are partial views of an illustration of an example executable physical model 1300 of an electrical circuit in accordance with one or more embodiments. The physical model 1300 may include an AC voltage source block 1302, a Ground block 1304, a Solver Configuration block 1306, five Resistor blocks 1308-1312 and three Capacitor blocks 1314-1316. The model 1300 also may include twelve Variant Connector blocks 1318-1329 defining five variant regions 1330-1334 in the model 1300. The Variant Connector blocks 1318-1329 may be programmatically controlled in order to include or omit various combinations of the Resistor blocks 1308-1312 and the Capacitor blocks 1314-1316 in the circuit simulated by the model 1300.

Specifically, the Variant Connector block 1318 may be a primary block whose variant condition is V==1 and the Variant Connector block 1319 may be non-primary block associated with the primary block 1318. The Variant Connector blocks 1318 and 1319 may define the first variant region 1330. The Variant Connector block 1320 may be a primary block whose variant condition is X==1 and the Variant Connector block 1321 may be a non-primary block associated with the primary block 1320. The Variant Connector blocks 1320 and 1321 may define the second variant region 1331. The Variant Connector block 1322 may be a primary block whose variant condition is Y==1 and the Variant Connector blocks 1323 and 1324 may be non-primary blocks associated with the primary block 1322. The Variant Connector blocks 1322-1324 may define the third variant region 1332. The Variant Connector block 1325 whose variant condition is W==1 may be a primary block and the Variant Connector blocks 1326 and 1327 may be non-primary blocks associated with the primary block 1325. The Variant Connector blocks 1325-1327 may define the fourth variant region 1333. The Variant Connector block 1328 whose variant condition is Z==1 may be a primary block and the Variant Connector block 1329 may be a non-primary block associated with the primary block 1328. The Variant Connector blocks 1328 and 1329 may define the fifth variant region 1334.

The variant condition propagation engine 308 may propagate the variant condition V==1 to the model elements included in the first variant region 1330, namely Resistor block 1308, Capacitor block 1314, and Resistor block 1309. Because the Resistor block 1309 is also included in the second variant region 1331, the variant propagation engine 308 also may propagate the variant condition X==1 to the Resistor block 1309. The logical expression engine 312 may detect when more than one variant condition is being propagated to a given model element of an acausal model. In response, the logical expression engine 312 may generate a new variant condition by combining the multiple variant conditions. For example, the logical expression engine 312 may AND the multiple variant conditions propagated to the given block. Referring to the Resistor block 1309, the new variant condition generated by the logical expression engine 312 may be V==1 && X==1.

The Resistor block 1311 and the Capacitor block 1316 are included in the fourth variant region 1333, which itself is included in the third variant region 1332. The variant propagation engine 308 may propagate the variant condition Y==1, which is associated with the Variant Connector blocks 1322-1324 defining the third variant region 1332, and the variant condition W==1, which is associated with the Variant Connector blocks 1325-1327 defining the fourth variant region 1333 to the Resistor block 1311 and the Capacitor block 1316. In response, the logical expression engine 312 may generate a new variant condition by combining these variant conditions, e.g., Y==1 && W==1 for the Resistor block 1311 and the capacitor block 1316.

The Resistor block 1312 is included in the fifth variant region 1334, which itself is included in the third variant region 1332. The variant propagation engine 308 may propagate the variant condition Y==1, which is associated with the Variant Connector blocks 1322-1324 defining the third variant region 1332, and the variant condition Z==1, which is associated with the Variant Connector blocks 1328 and 1329 defining the fifth variant region 1334 to the Resistor block 1312. In response, the logical expression engine 312 may generate a new variant condition by combining these variant conditions. For example, for the Resistor block 1331, the logical expression engine 312 may combine the variant conditions, e.g., Y==1 && Z==1.

As illustrated in FIG. 13, the variant condition annotation engine 310 may include one or more graphical affordances in the model 1300 to indicate the variant conditions associated with the Variant Connector blocks 1318-1329 and/or propagated to the model elements of the variant regions 1330-1334. The one or more graphical affordances may include displays of symbolic representations in the form 'v:0' to 'v:7'.

Figure 14:
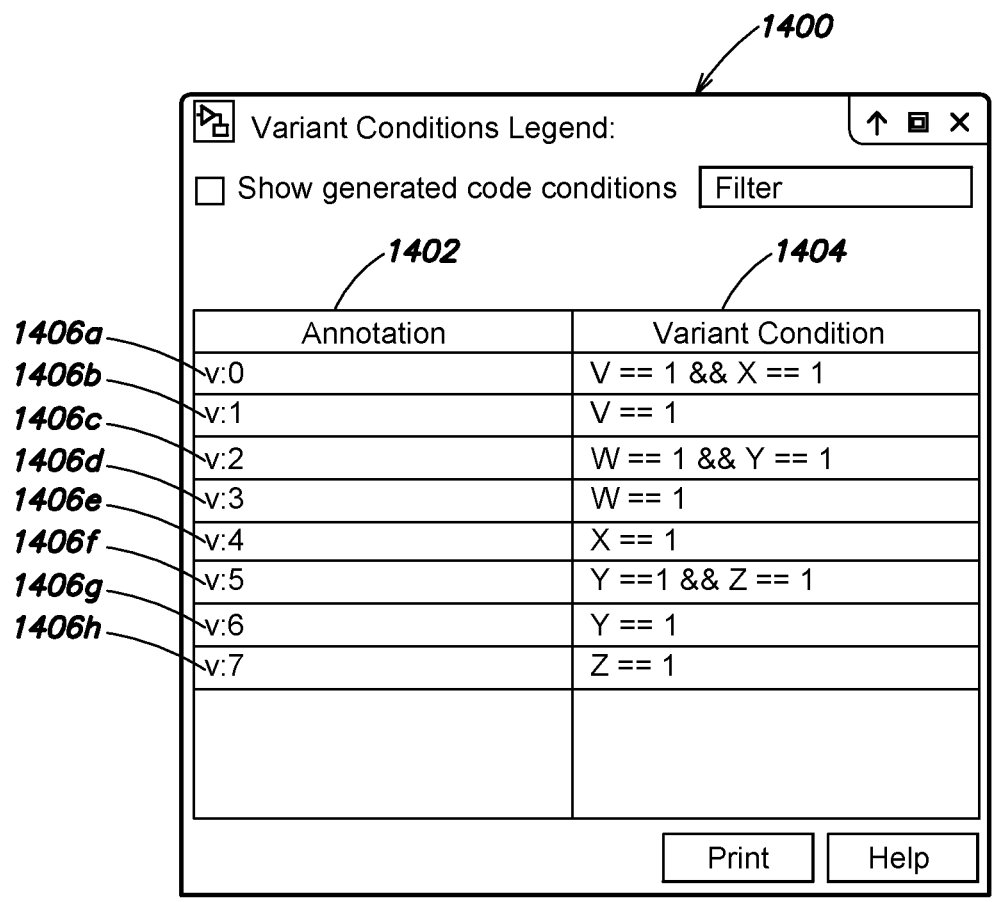
FIG. 14 is an illustration of an example legend of variant condition information in accordance with one or more embodiments.

FIG. 14 is an illustration of an example legend 1400 of variant condition information for the acausal model 1300 in accordance with one or more embodiments. The legend 1400, which may be in the form of a table, may include an Annotation column 1402, a Variant Condition column 1404, and a plurality of rows 1406a-h. The first row 1406a indicates that v:0 corresponds to variant condition V==1 && X==1, which is the variant condition generated for the model elements included in the second variant region 1331, e.g., the Resistor block 1309. The second row 1406b indicates that v:1 corresponds to variant condition V==1, which is associated with the variant ports of the Variant Connector blocks 1318 and 1319, and the model elements included in the first variant region 1330 but not the second variant region 1331, e.g., the Resistor block 1308 and the Capacitor block 1314. The third row 1406c indicates that v:2 corresponds to variant condition W==1 && Y==1, which is the variant condition generated for the model elements included in the fourth variant region 1333, e.g., the Resistor block 1311 and the Capacitor block 1316. The fourth row 1406d indicates that v:3 corresponds to variant condition W==1, which is associated with the variant ports of the Variant Connector blocks 1325-1327 that define fourth variant region 1333. The fifth row 1406e indicates that v:4 corresponds to variant condition X==1, which is associated with the variant ports of the Variant Connector blocks 1320 and 1321 defining the second variant region 1331. The sixth row 1406f indicates that v:5 corresponds to variant condition Y==1 && Z==1, which is the variant condition generated for the model elements included in the fifth variant region 1334, e.g., the Resistor block 1312. The seventh row 1406g indicates that v:6 corresponds to variant condition Y==1, which is associated with the variant ports of the Variant Connector blocks 1322-1324, and the model elements included in the third variant region 1332 but not the model elements included in the fourth or fifth variant regions 1333 and 1334, e.g., the Resistor block 1310 and the Capacitor block 1315. The eight row 1406h indicates that v:7 corresponds to variant condition Z==1, which is associated with the variant ports of the Variant Connector blocks 1328 and 1329 defining the fifth variant region 1334.

Run-Time Behavior—This Section Describes The Run-Time Embodiment

As described, in some embodiments, the variant implementation system 300 may modify an in-memory network constructed for an acausal model (or create a new in-memory network) and may provide this modified network to the simulation engine 206 and/or the code generator 228. For example, the variant clipping engine 316 may remove the model's Variant Connector blocks and model elements of inactive variant regions. The simulation engine 206 may generate and solve a system of equations based on the network as modified by the variant implementation system 300.

In other embodiments, inactive variant regions may be determined at run-time of an acausal model. For example, the run-time translation engine 318 may convert a Variant Connector block of an acausal model to implement switching functionality. The network constructor 320 may then construct a network for the entire acausal model including the converted Variant Connector block and the variant region defined thereby. The complete network, e.g., in which all internal connections of all Variant Connector blocks are closed, may be provided to the simulation engine 206 and/or the code generator 228. The simulation engine 206 may generate a system of equations for the complete network including the switching functionality included in place of the Variant Connector block. The simulation engine 206 may then solve the system equations, which may include determining the state of the switching functionality and thus whether the variant region is included in the solution or not. Alternatively, the complete network including the converted Variant Connector block may be provided to the code generator 228 and code, including code for the switching functionality, may be generated. As a result, changes to the active variant choice(s) may be made during execution of a model and/or during execution of code generated for a model. For example, at the start of model execution one variant choice may be active and thus included in the execution of the model, for example based on one or more options specified for the variant conditions. During model execution, however, the one variant choice may become inactive and not included in further execution of the model. In some cases, one or more other variant choices may become active and included in further execution of the model. For example, a mechanical model of a robot having two grippers may be created. The model may include each gripper as a variant choice. At the start of execution of the model one of the grippers may be active and included in model execution. However, to simulate a failure of that gripper, the variant choice modeling that gripper may be made inactive during model execution and the variant choice modeling the other gripper may be made active. Further execution of the model includes the other gripper.

Figure 15:
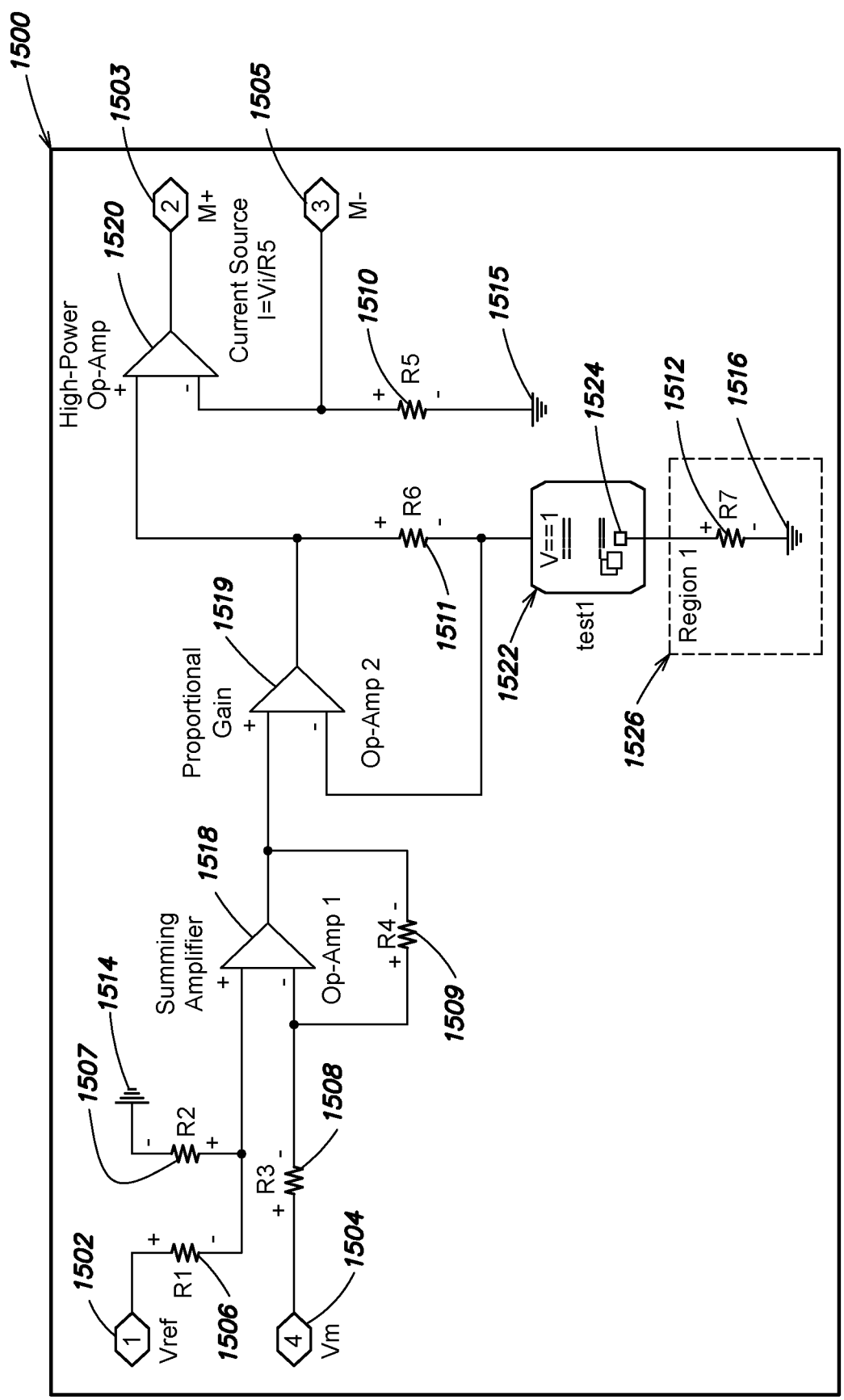
FIG. 15 is an illustration of an example executable physical model in accordance with one or more embodiments.

FIG. 15 is an illustration of an example executable acausal model 1500 of an electrical circuit in accordance with one or more embodiments. The acausal model 1500 may include four Connection Port blocks 1502-1505, seven Resistor blocks 1506-1512, three Ground blocks 1514-1516, and three Operation Amplifier (Op-Amp) blocks 1518-1520. The acausal model 1500 also may include a Variant Connector block 1522 that includes a variant port 1524 and defines a variant region 1526. The variant region 1526 includes the Resistor block 1512 and the Ground block 1516. A variant condition, e.g., V==1, may be associated with the variant port 1524. If the value of the variable V is '1', then the variant region 1526 is active. If the value of the variable V is other than '1', then the variant region 1526 is inactive.

To provide run-time determination of variant regions, the run-time translation engine 318 may convert a Variant Connector block to a switch block. For example, for an acausal model that simulates an electrical circuit, the run-time translation engine 318 may replace a Variant Connector block with an electrical Switch block. For an acausal model that simulates a hydraulic system, the run-time translation engine 318 may replace a Variant Connector block with a valve. For an acausal model that simulates a mechanical system, the run-time translation engine 318 may replace a Variant Connector block with a latch or clutch. In some embodiments, one or more parts of a Variant Connector block may be replaced by a switch, valve, latch, clutch, or some other block. For example, each internal connection of a Variant Connector block may be a candidate for replacement by a switch, valve, latch, clutch, or some other block.

Figure 16:
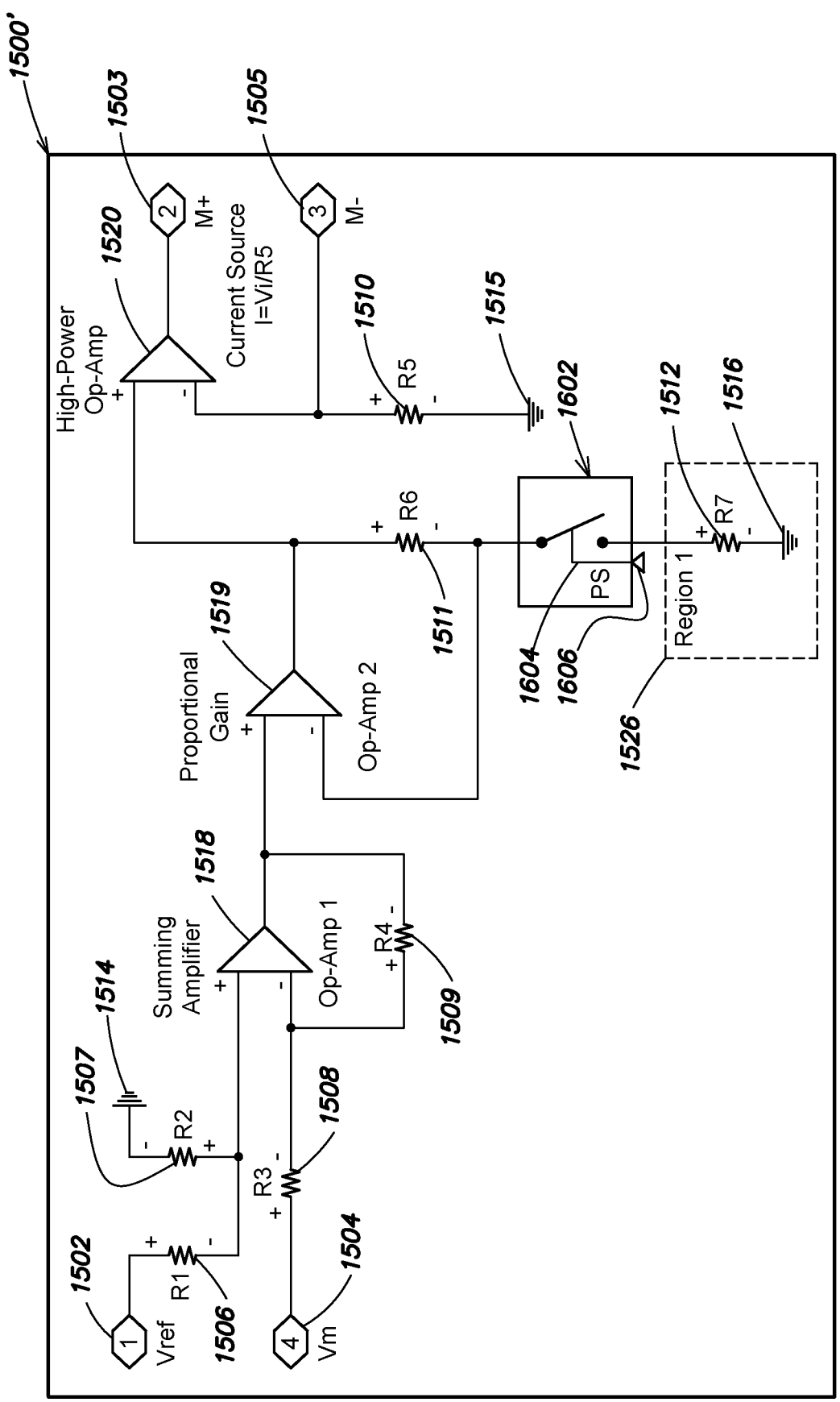
FIG. 16 is an illustration of an example of a translated version of an executable physical model in accordance with one or more embodiments.

FIG. 16 is an illustration of an example of a translated version 1500' of the executable physical model 1500 of FIG. 15 in accordance with one or more embodiments. In the translated version 1500', the run-time translation engine 318 replaced the Variant Connector block 1522 with an Electrical Switch block 1602. The Electrical Switch block 1602 models a switch controlled by an external physical signal (PS) 1604. A suitable Electrical Switch block is the Switch block from the SimElectrical physical modeling environment from The MathWorks, Inc. The Electrical Switch block 1602 may have a Threshold property. If the value of the PS 1604 is greater than the value of the switch block's Threshold property, then the Electrical Switch block 1602 is closed and the variant region 1526 is active, e.g., included in the solution for the acausal model 1500'. If the value of PS 1604 is not greater than the block's Threshold property, then the Electrical Switch block 1602 is open and the variant region is inactive, e.g., not included in the solution for the acausal model 1500'.

A user may set the value for the Switch block's Threshold property through a properties page associated with the Variant Connector block 1522. In addition, the user may include one or more selected model elements in the model 1500' to compute the PS signal 1604. The user may connect the one or more selected model elements to a PS port 1606 of the Electrical Switch block 1602. In some embodiments, the Variant Connector block 1522 may include a port that corresponds to the PS port 1606 of the Electrical Switch block 1602, such as when selecting a Variant Connector blocks' variant activation time, as described herein.

In some embodiments, a Variant Connector block may be configured with one or more block properties or attributes that direct the simulation engine 206 and/or the code generator 228 on executing or generating code for the variant region and/or variant choice(s) defined by the Variant Connector block. These different execution/code generation modes may be referred to as variant activation times. In some embodiments, the simulation engine 206 and/or code generator 228 may support five different modes, which may be called Update_Diagram, Update_Diagram_Analyze_All_Choices, Code_Compile, Startup, and Runtime variant activation times. The variant activation time associated with a given Variant Connector block may be user specified, for example through a user interface.

Figure 22:
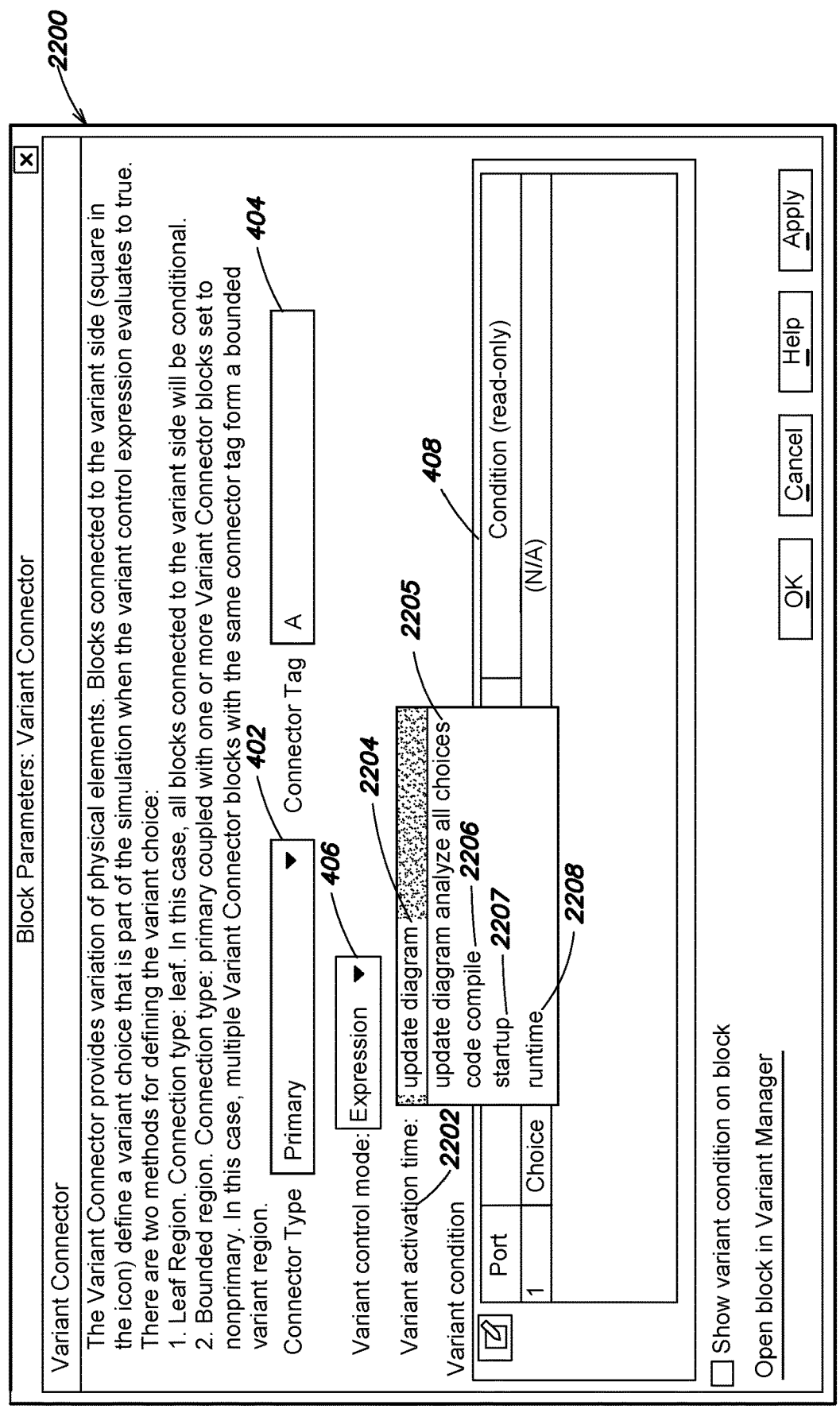
FIG. 22 is an illustration of an example User Interface (UI) in accordance with one or more embodiments.

FIG. 22 is an illustration of an example User Interface (UI) 2200 that may be used to select a variant active time for a given Variant Connector block in accordance with one or more embodiments. The UI 2200 may be presented, e.g., on a display of a data processing device, by the UI engine 202 for a Variant Connector block included in an acausal model. The UI 2200 may be presented in response to user input, e.g., selecting the Variant Connector block causing a drop down menu to be presented and selecting one of the presented commands, such as an 'Open Properties' command. The UI 2200 may include a plurality of data entry fields through which values for the block's properties or attributes may be specified, e.g., by the user. For example, the UI 2200 may include the 'Connector Type' drop down menu 402, the 'Connector Tag' data entry field 404, the 'Variant control mode' drop down menu 406, and the 'Variant Condition' data entry field 408, as described herein.

The UI 2200 also may include another drop down menu 2202 labeled 'Variant activation time'. As noted, five variant activation time options may be available in the drop down menu 2202, including: 'update diagram' 2204, 'update diagram analyze all choices' 2205, 'code compile' 2206, 'startup' 2207, and 'runtime' 2208. A user may select one of the options from the drop down menu 2202, and the selected variant activation time may be associated with the Variant Connector block.

It should be understood that FIG. 22 is meant for explanation and that the UI 2200 may take other forms. For example, the variant control mode drop down menu 406 may be omitted from the UI 2200, if the variant implementation system 300 only provides an expression mode. In other embodiments, other changes may be made to the UI and/or one or more settings may be made through a CLI, API, or other interface.

Model Execution/Code Generation

To simulate a physical model, the simulation engine 206 may construct a physical network based on an in-memory representation of the physical model and may utilize the physical network to construct a system of equations. The simulation engine 206 may solve the equations and/or the code generator 228 may generate code that solves the equations.

In some embodiments, a physical model may represent a dynamic system, whose behaviors change over time. A dynamic system may be modeled as sets of differential, difference, and/or algebraic equations. For example, a dynamic system may be described using ordinary differential equations (ODEs). The ODEs may include an Output equation, an Update equation, and a Derivative equation. The Output equation computes the system's output response at a given time instant as a function of the system's inputs, states, parameters, and time, and may be represented as $$y(t)=f(t, X, u, p)$$

where
t is time,
X is state,
u are inputs, and
p are parameters.

The Update equation may be a difference equation that computes the system's states at the current time as a function of the system's inputs, states at some previous time, parameters, and time, and may be represented as:

$$x(t+h)=g(t, X, u, p)$$

where
h is a step size.

The Derivative equation may be an ODE that computes the derivative of the system's states at the current time as a function of the system's inputs, states, parameters, and time, and may be represented as:

$$\dot{x}=h(t, X, u, p)$$

Model execution may involve processing input data and generating output data, and execution of a model may be carried out over a time span, e.g., a simulation time, which may be user specified or machine specified. Simulation time is a logical execution time, and may begin at a simulation start time and end at a simulation end time. At successive points between the simulation start and end times inputs and outputs of model elements of the model may be computed. The points in time may be called simulation time steps, and the sizes of the time steps may be fixed or may vary. The sizes may be determined by the particular solver 226 selected and used in the execution of the model.

Model Compilation Phase

A compile stage may mark the start of execution of the model, and may involve preparing data structures, evaluating parameters, configuring and propagating block characteristics, determining block connectivity, and performing block reduction and block insertion. The preparation of data structures and the evaluation of parameters may result in the creation and initialization of one or more data structures for use in the compile stage. During the configuration and propagation of block and port/signal characteristics, the compiled attributes (such as data dimensions, data types, complexity, sample modes, and sample time) of each block and/or port/signal may be setup on the basis of the corresponding behaviors and the attributes of blocks and/or ports/signals that are connected to the given block and/or port/signal, which connections may be graphically represented on the model through lines, arrows, or other connectors. The attribute setup may be performed through a process during which block behaviors "ripple through" the model from one block to the next following signal, state, physical, message or other connectivity.

This process is referred to as inferencing. In the case of a block that has explicitly specified its block (or port) behaviors, inferencing helps ensure that the attributes of the block (or port) are compatible with the attributes of the blocks (or ports) connected to it. If not, a warning or an error may be issued. Secondly, in many cases, blocks (or ports) are implemented to be compatible with a wide range of attributes. Such blocks (or ports) may adapt their behavior in accordance with the attributes of the blocks (or ports) connected to them. The exact implementation of the block may be chosen on the basis of the model in which the block finds itself. Included within this step may be other aspects such as validating that all rate-transitions yield deterministic results, and that the appropriate rate transition blocks and/or delay blocks are being used. The compilation step also may determine actual block connectivity. For example, virtual blocks, which may play no semantic role in the execution of a model, may be optimized away, e.g., removed, and the remaining non-virtual blocks may be reconnected to each other appropriately. This compiled version of the design model with actual block connections may be used from this point forward in the execution process. The way in which blocks are interconnected in the model does not necessarily define the order in which the equations (e.g., included in methods) corresponding to the individual blocks will be solved (executed). These equations may include outputs equations, derivatives equations, and update equations.

Block sample times may also be determined during the compilation stage. A block's sample time may be set explicitly, e.g., by setting a SampleTime parameter of the block, or it may be determined in an implicit manner based on the block's type or its context within the model. The SampleTime parameter may be a vector $[T_S, T_O]$ where $T_S$ is the sampling period and $T_O$ is the initial time offset.

The selected solver 226 may determine the size of the simulation time steps for the simulation of the model, and these simulation time steps may be selected to correspond with the sample times of the blocks of the model. When a simulation time step matches the sample time for a block, a sample time hit occurs, and the block is scheduled for execution during that simulation step.

The solvers 226*a*-*c* may include or access one or more schedulers that may generate execution lists for the blocks of the model. In particular, the schedulers may generate a block sorted order list and a method execution list. The schedulers may utilize one or more algorithms for generating the block sorted order and method execution lists. For example, a static scheduler may use the Rate Monotonic Scheduling (RMS), Earliest Deadline First Scheduling, Static Cyclic Scheduling, Round Robin Scheduling, or Deadline Monotonic Scheduling. A dynamic scheduler may use an event calendar to schedule future events, such as timeouts and alarms.

Link Phase

In the link stage, memory may be allocated and initialized for storing run-time information for blocks of the model.

Code Generation and Model Execution Phase

Following the model compilation and link stages, code may or may not be generated. For example, the code generator 228 and/or the simulation engine 206 may generate code for a model or a portion thereof, and may execute this code during simulation of the model. If code is generated, the model may be executed through an accelerated execution mode in which the model, or portions of it, is translated into either software modules or hardware descriptions, which is broadly referred to herein as code. If this stage is performed, then the stages that follow may use the generated code during the execution of the model. If code is not generated, the model may execute in an interpretive mode in which the compiled and linked version of the model may be directly utilized to execute the model over the simulation time. The model may not be executed when code is generated for the model. Instead of executing the model within the simulation environment 200, the generated code may be compiled and deployed on a target device, such as a controller, test hardware, etc. Generated code may be stored in memory, e.g., persistent memory, such as a hard drive or flash memory.

In some embodiments, the simulation of a model may involve multiple phases, such as an initialization phase, a simulation (or run) phase, zero, one or more reset phases, and a termination phase. The code generator 228 may generate code for each phase.

Initialization Phase During the initialization phase of model execution, implicit initialization operations and user-specified, e.g., explicit, initialization operations may be performed. Examples of implicit or explicit operations that may be performed during an initialization phase include calls to callbacks that that start Analog-to-Digital converters (ADC), Digital-to-Analog converters (DAC), actuators or other hardware or physical elements. Additional initialization operations include loading data from memory, reading sensor data, computing an initial condition, for example based on the sensor data, and setting an initial state of a model or model element, for example based on the computed initial condition. The initialization phase may occur once for a given execution of a model.

Run Phase

During the run phase, which may follow the initialization phase, the simulation engine 206 may enter a simulation loop or iteration loop stage during which the simulation engine 206 successively computes the states and outputs of the model elements at particular simulation time steps from the simulation start time to the simulation end time. For example, the simulation engine 206 may solve the Output, Update, and Derivative equations. At each step, new values for the model element's inputs, states, and outputs may be computed, and the model elements may be updated to reflect the computed values. The duration of time between steps is called the step size. The step sizes depend on the type of solver 226 selected and used to simulate the model, the model's fundamental sample time, and whether the model's continuous states have discontinuities, such as zero crossings. The steps of the simulation or iteration loop may be repeated until the simulation end time is reached. At the end of the simulation time, the model reflects the final values of the model element's inputs, states, and outputs.

Reset Phase(s)

In some embodiments, the run phase may optionally include one or more reset phases. For example, when a reset event occurs, one or more states of a model may be read and/or written, and/or the solver may be reset, e.g., intermediate values discarded and recomputed and/or reset to those from the last step.

Termination Phase

During the termination phase, which may follow the run phase, the simulation engine 206 may perform clean-up operations. For example, the simulation engine 206 may release allocated memory, among other operations. In some embodiments, the termination phase may include explicit, e.g., user-specified, termination operations, which may be executed during the termination phase. Exemplary implicit or explicit operations that may be performed during the termination phase include downloading internal memory to persistent memory, such as a Non-Volatile Random Access Memory (NVRAM), turning off ADCs and DACs, and writing data out to data files and closing the data files. The termination phase may occur once during a given execution of a model.

FIGS. 23A-D are partial views of a flow diagram of an example method for compiling and executing or generating code for a model based on the selection of the variant activation time for a given Variant Connector block included in the model in accordance with one or more embodiments.

The model compiler 222 may determine whether the given Variant Connector block has been set to the Code_Compile, Startup, or Runtime variant activation time as indicated at decision block 2302. If so, the model compiler 222 may replace the given Variant Connector block with a switch block that has a type matching the physical domain of the model, as indicated by Yes arrow 2304 leading to block 2306. For example, if the model is an electrical domain, the model compiler 222 may replace the Variant Connector block with an electrical switch. If the model is a mechanical domain, the model compiler 222 may replace the Variant Connector block with a physical connector, and so on. It should be understood that the model compiler 222 may operate on an in-memory representation of a model and the Variant Connector block and the switch may be one or more nodes of the in-memory representation. The model compiler 222 may then proceed with compiling the model, including all variant choices—active and inactive, as indicated at block 2308.

In some embodiments, when a Variant Connector block is configured in the code compile, startup or runtime variant activation modes, the model editor 204 may change the visual appearance of the Variant Connector block on a visual depiction of the model, such as on the canvas 126 of the model editor window 120. For example, the model editor 204 may include a trigger port on the Variant Connector block. A user may connect one or more model elements to this trigger port for controlling the Variant Connector block when it is replaced to operate as a switch.

The model compiler 222 may perform validation and/or error checking on all of the variant choices defined by the given Variant Connector block, as indicated at block 2310. For example, the model compiler 222 may analyze each variant choice (whether active or inactive) to check whether it has the same compiled attributes as the other variant choices. Exemplary compiled attributes may include domain type, solver configuration, and the equations to which the physical network is converted, among others. If any of the variant choices has one or more compiled attributes that differ from the compiled attributes associated with the other variant choices and the variant activation time is something other than update diagram, the model compiler 222 may halt compilation and issue a warning and/or an error message. If the variant activation time is update diagram, then the compiled attributes of variant choices need not be the same and may differ.

Figure 24:
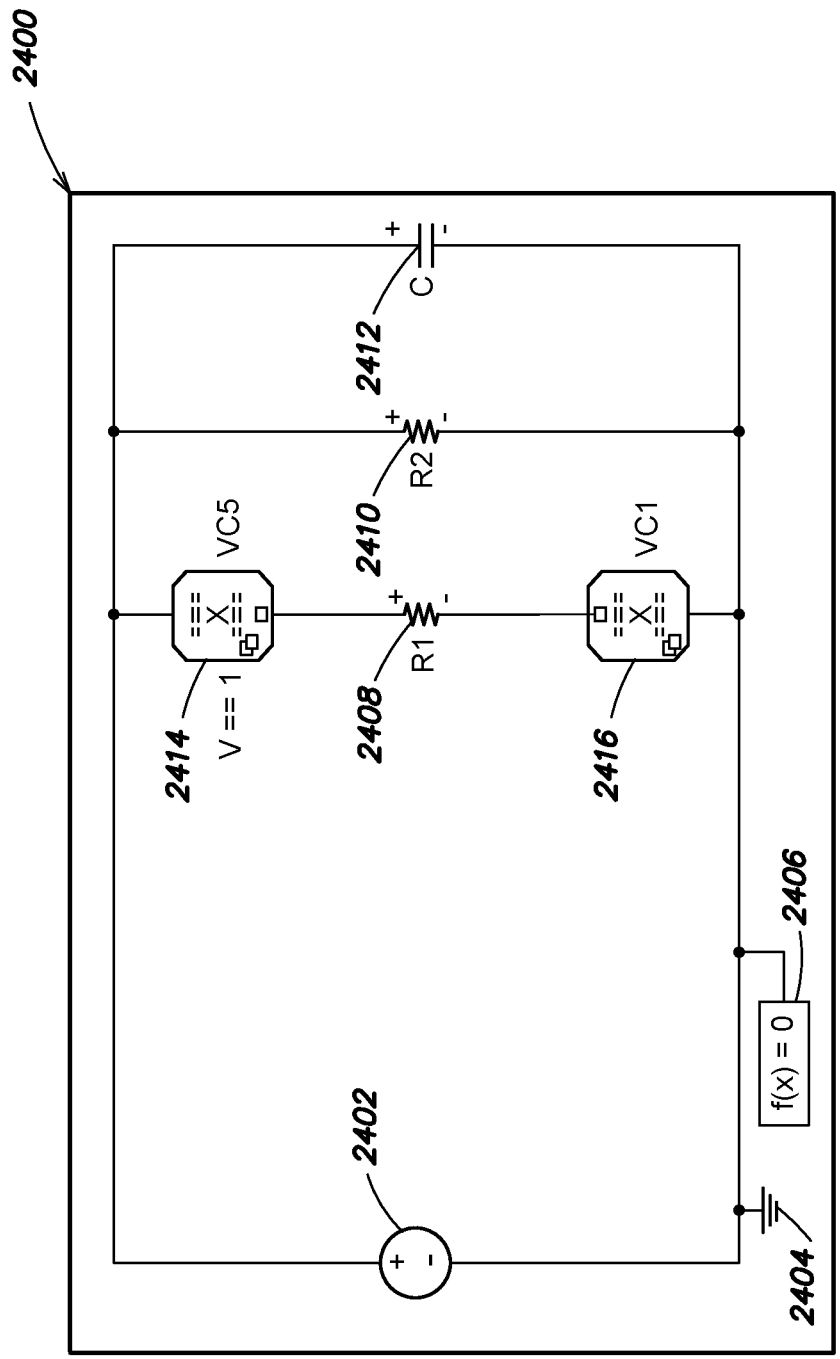
FIG. 24 is an illustration of an example executable physical model in accordance with one or more embodiments.

Assuming the variant choices pass the validation testing, e.g., all variant choices have the same compiler attributes, the model compiler 222 may proceed to complete the compilation process. For example, if the given Variant Connector block is set to the Code_Compile variant activation time, the code generator 228 may wrap the sections of the generated code that implement the variant choices in one or more preprocessor conditionals, as indicated at block 2312. In some embodiments, all variant choices may be required to have the same compiler attributes. This may ensure that the generated code is not overly complex. If variant choices are allowed to have different compiler attributes, e.g., different dimensions of variables or signals used with in the variant choices, then the generated code may increase in complexity. For example, if the dimensions differed, then the code generator may need to generate variable declarations with the different dimensions and protect the corresponding code with the corresponding preprocessor conditionals. It should be understood that it is not strictly required that all variant choices have the same compiler attributes when the variant activation time is set to "code compile", i.e., when we are generating C code with #if statements or another language with similar preprocessor conditionals, e.g., Verilog's if statement. FIG. 24 is an illustration of an example executable physical model 2400 of an electrical circuit in accordance with one or more embodiments. The physical model 2400 may include an AC voltage source block 2402, a Ground block 2404, a Solver Configuration block 2406, two Resistor blocks 2408 and 2410 named R1 and R2, and a capacitor block 2412 named C1. The model 2400 further includes two Variant Connector blocks 2414 and 2416 that control whether or not the Resistor block 2408 (R1) is included in the model 2400 during model execution and/or code generation. The Resistor block 2408 (R1) thus represents a variant choice of the model 2400. A logical expression, V==1, may be associated with the Variant Connector blocks 2414 and 2416. If the logical expression evaluates to True, e.g., the variable V is set to 1, the internal connections of the two Variant Connector blocks 2414 and 2416 are closed. If the logical expression evaluates to False, their internal connections are open.

Suppose the two Variant Connector blocks 2414 and 2416 are configured with the Code_Compile variant activation time. The code generator 228 may generate code for the physical model 2400 by wrapping the variant choice in one or more preprocessor conditionals. This conditional code may be included in the portion of the code implementing the Output equation. Exemplary conditional code generated for the model 2400 by the code generator 228 in the C programming language is shown below:

```
Void Step( )
{
#if V==1
// Solve circuit containing R1, R2, C, and the voltage source, i.e., Out=R1 || R2 || C.
#else
// Solve circuit containing R2, C, and the voltage source, i.e., Out =R2 || C
#endif
}
```

As shown, the code generator 228 wraps the variant choice, e.g., R1, in preprocessor conditionals, e.g., #if and #endif.

Figure 23A:
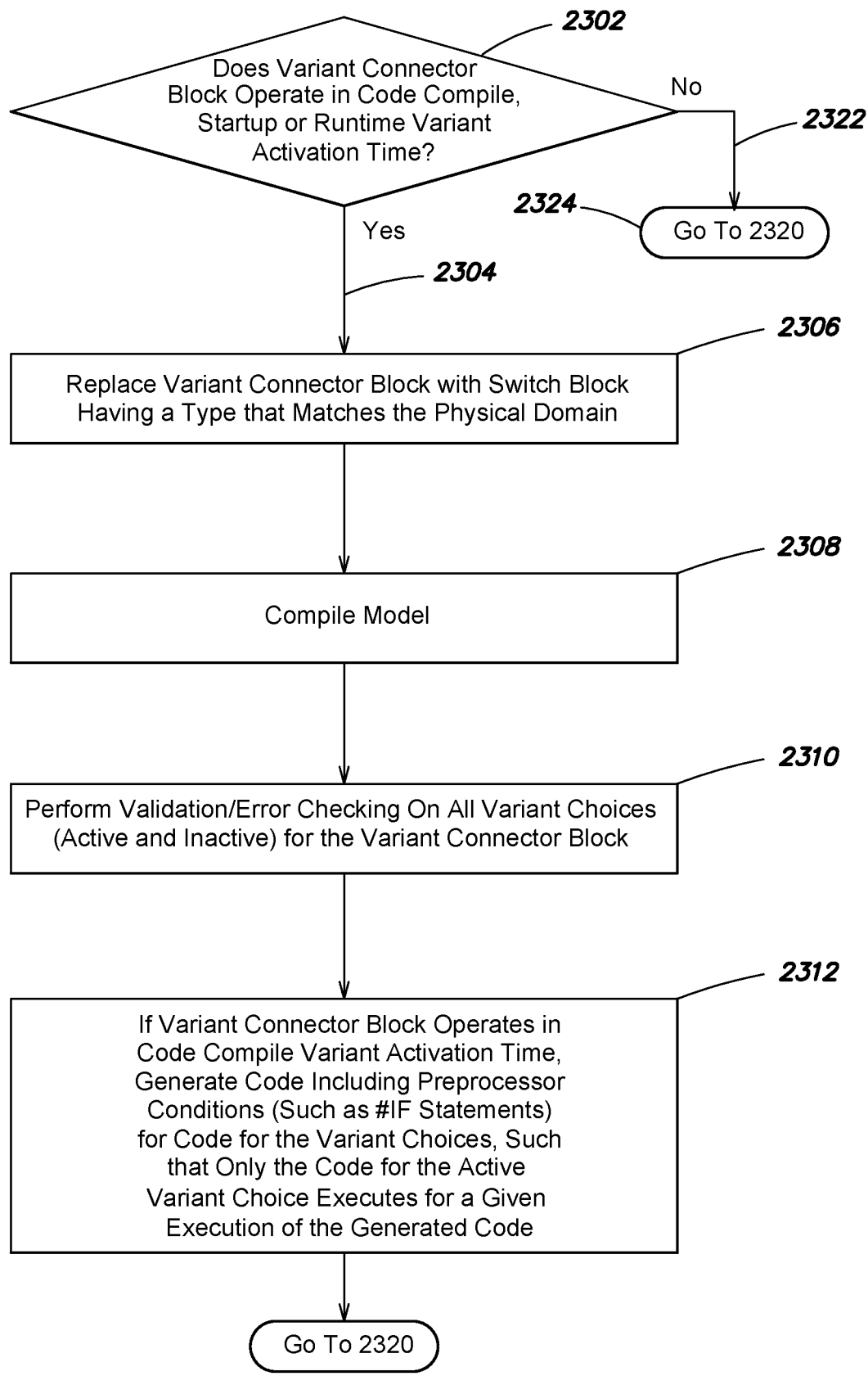
FIGS. 23A-D are partial views of a flow diagram of an example method in accordance with one or more embodiments.
Figure 23B:
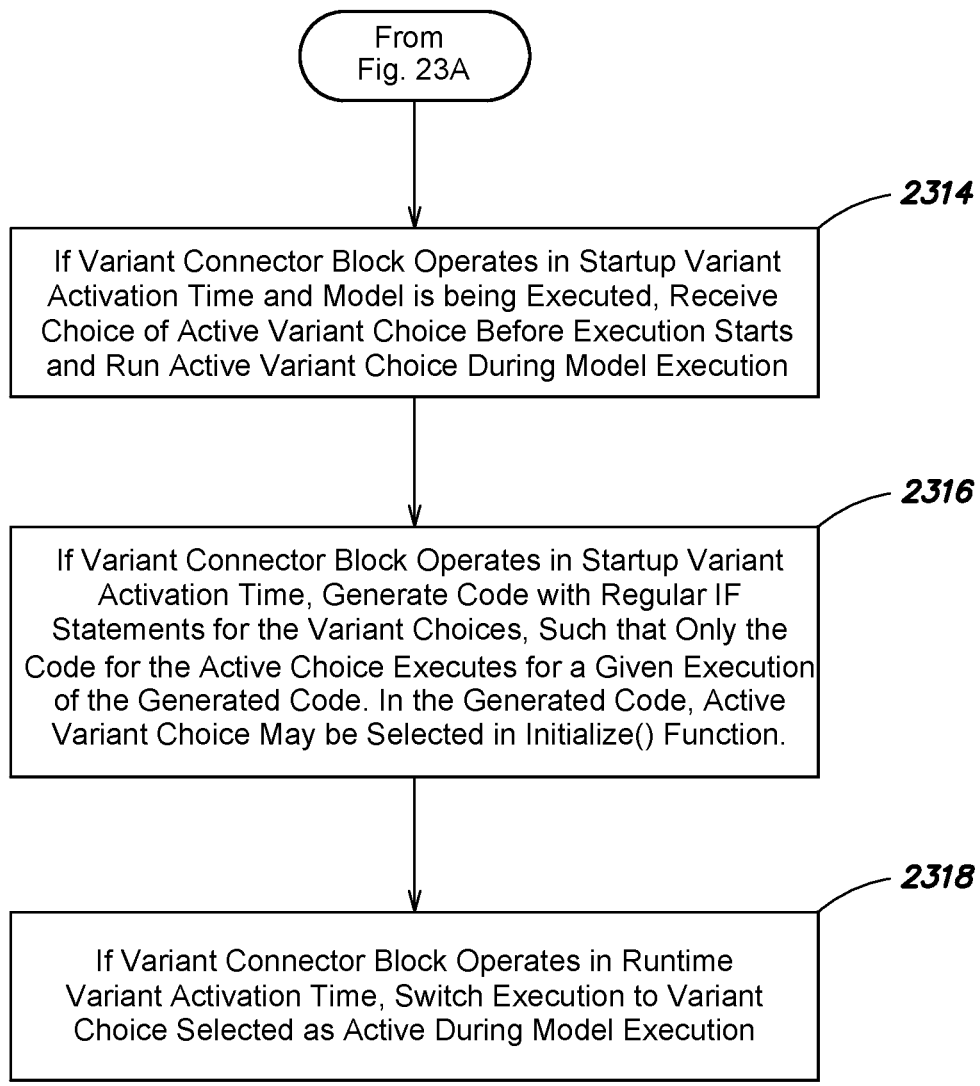
Figure 23C:
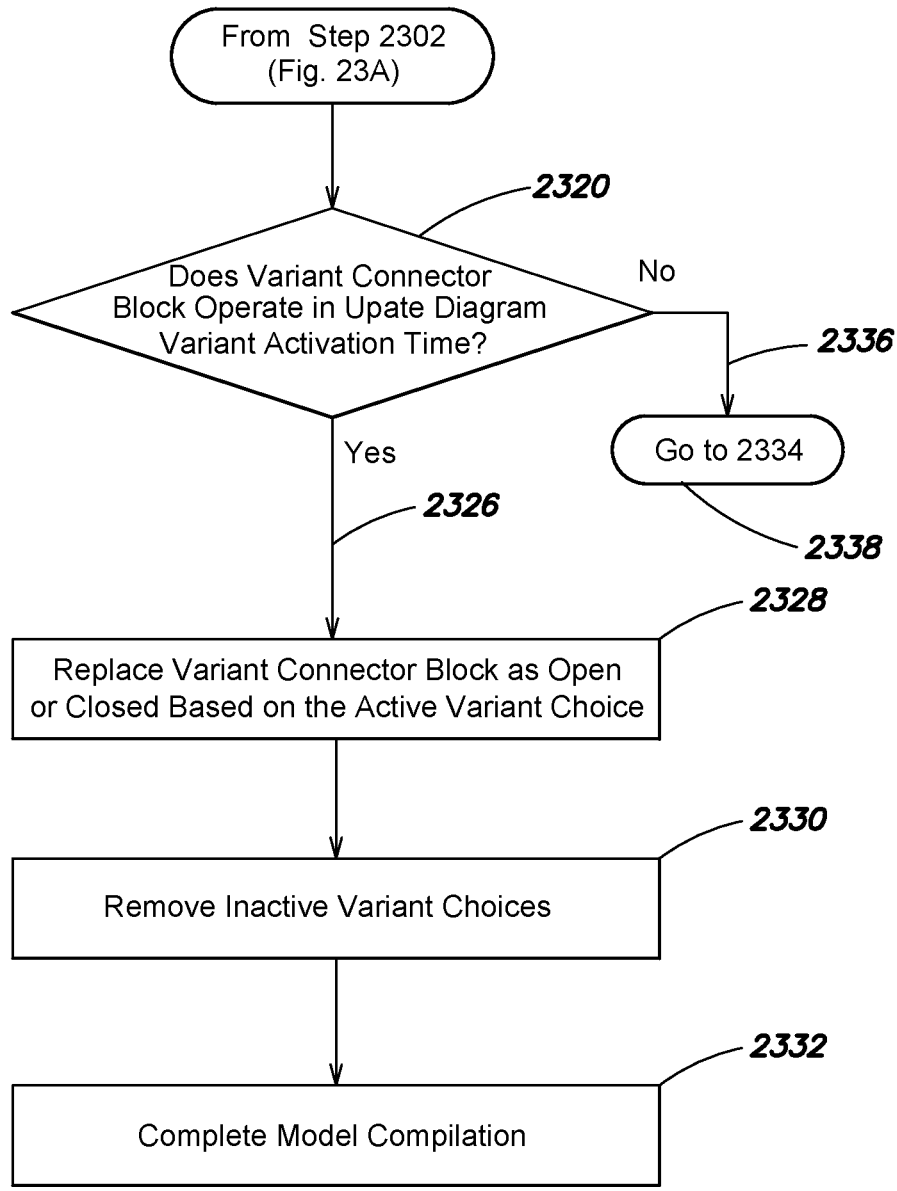
Figure 23D:
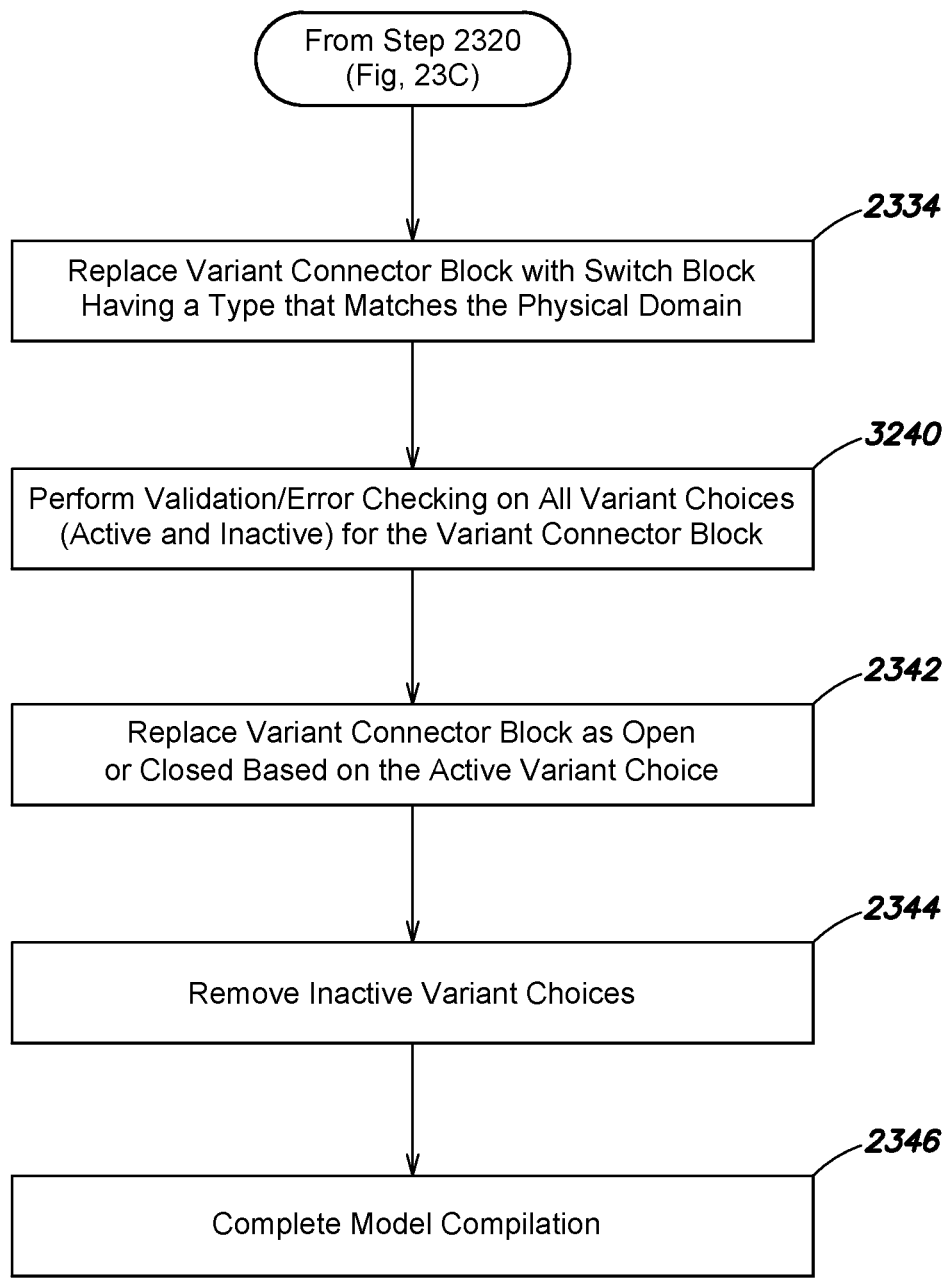

Returning to the flow diagram, suppose the given variant connector block is set to the Startup variant activation time, instead of the Code_Compile variant activation time. If the model containing the given variant connector block is being run within the simulation environment 200, then the selection of the active variant choice may be received before model execution, and the simulation engine 206 may include the active variant choice in the execution of the model, as indicated at block 2314 (FIG. 23B). If code is to be generated for the model, the code generator 228 may wrap the variant choices in regular if statements—as opposed to preprocessor conditionals—and may include an initialize function in the code for selecting the active variant choice, as indicated at block 2316. Exemplary conditional code generated for the model 2400 by the code generator 228 in the C programming language is shown below:

```
real_TV_Latch = 0;
void step ( ) {
    if (V_latch == 1) {
        // Solve circuit containing R1, R2, C, and
        the voltage source, i.e., Out = R1 | | R2 | | C.
    } else {
        // Solve circuit containing R2, C, and the
        voltage source, i.e., Out = R2 | | C.
    }
}
void initialize( ) {
    V = ReadValueOfV( );
    V_latch = V;
}
```

As shown, the value of the variant control variable, V, may only be changed in an initialize()function of the generated code. The code latches the value of the variant control variable and may use it during discrete time with fixed step execution of the model's step()function, which may be called at the model's base rate. This approach also works for any simulation type, e.g., fixed-step, variable-step, discrete-time or continuous-time, because the system of equations defined by the model is not altered by the variant condition while the model is running.

Returning to the flow diagram, suppose the given variant connector block is set to the Runtime variant activation time. In this case, the simulation engine 206 may support switching which variant choice is active during execution of the model, as indicated at block 2318. For example, a reset function subsystem may be associated with, e.g., included in, the model 2400 (FIG. 24).

Figure 25:
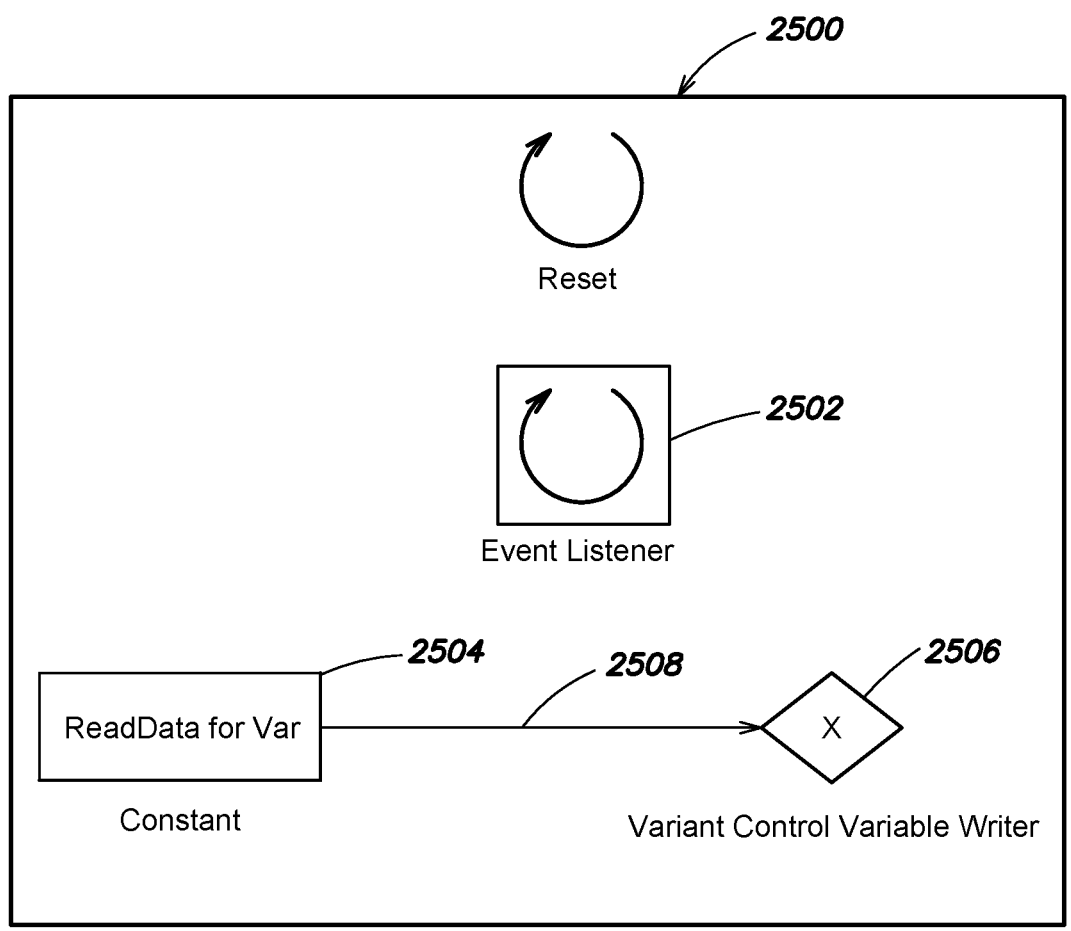
FIG. 25 is an illustration of an example reset function subsystem in accordance with one or more embodiments.

FIG. 25 is an illustration of an example reset function block 2500 that may be associated with the model 2400 in accordance with one or more embodiments. The reset function block 2500 may be a pre-configured subsystem block provided by the simulation environment 200 that executes in response to an event, such as a function-call event. The reset function block 2500 may include an Event Listener block 2502, a Constant block 2504, and a State Writer block 2506 named 'Variant Control Variable Writer'. The Constant block 2504 may be connected to the State Writer block 2506 as indicated by arrow 2508. The Event Listener block 2502 may be configured to trigger the execution of the reset function block 2500 in response to an event, e.g., a Reset event, that may be issued zero, one, or more times during execution of a model. When the Reset event occurs and the Event Listener block 2502 triggers execution of the reset function block 2500, the Constant block 2504 may provide the value of a variable named 'ReadDataforVar' to the state writer block 2506. The state writer block 2506 may set the value of the variant control variable, V, to the value read from the Constant block 2504. By changing the value of the variant control variable V, the active variant choice may be changed during execution of the model.

The model compiler 222 may generate execution instructions for the model 2400 including the reset function block 2500 that are similar to the code below:

```
real_TV_Latch = 0;
void step ( ) {
    if (V_latch == 1) {
        // Solve circuit containing R1, R2, C, and
        the voltage source, i.e., Out = R1 | | R2 | | C.
    } else {
        // Solve circuit containing R2, C, and the
        voltage source, i.e., Out = R2 | | C.
    }
}
Void reset ( )
{
    V= ReadDataForVar;//reset based on value of V
}
```

Here, the value of the variant control variable, V, can be changed during the model's reset( )function, which can be called in between sequential calls to the model's step( )function.

Returning to decision block 2302 (FIG. 23A), if the variant activation time for the given Variant Connector block is not any of Code_Compile, Startup or Runtime, processing may proceed to decision block 2320 as indicated by No arrow 2322 and Go To block 2324. At decision block 2320 (FIG. 23C), the model compiler 222 may determine whether the given Variant Connector block is set to the Update_Diagram variant activation time. If so, the model compiler 222 may replace the given Variant Connector block in the model as either an open or closed connection depending on the evaluation of the variant control variable, as indicated by Yes arrow 2326 leading to block 2328. The model compiler 222 also may remove the inactive variant choice(s) from the model, as indicated at block 2330, and complete model compilation, as indicated at block 2332.

Referring to the physical model 2400 (FIG. 24), suppose the logical expression V==1 evaluates to True. The simulation engine 206 may generate instructions for executing the model that may be equivalent to:

Out=R1 || R2 || C1

If, on the other hand, the logical expression evaluates to False, e.g., the value of V is 0, then the simulation engine 206 may generate instructions for executing the model that may be equivalent to:

Out=R2 || C1

Returning to decision block 2320, if the variant activation time for the given Variant Connector block is not Update_Diagram, then it must be set to the Update_Diagram_Analyze_All_Choices variant activation time—by process of elimination, since it is the last remaining option. In this case, processing may proceed to block 2334, as indicated by No arrow 2336 leading to Go To block 2338. Here, the model compiler 222 may replace the given Variant Connector block with a switch block that has a type matching the physical domain of the model, as indicated by block 2334. The model compiler 222 may perform validation and/or error checking on all of the variant choices defined by the given Variant Connector block, as indicated at block 2340. As described, the model compiler 222 may analyze each variant choice (whether active or inactive) and check whether it has the same compiled attributes as the other variant choices. If any of the variant choices has one or more compiled attributes that differ from the other variant choices, the model compiler 222 may halt compilation and issue a warning and/or an error message. The model compiler 222 may replace the given Variant Connector block in the model with either an open or closed connection depending on the evaluation of the variant control variable, as indicated by block 2342. The model compiler 222 also may remove the inactive variant choice(s) from the model, as indicated at block 2344, and complete model compilation, as indicated at block 2346.

Referring to FIG. 15, the Variant Connector block 1522 may be configured to be in leaf mode. In this case, all model elements connected to the block's variant side, e.g., Resistor 1512 (R7) and Ground 1516 will be conditional. In some embodiments, the simulation engine 206, e.g., as part of the initialization of a physical model may determine whether the Variant Connector blocks included in the model are configured correctly. For example, the simulation engine 206 may determine whether any Variant Connector blocks configured in leaf mode are located in a loop in the model. If so, the simulation engine 206 may issue a warning indicating that only primary and non-primary Variant Connector blocks may be used in a loop. Because the Variant Connector block 1522 is not in a loop of the model 1500, it may pass this check by the simulation engine 206.

In some embodiments, the model editor 204 may detect one or more errors in the use of Variant Connector blocks, for example during creation or edit-time of an acausal model. For example, the model editor 204 may detect the existence of a non-primary Variant Connector block that is not paired with a primary Variant Connector block. The model editor 204 also may detect the existence of a non-primary Variant Connector block that is unbounded, for example because it is not configured with the same tag as the primary Variant Connector block defining the variant region. Referring to FIG. 13, suppose the non-primary Variant Connector block 1321 was not tagged with the value 'X', which associates the non-primary Variant Connector block 1321 with the primary Variant Connector block 1320. For example, suppose the non-primary Variant Connector block 1321 was tagged with a value 'N'. Because no primary Variant Connector block is tagged with the value 'N', the model editor 204 may detect the non-primary Variant Connector block 1321 as unbounded and issue a warning.

In some embodiments, a simulation model may include one or more acausal portions and one or more causal portions. For example, a user may construct a simulation model including one or more dynamic or time-based model elements from the time-based modeling library 208 and one or more model elements of physical components from one or more of the physical domain libraries 212, 214, and 216. Variant regions may be defined in the acausal and the causal portions of the simulation model and the variant condition propagation engine 308 may apply one or more rules for propagating variant conditions among the variant regions.

Figure 19:
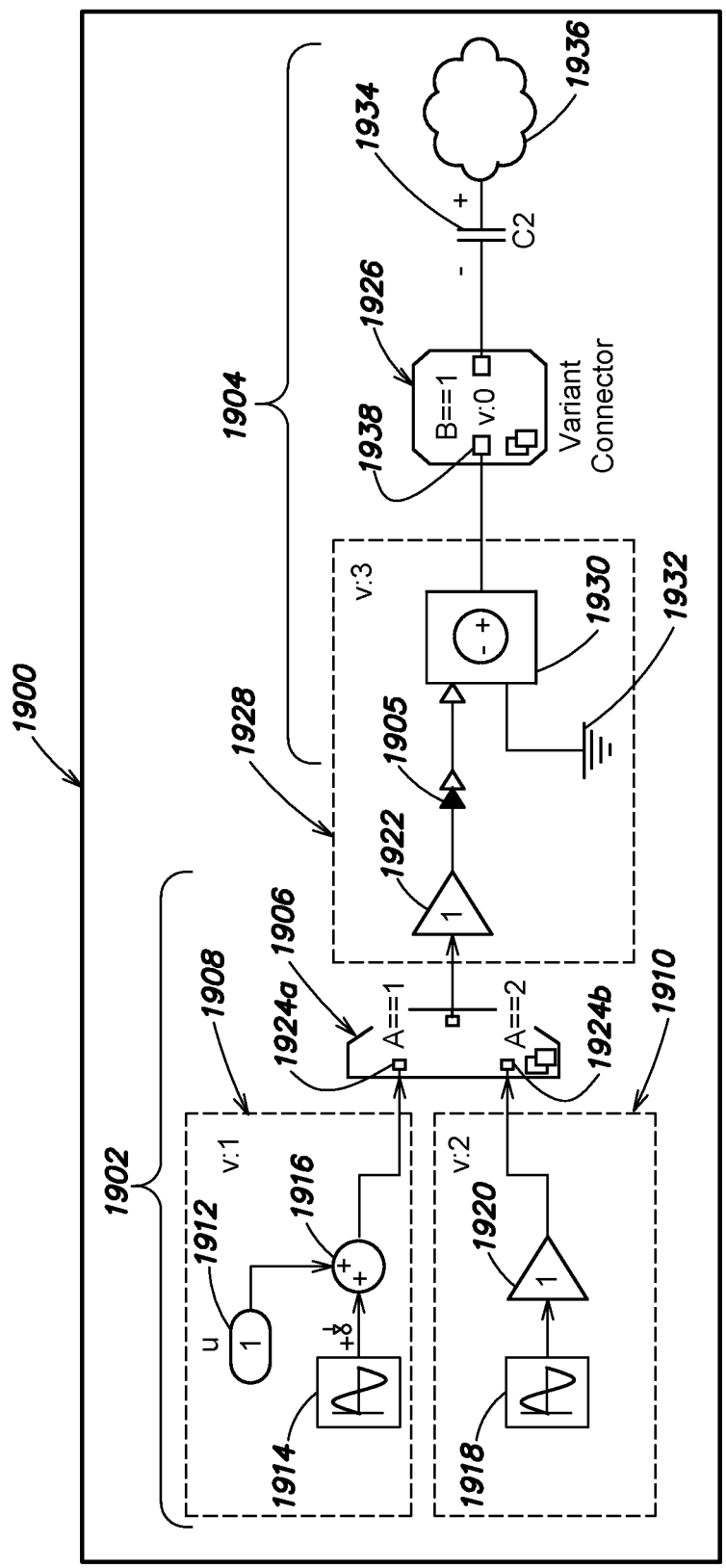
FIG. 19 is an illustration of an example simulation model in accordance with one or more embodiments.

FIG. 19 is an illustration of an example simulation model 1900 in accordance with one or more embodiments. The model 1900 may include a causal portion 1902 connected to an acausal portion 1904 by a dynamic to physical converter block 1905. The causal portion 1902 includes a Variant Source block 1906 that defines two variant regions 1908 and 1910 of the causal portion 1902. The variant region 1908 includes an Inport block 1912, a Sine Generator block 1914, and a Sum block 1916. The other variant region 1910 includes a Sine Generator block 1918 and a Gain block 1920. An output of the Variant Source block 1906 may be connected to a Gain block 1922 of the causal portion 1902.

The Variant Source block 1906 may include an input port 1924*a* connected to the variant region 1908 and associated with variant condition A==1 and another input port 1924*b* connected to the variant region 1910 and associated with the variant condition A==2. Depending on the value of the variable A, the Variant Source block 1906 may connect variant region 1908 or variant region 1910 to the Gain block 1922 and thus to the acausal portion 1904 of the model 1900.

The acausal portion 1904 includes a Variant Connector block 1926 defining a variant region 1928 that includes a Voltage Source block 1930, a Ground block 1932, the Gain block 1922, and the dynamic to physical converter block 1905. The acausal portion 1904 further includes a Capacitor block 1934 and may include other model elements representing physical components as indicated by cloud icon 1936. The Variant Connector block 1926 may be configured as a leaf block and include a variant port 1938 associated with a variant condition of B==1.

The variant condition propagation engine 308 may propagate the variant condition associated with the variant port 1938 of the Variant Connector block to the causal portion 1902 of the model 1900. In addition, the logical expression engine 312 may utilize the variant condition associated with the variant port 1938, e.g., B==1, when generating variant conditions for the variant regions 1908, 1910, and 1928. For example, for variant region 1908 to be active, the variant control variables A and B must both be '1'. Accordingly, the logical expression engine 312 may generate a variant condition of A==1 && B==1 for the variant region 1908. For variant region 1910 to be active, the variant control variable A must be '2' and the variant control variable B must be '1'. Accordingly, the logical expression engine 312 may generate a variant condition of A==2 && B==1 for the variant region 1910. For the variant region 1928 to be active, the variant control variable B must be '1' and the variant control variable A must be either '1' or '2'. Accordingly, the logical expression engine 312 may generate a variant condition of (A==1 || A==2) && B==1 for the variant region 1928.

The variant condition annotation engine 310 may include one or more graphical affordances in the model 1900 that present variant condition information. For example, it may represent variant conditions using the v:# format described herein.

FIG. 20 is an illustration of a legend 2000 of the variant conditions generated for the simulation model 1900 (FIG. 19) in accordance with one or more embodiments. The legend 2000 may include an Annotation column 2002, a Variant Condition column 2004, and a plurality of rows 2006*a*-*d*. The legend 2000 may present the variant conditions associated with the symbolic representations v:0 to v:3 presented in the model 1900.

For purposes of explanation, portions of the present disclosure make reference to model elements, such as blocks, of the Simscape and Simulink simulation environments. This is not intended as limiting and it should be understood that the present disclosure may be used with other simulation environments supporting other elements.

Figure 17:
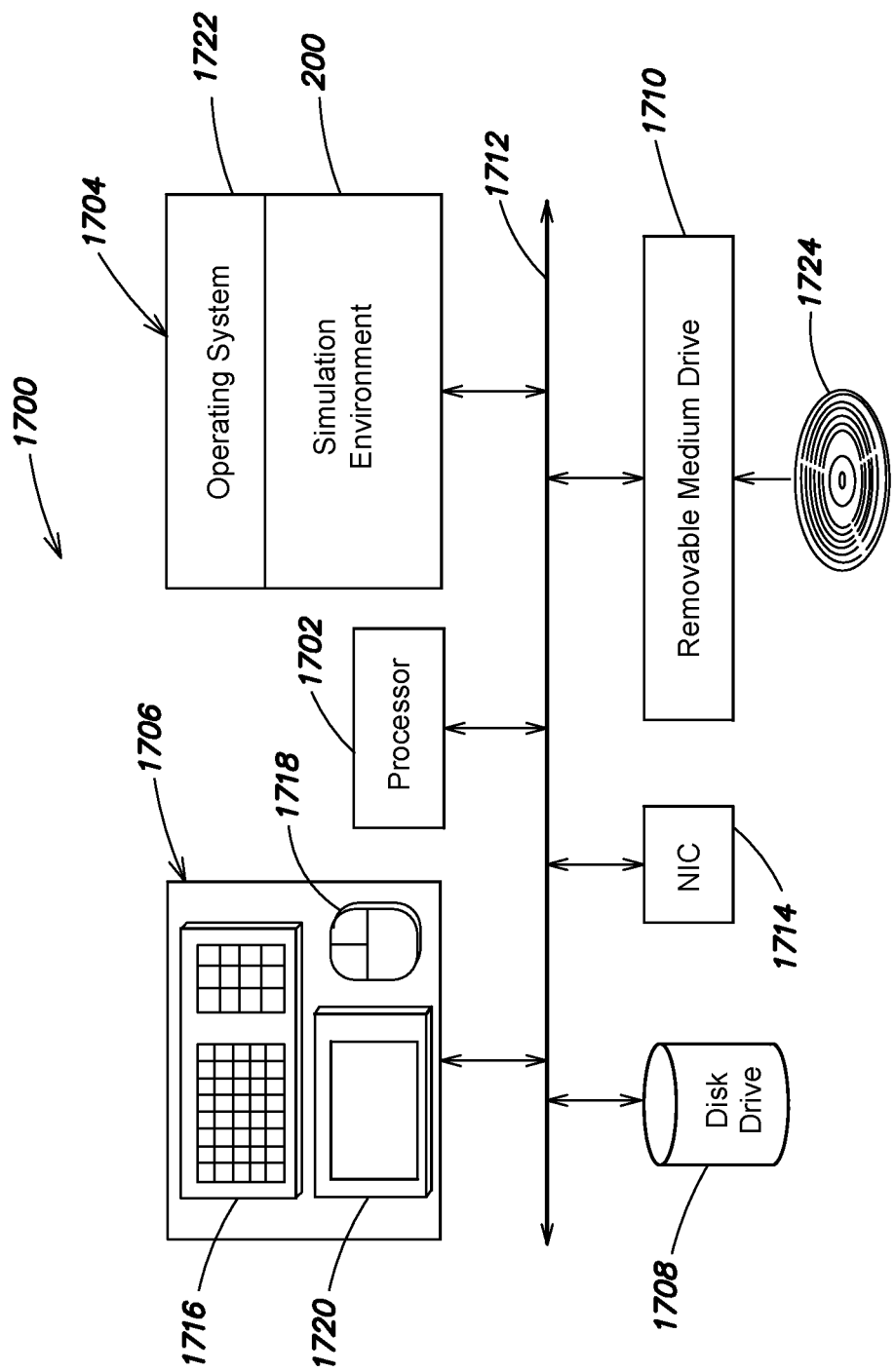
FIG. 17 is a schematic illustration of an example data processing system in accordance with one or more embodiments.

FIG. 17 is a schematic illustration of an example computer or data processing system 1700 for implementing an embodiment of the invention in accordance with one or more embodiments. The computer system 1700 may include one or more processing elements, such as a processor 1702, a main memory 1704, user input/output (I/O) 1706, a persistent data storage unit, such as a disk drive 1708, and a removable medium drive 1710 that are interconnected by a system bus 1712. The computer system 1700 may also include a communication unit, such as a network interface card (NIC) 1714. The user I/O 1706 may include a keyboard 1716, a pointing device, such as a mouse 1718, and a display 1720. Other user I/O 1706 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1704, which may be a Random Access Memory (RAM), may store a plurality of program libraries or modules, such as an operating system 1722, and one or more application programs that interface to the operating system 1722, such as the simulation environment 200.

The removable medium drive 1710 may accept and read a computer readable medium 1726, such as a CD, DVD, floppy disk, solid state drive, tape, flash memory or other non-transitory medium. The removable medium drive 1710 may also write to the computer readable medium 1724.

Suitable computer systems include personal computers (PCs), workstations, servers, laptops, tablets, palm computers, smart phones, electronic readers, and other portable computing devices, etc. Nonetheless, those skilled in the art will understand that the computer system 1700 of FIG. 17 is intended for illustrative purposes only, and that the present invention may be used with other computer, data processing, or computational systems or devices. The present invention may also be used in a computer network, e.g., client-server, architecture, or a public and/or private cloud computing arrangement. For example, the simulation environment 200 may be hosted on one or more cloud servers or devices, and accessed by remote clients through a web portal or an application hosting system, such as the Remote Desktop Connection tool from Microsoft Corp.

Suitable operating systems 1722 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1722 may provide services or functions for applications or modules, such as allocating memory, organizing data objects or files according to a file system, prioritizing requests, managing I/O, etc. The operating system 1722 may run on a virtual machine, which may be provided by the data processing system 1700.

As indicated above, a user, such as an engineer, scientist, programmer, developer, etc., may utilize one or more input devices, such as the keyboard 1716, the mouse 1718, and the display 1720 to operate the modeling environment 1700, and construct and revise one or more models. As discussed, the models may be computational and may have executable semantics. In particular, the models may be simulated or run. In particular, the models may provide one or more of time-based, event-based, state-based, message-based, frequency-based, control-flow based, and dataflow-based execution semantics. The execution of a model may simulate operation of the system that is being designed or evaluated. The term graphical model is intended to include graphical program.

Exemplary simulation environments include the MATLAB® algorithm development environment and the Simulink® model-based design environment from The MathWorks, Inc., as well as the Simscape™ physical modeling system and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product both from National Instruments Corp. of Austin, Tex., the Visual Engineering Environment (VEE) from Keysight Technologies, Inc. of Santa Clara, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y. Models created in the high-level simulation environment may contain less implementation detail, and thus operate at a higher level than certain programming languages, such as the C, C++, C#, and SystemC programming languages.

Those skilled in the art will understand that the MATLAB® algorithm development environment is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, a lower level programming language relative to the high-level simulation environment 200, such as the C, C++, C#, and SystemC programming languages, among others, may be used to create one or more models.

Models constructed within the simulation environment 200 may include textual models, graphical models, such as block diagrams, state-based models, and combinations thereof. A given model may simulate, e.g., approximate the operation of, a system.

Exemplary code generators include, but are not limited to, the Simulink® Coder™, the Embedded Coder®, and the HDL Coder™ products from The MathWorks, Inc. of Natick, Mass., and the TargetLink product from dSpace GmbH of Paderborn Germany.

Figure 18:
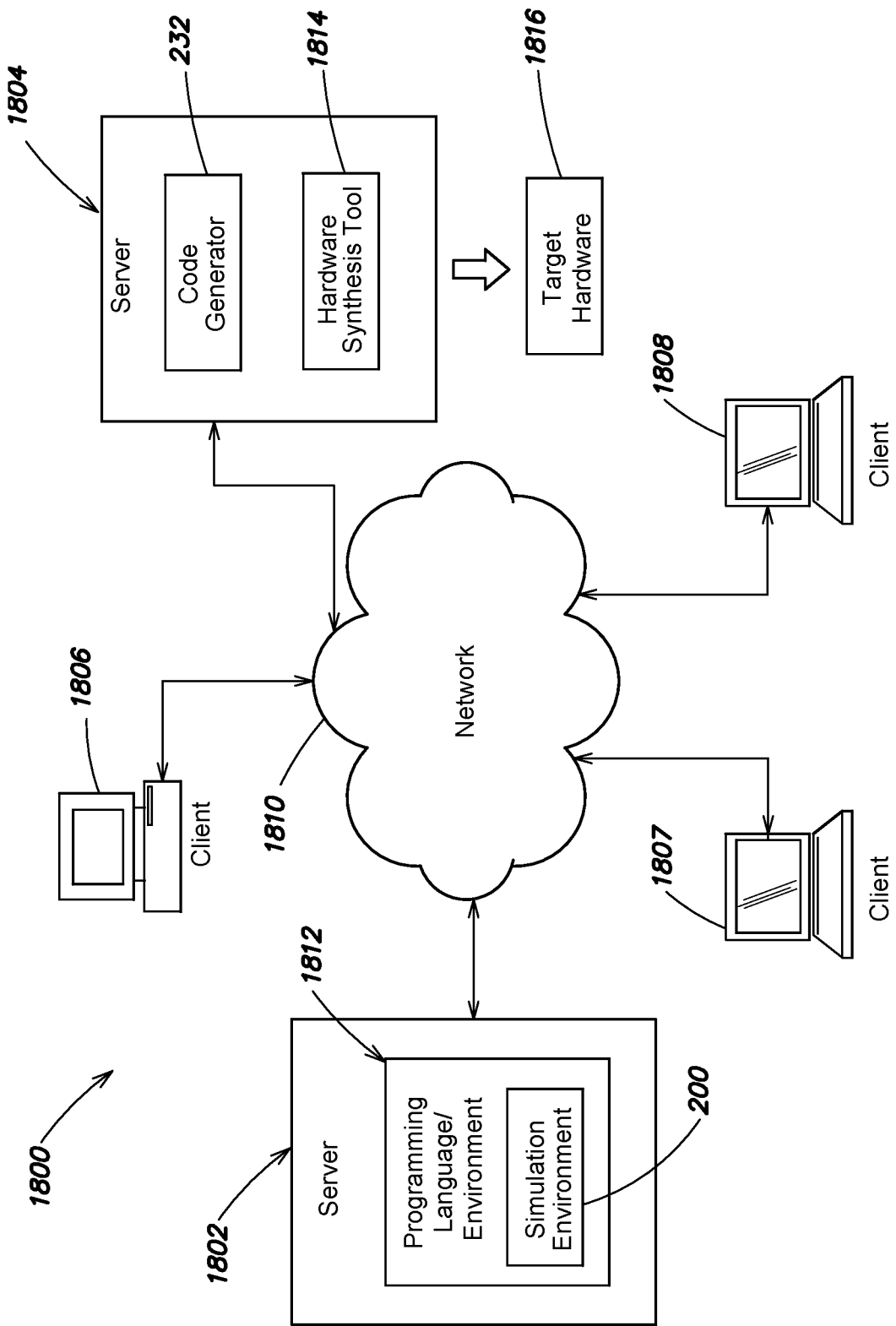
FIG. 18 is a schematic diagram of an example distributed computing environment in accordance with one or more embodiments.

FIG. 18 is a schematic diagram of an example distributed computing environment 1800 in which systems and/or methods described herein may be implemented in accordance with one or more embodiments. The environment 1800 may include client and server devices, such as two servers 1802 and 1804, and three clients 1806-1808, interconnected by one or more networks, such as network 1810. The devices of the environment 1800 may interconnect via wired connections, wireless connections, or a combination of wired and wireless connections. The servers 1802 and 1804 may include one or more devices capable of receiving, generating, storing, processing, executing, and/or providing information. For example, the servers 1802 and 1804 may include a computing device, such as a server, a desktop computer, a laptop computer, a tablet computer, a handheld computer, or a similar device.

The clients 1806-1808 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1806-1808 may download data and/or code from the servers 1802 and 1804 via the network 1810. In some implementations, the clients 1806-1808 may be desktop computers, workstations, laptop computers, tablet computers, handheld computers, mobile phones (e.g., smart phones, radiotelephones, etc.), electronic readers, or similar devices. In some implementations, the clients 1806-1808 may receive information from and/or transmit information to the servers 1802 and 1804.

The network 1810 may include one or more wired and/or wireless networks. For example, the network 1810 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The servers 1802 and 1804 may host applications or processes accessible by the clients 1806-1808. For example, the server 1802 may include a programming language/environment 1812, which may include or have access to the simulation environment 200. The server 1804 may include a code generator, such as the code generator 232, and a hardware synthesis tool 1814. The code generator 232 may generate code for a simulation model, such as HDL code, which may be provided to the hardware synthesis tool 1814. The hardware synthesis tool 1814 may translate the generated code into a bitstream or other format, and may synthesize, e.g., configure, a target system 1816, which may be a real-world system. In this way, the functionality defined by the simulation model may be deployed to a real-world system. For example, the hardware synthesis tool 1814 may configure a programmable logic device, such as a Field Programmable Gate Array (FPGA) or other Programmable Logic Device (PLD), of the target system 1816.

The number of devices and/or networks shown in FIG. 18 is provided as an example. In practice, there may be additional devices and/or networks, fewer devices and/or networks, different devices and/or networks, or differently arranged devices and/or networks than those shown in FIG. 18. Furthermore, two or more devices shown in FIG. 18 may be implemented within a single device, or a single device shown in FIG. 18 may be implemented as multiple, distributed devices. Additionally, one or more of the devices of the distributed computing environment 1800 may perform one or more functions described as being performed by another one or more devices of the environment 1800.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel.

Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 1700. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, multiple different forms of Variant Connector blocks may be provided. Therefore, it is the object of the appended claims to cover all such variations and modifications as come within the true spirit and scope of the disclosure.

What is claimed is:

1. A computer-implemented method comprising:
for a simulation model having an acausal model portion that represents a physical system, the acausal model portion including two or more variant connector blocks that define a variant region, the variant region including variant choices at a same hierarchical level in the simulation model as the two or more variant connector blocks, the variant choices including model elements that represent physical components of the physical system, determining, by one or more processors, that at least two of the variant choices are active;
including in an in-memory representation constructed by the one or more processors for the acausal model portion a section that corresponds to the at least two of the variant choices of the variant region;
generating, by the one or more processors, a physical network based on the in- memory representation following the including step;
generating, by the one or more processors, a system of equations based on the physical network; and
either
i) utilizing the system of equations to execute the acausal model portion; or
ii) generating code, by the one or more processors, for the acausal model portion, where the code is based on the system of equations generated for the physical network,
wherein the acausal model portion further includes a common portion, and
at least one of the two or more variant connector blocks connects the variant region to the common portion of the acausal model portion.

2. The computer-implemented method of claim 1 further comprising:
   associating one or more variant conditions with the variant choices,
   wherein the determining includes evaluating the one or more variant conditions associated with the variant choices.

3. The computer-implemented method of claim 2 wherein the one or more variant conditions is a logical expression that evaluates to True or False or is a label that is set to active.

4. The computer-implemented method of claim 2 wherein the associating includes propagating the one or more variant conditions to one or more of the model elements included in the variant choices.

5. The computer-implemented method of claim 1 wherein at least one of the two or more variant connector blocks is configured to establish a cut point in the acausal model portion.

6. The computer-implemented method of claim 1 wherein at least one of the two or more variant connector blocks defines an internal connection that is in an open or a closed condition, and further wherein, when the internal connection is in the closed condition, the at least one of the two or more variant connector blocks connects the at least two of the variant choices at the same hierarchical level in the simulation model as the two or more variant connector blocks to the common portion of the acausal model portion.

7. The computer-implemented method of claim 6 wherein, when the internal connection is in the open condition, the at least two of the variant choices are cut from the acausal model portion.

8. The computer-implemented method of claim 1 further comprising omitting the two or more variant connector blocks from the in-memory representation.

9. The computer-implemented method of claim 1 wherein the two or more variant connector blocks establish controllable cut points in the acausal model portion.

10. The computer-implemented method of claim 9 further comprising:
    associating a variant condition with a first variant connector block of the two or more variant connector blocks; and
    propagating the variant condition to a second variant connector block of the two or more variant connector blocks.

11. The computer-implemented method of claim 1 wherein
    the acausal model portion includes a first variant region associated with a first variant condition and a second variant region associated with a second variant condition, and
    the second variant region is disposed within the first variant region and includes a first model element,
    the method further comprising:
    generating a third variant condition by logically combining the first variant condition with the second variant condition; and
    propagating the third variant condition to the first model element included in the second variant region.

12. One more non-transitory computer-readable media, having stored thereon instructions that when executed by a computing device, cause the computing device to perform operations comprising:
    for a simulation model having an acausal model portion that represents a physical system, the acausal model portion including two or more variant connector blocks that define a variant region, the variant region including variant choices at a same hierarchical level in the simulation model as the two or more variant connector blocks, the variant choices including model elements that represent physical components of the physical system, determining that at least two of the variant choices are active;
    including in an in-memory representation constructed for the acausal model portion a section that corresponds to the at least two of the variant choices of the variant region;
    generating a physical network based on the in-memory representation following the including step;
    generating a system of equations based on the physical network; and
    either
        i) utilizing the system of equations to execute the acausal model portion; or
        ii) generating code for the acausal model portion, where the code is based on the system of equations generated for the physical network,
    wherein the acausal model portion further includes
    a common portion, and
    at least one of the two or more variant connector blocks connects the variant region to the common portion of the acausal model portion.

13. The one more non-transitory computer-readable media of claim 12 wherein the operations further comprise:
    associating one or more variant conditions with the variant choices, wherein the determining includes evaluating the one or more variant conditions associated with the variant choices.

14. The one or more non-transitory computer-readable media of claim 12 wherein at least one of the two or more variant connector blocks is configured to establish a cut point in the acausal model portion.

15. The one or more non-transitory computer-readable media of claim 12 wherein at least one of the two or more variant connector blocks defines an internal connection that is in an open or a closed condition, and further wherein, when the internal connection is in the closed condition, the at least one of the two or more variant connector blocks connects the at least two of the variant choices at the same hierarchical level in the simulation model as the two or more variant connector blocks to the common portion of the acausal model portion.

16. The one or more non-transitory computer-readable media of claim 15 wherein, when the internal connection is in the open condition, the at least two of the variant choices are cut from the acausal model portion.

17. The one or more non-transitory computer-readable media of claim 12 wherein the operations further comprise omitting the two or more variant connector blocks from the in-memory representation.

18. A computer-implemented method comprising:
    for a simulation model having an acausal model portion that represents a physical system, the acausal model portion including at least one variant connector block defining a variant region containing a single variant choice that includes at least one model element where the at least one model element represents a physical component of the s physical system, associating one or more variant conditions with the single variant choice;
    determining, by one or more processors, that the single variant choice contained in the variant region defined by the at least one variant connector block is inactive, wherein the determining includes evaluating the one or more variant conditions associated with the single variant choice;

cutting from an in-memory representation constructed by the one or more processors for the acausal model portion a section that corresponds to the single variant choice contained in the variant region;

generating, by the one or more processors, a physical network based on the in-memory representation following the cutting step;

generating, by the one or more processors, a system of equations based on the physical network; and either
  i) utilizing the system of equations to execute the acausal model portion; or
  ii) generating code, by the one or more processors, for the acausal model portion, where the code is based on the system of equations generated for the physical network, wherein the acausal model portion further includes
  a common portion, and
the at least one variant connector block connects the variant region to the common portion.

19. The computer-implemented method of claim 18 wherein the at least one variant connector block includes one or more programmatically controlled internal connections.

20. The computer-implemented method of claim 18 wherein the one or more variant conditions is a logical expression that evaluates to True or False or is a label that is set to inactive.

21. The computer-implemented method of claim 18 further comprising:
  determining, by the one or more processors, that the at least one variant connector block is in a loop of the acausal model portion; and
  issuing a warning or an error message.

22. The one or more non-transitory computer-readable media of claim 12 wherein the two or more variant connector blocks establish controllable cut points in the acausal model portion.

23. An apparatus comprising:
  one or more memories storing a simulation model having an acausal model portion that represents a physical system, the acausal model portion including two or more variant connector blocks that define a variant region, the variant region including variant choices at a same hierarchical level in the simulation model as the two or more variant connector blocks, the variant choices including model elements that represent physical components of the physical system; and
  one or more processors operably coupled to the one or more memories, the one or more processors configured to:
    determine that at least two of the variant choices are active;
    include in an in-memory representation constructed for the acausal model portion a section that corresponds to the at least two of the variant choices of the variant region;
    generate a physical network based on the in-memory representation following the including step;
    generate a system of equations based on the physical network; and
    either
      i) utilizing the system of equations to execute the acausal model portion; or
      ii) generating code for the acausal model portion, where the code is based on the system of equations generate for the physical network, wherein the acausal model portion further includes
  a common portion, and
  at least one of the two or more variant connector blocks connects the variant region to the common portion of the acausal model portion.

24. The apparatus of claim 23 wherein at least one of the two or more variant connector blocks is configured to establish a cut point in the acausal model portion.

25. The apparatus of claim 23 wherein at least one of the two or more variant connector blocks defines an internal connection that is in an open or a closed condition, and further wherein, when the internal connection is in the closed condition, the at least one of the two or more variant connector blocks connects the at least two of the variant choices at the same hierarchical level in the simulation model as the two or more variant connector blocks to the common portion of the acausal model portion.

26. The apparatus of claim 25 wherein, when the internal connection is in the open condition, the at least two of the variant choices are cut from the acausal model portion.

27. One more non-transitory computer-readable media, having stored thereon instructions that when executed by a computing device, cause the computing device to perform operations comprising:
  for a simulation model having an acausal model portion that represents a physical system, the acausal model portion including at least one variant connector block defining a variant region containing a single variant choice that includes at least one model element where the at least one model element represents a physical component of the physical system, associating one or more variant conditions with the single variant choice;
  determining that the single variant choice contained in the variant region defined by the at least one variant connector block is inactive, wherein the determining includes evaluating the one or more variant conditions associated with the single variant choice;
  cutting from an in-memory representation constructed for the acausal model portion a section that corresponds to the single variant choice contained in the variant region;
  generating a physical network based on the in-memory representation following the cutting step;
  generating a system of equations based on the physical network; and
  either
    i) utilizing the system of equations to execute the acausal model portion; or
    ii) generating code for the acausal model portion, where the code is based on the system of equations generated for the physical network, wherein the acausal model portion further includes a common portion, and
the at least one variant connector block connects the variant region to the common portion.

28. The one or more non-transitory computer-readable media of claim 27 wherein the at least one variant connector block includes one or more programmatically controlled internal connections.

29. The one or more non-transitory computer-readable media of claim 27 wherein the one or more variant conditions is a logical expression that evaluates to True or False or is a label that is set to inactive.

30. The one or more non-transitory computer-readable media of claim 27 wherein the operations further comprise:
    determining that the at least one variant connector block is in a loop of the acausal model portion; and
    issuing a warning or an error message.

31. An apparatus comprising:
    one or more memories storing a simulation model having an acausal model portion that represents a physical system, the acausal model portion including at least one variant connector block defining a variant region containing a single variant choice that includes at least one model element where the at least one model element represents a physical component of the physical system; and
    one or more processors operably coupled to the one or more memories, the one or more processors configured to:
        associate one or more variant conditions with the single variant choice;
        determine that the single variant choice contained in the variant region defined by the at least one variant connector block is inactive, wherein the determining includes evaluating the one or more variant conditions associated with the single variant choice;
        cut from an in-memory representation constructed for the acausal model portion a section that corresponds to the single variant choice contained in the variant region;
        generate a physical network based on the in-memory representation following the cutting step;
        generate a system of equations based on the physical network; and
    either
        i) utilizing the system of equations to execute the acausal model portion; or
        ii) generating code for the acausal model portion, where the code is
        based on the system of equations generated for the physical network,
    wherein the acausal model portion further includes
    a common portion, and
    the at least one variant connector block connects the variant region to the common portion.

32. The apparatus of claim 31 wherein the at least one variant connector block includes one or more programmatically controlled internal connections.

33. The apparatus of claim 31 wherein the one or more variant conditions is a logical expression that evaluates to True or False or is a label that is set to inactive.

34. The apparatus of claim 31 wherein the one or more processors is further configured to:
    determine that the at least one variant connector block is in a loop of the acausal model portion; and
    issue a warning or an error message.

\* \* \* \* \*